US012754840B2

(12) United States Patent

Malladi et al.

(10) Patent No.: US 12,754,840 B2

(45) Date of Patent: Oct. 6, 2026

(54) SYSTEMS AND METHODS FOR SCALABLE AND COHERENT MEMORY DEVICES

(71) Applicant: Samsung Electronics Co., Ltd., Suwon-si (KR)

(72) Inventors: Krishna T. Malladi, San Jose, CA (US); Andrew Chang, Los Altos, CA (US); Ehsan Najafabadi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/246,448

(22) Filed: Apr. 30, 2021

(65) Prior Publication Data

US 2021/0374056 A1 Dec. 2, 2021

Related U.S. Application Data

(60) Provisional application No. 63/068,054, filed on Aug. 20, 2020, provisional application No. 63/057,746, filed on Jul. 28, 2020, provisional application No. 63/031,509, filed on May 28, 2020, provisional application No. 63/031,508, filed on May 28, 2020.

(51) Int. Cl.

| | |
|---|---|
| ***G06F 12/06*** | (2006.01) |
| ***G06F 9/30*** | (2018.01) |
| ***G06F 9/445*** | (2018.01) |
| ***G06F 12/0891*** | (2016.01) |

(Continued)

(52) U.S. Cl.

CPC ...... *G06F 12/0646* (2013.01); *G06F 9/30047* (2013.01); *G06F 9/44505* (2013.01); *G06F 12/0891* (2013.01); *G06F 13/1668* (2013.01); *G06F 13/4234* (2013.01)

(58) Field of Classification Search

None

See application file for complete search history.

(56) References Cited

U.S. PATENT DOCUMENTS

| | | | |
|---|---|---|---|
| 6,119,150 | A | 9/2000 | Fujii et al. |
| 6,449,699 | B2 | 9/2002 | Franke et al. |

(Continued)

FOREIGN PATENT DOCUMENTS

| | | | |
|---|---|---|---|
| CN | 1268704 | A | 10/2000 |
| CN | 101127009 | A | 2/2008 |

(Continued)

OTHER PUBLICATIONS

U.S. Advisory Action dated Dec. 9, 2021, issued in U.S. Appl. No. 17/026,071 (4 pages).

(Continued)

*Primary Examiner* — Charles J Choi

(74) *Attorney, Agent, or Firm* — Womble Bond Dickinson (US) LLP

(57) ABSTRACT

Provided are systems, methods, and apparatuses for providing a storage resource. The method can include: operating a first controller coupled to a network interface in accordance with a cache coherent protocol; performing at least one operation on data associated with a cache using a second controller coupled to the first controller and coupled to a first memory; and storing the data on a second memory coupled to one of the first controller or the second controller.

20 Claims, 21 Drawing Sheets

(51) Int. Cl.
*G06F 13/16* (2006.01)
*G06F 13/42* (2006.01)

(56) References Cited

U.S. PATENT DOCUMENTS 6,922,756 B2 7/2005 Hum et al.
8,719,464 B2 5/2014 Kegel et al.
8,971,423 B1 3/2015 Fu et al.
9,106,662 B2 8/2015 Jung et al.
9,235,519 B2 1/2016 Lih et al.
9,280,468 B2 3/2016 Lecler
9,430,161 B2 8/2016 Yamazaki et al.
9,432,298 B1 8/2016 Smith
9,448,938 B2 9/2016 Rudelic et al.
9,451,027 B1 9/2016 Kunkel et al.
9,479,457 B2 10/2016 Sindhu
9,483,318 B2 11/2016 Vajapeyam
9,619,389 B1 4/2017 Roug
9,710,173 B2 7/2017 Feng et al.
9,767,903 B2 9/2017 Cho
9,916,241 B2 3/2018 McKean et al.
10,019,360 B2 7/2018 Wang et al.
10,025,626 B2 7/2018 Clayton et al.
10,044,829 B2 8/2018 Lai et al.
10,051,056 B2 8/2018 Lin
10,091,295 B1 10/2018 Savic et al.
10,223,273 B2 3/2019 Yang et al.
10,296,399 B2 5/2019 Das Sharma et al.
10,310,995 B1 6/2019 Malygin et al.
10,331,588 B2 6/2019 Frandzel et al.
10,389,800 B2 8/2019 Blainey et al.
10,523,748 B2 12/2019 Yang et al.
10,599,548 B2 3/2020 Wang et al.
10,803,549 B1 10/2020 Wrosz et al.
10,831,386 B2 11/2020 Voigt
10,831,404 B2 11/2020 Li
10,866,911 B2 12/2020 Qiu et al.
10,884,662 B2 1/2021 Yang
10,996,892 B2 5/2021 Gibb et al.
11,093,277 B2 8/2021 Sankaran et al.
11,100,028 B1 8/2021 Subramaniam et al.
11,126,564 B2 * 9/2021 Schlansker ........... G06F 15/173
11,182,294 B2 11/2021 Parker et al.
11,226,846 B2 1/2022 Lubsey et al.
11,232,058 B2 1/2022 Jen et al.
11,409,465 B2 8/2022 Nimmagadda et al.
11,409,685 B1 8/2022 Kaplan et al.
11,461,262 B2 10/2022 Li
11,599,482 B2 3/2023 Yeung et al.
11,620,505 B2 4/2023 Jang et al.
11,669,481 B2 6/2023 Jen et al.
11,741,034 B2 8/2023 Nam et al.
12,197,345 B2 1/2025 Qiu et al.
2002/0018484 A1 2/2002 Kim
2002/0083275 A1 6/2002 Kawamoto et al.
2003/0140274 A1 7/2003 Neumiller et al.
2004/0133409 A1 7/2004 Mukherjee et al.
2005/0137757 A1 6/2005 Phelan et al.
2005/0160430 A1 * 7/2005 Steely ................. G06F 12/0817
711/E12.027
2006/0063501 A1 3/2006 Adkisson et al.
2006/0230119 A1 10/2006 Hausauer et al.
2007/0220231 A1 9/2007 Sakthivelu et al.
2008/0025289 A1 1/2008 Kapur et al.
2010/0165984 A1 7/2010 Aybay et al.
2011/0213933 A1 9/2011 Maeda et al.
2011/0320690 A1 12/2011 Peterson et al.
2012/0069029 A1 3/2012 Bourd et al.
2012/0151141 A1 6/2012 Bell, Jr. et al.
2012/0159101 A1 6/2012 Myoshi
2013/0073112 A1 3/2013 Phelan et al.
2013/0117765 A1 5/2013 Suzuki et al.
2013/0318308 A1 11/2013 Jayasimha et al.
2014/0115579 A1 4/2014 Kong
2014/0195672 A1 7/2014 Raghavan et al.
2014/0359099 A1 12/2014 Wang
2015/0058642 A1 2/2015 Okamoto et al.
2015/0106560 A1 4/2015 Perego et al.
2015/0120971 A1 4/2015 Bae et al.
2015/0143037 A1 5/2015 Smith
2015/0258437 A1 9/2015 Kruglick
2015/0261434 A1 9/2015 Kagan et al.
2015/0263985 A1 9/2015 Schmitter et al.
2015/0331794 A1 11/2015 Ren et al.
2015/0347183 A1 12/2015 Borthakur
2016/0182154 A1 6/2016 Fang et al.
2016/0182345 A1 6/2016 Herdich et al.
2016/0267209 A1 9/2016 Ikram et al.
2016/0299767 A1 10/2016 Mukadam
2016/0299860 A1 10/2016 Harriman
2016/0306574 A1 10/2016 Friedman et al.
2016/0308968 A1 10/2016 Friedman
2016/0328273 A1 11/2016 Molka et al.
2016/0344629 A1 11/2016 Gray
2017/0012844 A1 1/2017 Ellison et al.
2017/0075576 A1 3/2017 Cho
2017/0085319 A1 3/2017 Latham et al.
2017/0187846 A1 6/2017 Shalev et al.
2017/0212837 A1 7/2017 Breternitz
2017/0228317 A1 * 8/2017 Drapala .............. G06F 12/0824
2017/0295237 A1 10/2017 Ajima
2017/0300298 A1 10/2017 Ishii
2017/0300427 A1 10/2017 Lin et al.
2017/0308483 A1 10/2017 Ishii
2017/0344294 A1 11/2017 Mishra et al.
2017/0346915 A1 11/2017 Gay
2018/0024935 A1 1/2018 Meswani et al.
2018/0048711 A1 2/2018 Aslam et al.
2018/0089115 A1 3/2018 Schmisseur et al.
2018/0089881 A1 3/2018 Johnson
2018/0137069 A1 5/2018 Vakharwala et al.
2018/0173466 A1 6/2018 Yang et al.
2018/0173673 A1 6/2018 Daglis et al.
2018/0191523 A1 7/2018 Shah et al.
2018/0293489 A1 10/2018 Eyster et al.
2019/0042138 A1 2/2019 Guim Bernat et al.
2019/0042388 A1 2/2019 Wang et al.
2019/0042455 A1 2/2019 Agarwal et al.
2019/0073265 A1 3/2019 Brennan et al.
2019/0081805 A1 3/2019 Frezza et al.
2019/0087240 A1 3/2019 Sury et al.
2019/0102292 A1 4/2019 Agarwal et al.
2019/0102346 A1 4/2019 Wang et al.
2019/0138934 A1 * 5/2019 Prakash ............. G06V 10/7747
2019/0171373 A1 * 6/2019 Frank ...................... G06F 3/061
2019/0179805 A1 6/2019 Prahlad et al.
2019/0213130 A1 * 7/2019 Madugula ........... G06F 12/0895
2019/0220319 A1 7/2019 Parees et al.
2019/0220424 A1 7/2019 Guim Bernat et al.
2019/0227936 A1 7/2019 Jang
2019/0235777 A1 8/2019 Wang et al.
2019/0243579 A1 8/2019 Li
2019/0281025 A1 9/2019 Harriman et al.
2019/0297015 A1 9/2019 Marolia et al.
2019/0303345 A1 10/2019 Zhu et al.
2019/0304052 A1 10/2019 Ray et al.
2019/0310913 A1 10/2019 Helmick et al.
2019/0384733 A1 12/2019 Jen et al.
2019/0385057 A1 12/2019 Litichever et al.
2019/0391936 A1 12/2019 Stalley
2020/0004685 A1 1/2020 Guim Bernat et al.
2020/0012604 A1 1/2020 Agarwal
2020/0019515 A1 1/2020 Koufaty et al.
2020/0021540 A1 1/2020 Marolia et al.
2020/0026556 A1 1/2020 Chitlur et al.
2020/0026656 A1 1/2020 Liao et al.
2020/0029458 A1 1/2020 Jau et al.
2020/0050403 A1 2/2020 Suri et al.
2020/0050570 A1 2/2020 Agarwal et al.
2020/0065290 A1 2/2020 Natu
2020/0089612 A1 3/2020 Rustad et al.
2020/0104189 A1 4/2020 Gopalan et al.
2020/0104275 A1 4/2020 Sen et al.
2020/0125503 A1 4/2020 Graniello et al.

(56) References Cited

U.S. PATENT DOCUMENTS

| | | | |
|---|---|---|---|
| 2020/0125529 | A1 | 4/2020 | Byers et al. |
| 2020/0125956 | A1 | 4/2020 | Ravi et al. |
| 2020/0136943 | A1 | 4/2020 | Banyai et al. |
| 2020/0137896 | A1 | 4/2020 | Elenitoba-Johnson et al. |
| 2020/0151104 | A1 | 5/2020 | Yang |
| 2020/0159449 | A1 | 5/2020 | Davis et al. |
| 2020/0167098 | A1 | 5/2020 | Shah et al. |
| 2020/0167258 | A1 | 5/2020 | Chattopadhyay et al. |
| 2020/0192715 | A1 | 6/2020 | Wang et al. |
| 2020/0226081 | A1 | 7/2020 | Kalyanasundharam et al. |
| 2020/0241926 | A1 | 7/2020 | Guim Bernat |
| 2020/0250002 | A1 | 8/2020 | Gururaj et al. |
| 2020/0257517 | A1 | 8/2020 | Seater et al. |
| 2020/0371914 | A1 | 11/2020 | Wang et al. |
| 2020/0412798 | A1 | 12/2020 | Devireddy et al. |
| 2020/0412802 | A1 | 12/2020 | Yang et al. |
| 2021/0011864 | A1 | 1/2021 | Guim Bernat et al. |
| 2021/0049101 | A1 | 2/2021 | Ray et al. |
| 2021/0058388 | A1 | 2/2021 | Knotwell et al. |
| 2021/0064114 | A1 | 3/2021 | Troia |
| 2021/0064530 | A1 | 3/2021 | Palfer-Sollier et al. |
| 2021/0084787 | A1 | 3/2021 | Weldon et al. |
| 2021/0117360 | A1 | 4/2021 | Kutch et al. |
| 2021/0120039 | A1 | 4/2021 | Bett et al. |
| 2021/0125048 | A1 | 4/2021 | Jang et al. |
| 2021/0132999 | A1 | 5/2021 | Haywood et al. |
| 2021/0200667 | A1 | 7/2021 | Bernstein et al. |
| 2021/0247935 | A1 | 8/2021 | Beygi et al. |
| 2021/0248094 | A1 | 8/2021 | Norman et al. |
| 2021/0311900 | A1 | 10/2021 | Malladi et al. |
| 2021/0373778 | A1 | 12/2021 | Wu et al. |
| 2022/0100579 | A1 | 3/2022 | Lal et al. |
| 2022/0108743 | A1 | 4/2022 | Tan et al. |
| 2022/0114128 | A1 | 4/2022 | Jen et al. |
| 2022/0147476 | A1 | 5/2022 | Nam et al. |
| 2022/0244870 | A1 | 8/2022 | Duan et al. |
| 2022/0334932 | A1 | 10/2022 | Das Sharma et al. |
| 2022/0334995 | A1 | 10/2022 | Das Sharma et al. |
| 2022/0342840 | A1 | 10/2022 | Das Sharma et al. |
| 2022/0342841 | A1 | 10/2022 | Choudhary et al. |
| 2023/0069339 | A1 | 3/2023 | Mai et al. |
| 2023/0401120 | A1 | 12/2023 | Gim et al. |
| 2025/0061074 | A1 | 2/2025 | Park et al. |

FOREIGN PATENT DOCUMENTS

| | | | |
|---|---|---|---|
| CN | 103109274 | A | 5/2013 |
| CN | 104094241 | A | 10/2014 |
| CN | 104954251 | A | 9/2015 |
| CN | 105912275 | A | 8/2016 |
| CN | 107430494 | A | 12/2017 |
| CN | 107844433 | A | 3/2018 |
| CN | 108228082 | A | 6/2018 |
| CN | 108702374 | A | 10/2018 |
| CN | 109791521 | A | 5/2019 |
| CN | 106681826 | B | 8/2019 |
| CN | 110134329 | A | 8/2019 |
| CN | 110442532 | A | 11/2019 |
| CN | 110659230 | A | 1/2020 |
| CN | 110770710 | A | 2/2020 |
| CN | 110941576 | A | 3/2020 |
| EP | 1235154 | A2 | 8/2002 |
| EP | 3916564 | A1 | 12/2021 |
| JP | 7-281953 | A | 10/1995 |
| JP | 9-204403 | A | 8/1997 |
| JP | 2013-537993 | A | 10/2013 |
| JP | 2014-199583 | A | 10/2014 |
| JP | 2015-500524 | A | 1/2015 |
| JP | 2015-84222 | A | 4/2015 |
| JP | 2017-151911 | A | 8/2017 |
| JP | 2017-521753 | A | 8/2017 |
| JP | 2017-187973 | A | 10/2017 |
| JP | 2018-10698 | A | 1/2018 |
| KR | 10-2011-0134855 | A | 12/2011 |
| KR | 10-1113943 | B1 | 3/2012 |
| KR | 10-2014-0089749 | A | 7/2014 |
| KR | 10-2015-0077296 | A | 7/2015 |
| KR | 10-2017-0031830 | A | 3/2017 |
| KR | 10-1968433 | B1 | 4/2019 |
| KR | 10-2019-0093568 | A | 8/2019 |
| TW | 201723859 | A | 7/2017 |
| TW | 201738731 | A | 11/2017 |
| TW | I637616 | B | 10/2018 |
| TW | 202008170 | A | 2/2020 |
| WO | 2005/116839 | A1 | 12/2005 |
| WO | 2015/075837 | A1 | 5/2015 |
| WO | WO 2016/100978 | A1 | 6/2016 |
| WO | 2016/170632 | A1 | 10/2016 |
| WO | WO 2018/141061 | A1 | 8/2018 |
| WO | 2019/050411 | A1 | 3/2019 |

OTHER PUBLICATIONS

U.S. Office Action dated Dec. 15, 2021, issued in U.S. Appl. No. 17/026,087 (11 pages).
U.S. Final Office Action dated Sep. 28, 2021, issued in U.S. Appl. No. 17/026,071 (13 pages).
AWS Summit, Seoul, Korea, 2017, 36 pages, https://www.slideshare.net/awskorea/aws-cloud-game-architecture?from_action=save), Amazon Web Services, Inc.
Jack Tigar Humphries, et al., “Mind the Gap: A Case for Informed Request Scheduling at the NIC”, HotNets ’19: Proceedings of the 18th ACM Workshop on Hot Topics in Networks, Nov. 2019, pp. 60-68, https://doi.org/10.1145/3365609.3365856.
U.S. Office Action dated Jun. 21, 2021, issued in U.S. Appl. No. 17/026,071 (12 pages).
U.S. Office Action dated Aug. 19, 2021, issued in U.S. Appl. No. 17/026,074 (16 pages).
EPO Extended European Search Report dated Sep. 13, 2021, issued in corresponding European Patent Application No. 21158607.8 (14 pages).
European Search Report for EP Application No. 21162578.5 dated Sep. 15, 2021, 13 pages.
Notice of Allowance for U.S. Appl. No. 17/026,074 dated Dec. 29, 2021, 10, pages.
Notice of Allowance for U.S. Appl. No. 17/026,074 dated Mar. 9, 2021, 10 pages.
Notice of Allowance for U.S. Appl. No. 17/026,082 dated Mar. 30, 2022, 7 pages.
Office Action for U.S. Appl. No. 17/026,071 dated Mar. 17, 2022, 14 pages.
Office Action for U.S. Appl. No. 17/026,082 dated Nov. 26, 2021, 13 pages.
U.S. Notice of Allowance dated Jun. 1, 2022, issued in U.S. Appl. No. 17/026,087 (8 pages).
U.S. Notice of Allowance dated Jun. 28, 2022, issued in U.S. Appl. No. 17/026,074 (10 pages).
U.S. Office Action dated Aug. 3, 2022, issued in U.S. Appl. No. 17/026,082 (13 pages).
U.S. Final Office Action dated Sep. 16, 2022, issued in U.S. Appl. No. 17/026,071 (14 pages).
US Office Action dated Dec. 20, 2022, issued in U.S. Appl. No. 17/887,379 (17 pages).
US Notice of Allowance dated Feb. 8, 2023, issued in U.S. Appl. No. 17/026,071 (9 pages).
US Notice of Allowance dated Mar. 6, 2023, issued in U.S. Appl. No. 17/026,082 (6 pages).
US Office Action dated Mar. 29, 2023, issued in U.S. Appl. No. 17/950,925 (6 pages).
US Notice of Allowance dated Mar. 31, 2023, issued in U.S. Appl. No. 17/887,379 (9 pages).
US Office Action dated Oct. 3, 2023, issued in U.S. Appl. No. 17/026,082 (12 pages).
Chinese Office Action dated Jul. 12, 2023, issued in corresponding Chinese Patent Application No. 202110472003.5 (7 pages).
EPO Office Action dated Jul. 17, 2023, issued in corresponding European Patent Application No. 21171532.1 (10 pages).

(56) References Cited

OTHER PUBLICATIONS

US Office Action dated Aug. 15, 2023, issued in U.S. Appl. No. 17/135,901 (11 pages).
US Office Action dated Dec. 7, 2023, issued in U.S. Appl. No. 17/950,925 (12 pages).
US Notice of Allowance dated Jan. 23, 2024, issued in U.S. Appl. No. 17/026,082 (9 pages).
EPO Office Action dated Jan. 3, 2024, issued in corresponding European Patent Application No. 21158412.3 (10 pages).
US Final Office Action dated Feb. 9, 2024, issued in U.S. Appl. No. 17/135,901 (11 pages).
US Notice of Allowance dated Feb. 28, 2024, issued in U.S. Appl. No. 17/026,071 (8 pages).
Taiwanese Office Action dated Feb. 22, 2024, issued in Taiwanese Patent Application No. 110114337 (3 pages).
US Office Action dated Apr. 24, 2024, issued in U.S. Appl. No. 17/026,071 (14 pages).
US Office Action dated May 9, 2024, issued in U.S. Appl. No. 18/381,571 (16 pages).
US Office Action dated May 22, 2024, issued in U.S. Appl. No. 17/135,901 (11 pages).
Korean Office Action dated Apr. 16, 2024, issued in Korean Patent Application No. 10-2021-0026299 (118 pages).
Taiwanese Office Action dated Jul. 16, 2024, issued in Taiwanese Patent Application No. 110118357 (13 pages).
US Office Action dated Jul. 30, 2024, issued in U.S. Appl. No. 17/026,082 (14 pages).
Taiwanese Examination Report for TW Application No. 11320779640 dated Jul. 31, 2024, 8 pages.
Taiwanese Office Action and Search Report for TW 11320910430 dated Sep. 4, 2024, 12 pages.
Taiwanese Office Action and Search Report for TW 11320903010 dated Sep. 2, 2024, 11 pages.
Final Office Action for U.S. Appl. No. 17/135,901 dated Oct. 1, 2024, 12 pages.
Office Action for U.S. Appl. No. 18/357,798 dated Sep. 25, 2024, 13 pages.
US Final Office Action dated Nov. 5, 2024, issued in U.S. Appl. No. 18/381,571 (17 pages).
US Notice of Allowance dated Dec. 5, 2024, issued in U.S. Appl. No. 17/026,071 (10 pages).
US Office Action dated Dec. 16, 2024, issued in U.S. Appl. No. 17/950,925 (12 pages).
US Final Office Action dated Jan. 8, 2025, issued in U.S. Appl. No. 18/357,798 (14 pages).
Japanese Office Action dated Apr. 1, 2025, issued in corresponding Japanese Application No. 2021-89584, 4 pages.
US Office Action dated Feb. 13, 2025, issued in U.S. Appl. No. 17/026,082 (15 pages).
US Office Action dated Feb. 25, 2025, issued in U.S. Appl. No. 17/026,071 (14 pages).
Korean Notice of Allowance dated Mar. 10, 2025, issued in corresponding Korean Patent Application No. 10-2021-0026299 (8 pages).
US Final Office Action dated Jul. 24, 2025, issued in U.S. Appl. No. 17/026,071 (16 pages).
US Notice of Allowance dated Oct. 16, 2025, issued in U.S. Appl. No. 17/026,071 (8 pages).
US Office Action dated Dec. 3, 2025, issued in U.S. Appl. No. 18/919,270 (15 pages).
US Final Office Action dated Apr. 8, 2026, issued in U.S. Appl. No. 18/919,270 (18 pages).
US Office Action dated May 21, 2025, issued in U.S. Appl. No. 18/381,571 (19 pages).
US Notice of Allowance dated Jul. 8, 2025, issued in U.S. Appl. No. 17/950,925 (5 pages).
Yu, et al. "The Design and Implementation of Device which Dynamically Connects Storage and Computation", Computer Science, 2007 vol. 34 No. 7, Retrieved from the Internet <URL: https://www.cnki.net, pp. 131-133.
US Office Action dated Jun. 22, 2026, issued in U.S. Appl. No. 17/026,082 (17 pages).
Korean Office Action corresponding to KR Application No. 10-2021-044465, dated Jul. 8, 2026 (8 pages).
US Office Action dated Jul. 15, 2026, issued in U.S. Appl. No. 18/919,270 (7 pages).

* cited by examiner

400

402

| | Direct-attached (406) | Pooled (408) | Distributed (410) | Disaggregated (412) |
|---|---|---|---|---|
| Direct memory capacity | ~1.28TB | ~1.28TB | ~1.28TB | ~1.28TB |
| Far memory capacity (Cache-coherentCXL) | ~384GB (Depends on FF) | ~640GB (Depends on FF) | ~640GB (Depends on FF) | 0 |
| Far memory Perf. | ~ 140ns (64B) 192GB/s (x64 PCIe5) | ~200ns (CXL switch) 192GB/s (x64 PCIe5) | ~250ns 192GB/s (x64 PCIe5) | ~250ns 256GB/s (x64 PCIe5) |
| Remote memory capacity (per server) | ~125TB (10 servers) | ~150TB (10 servers) | ~150TB (10 servers) | ~50TB (2 boxes) |
| Remote memory Perf. | ~5-10us (4KB) ~50GB/s (4 100GbE ports) | ~5-10us (4KB) ~50GB/s (4 100GbE ports) | ~500ns ~128GB/s | ~400ns ~256GB/s |
| Overall TCO | ~$30K/server (Capex + opex) | ~$31K/server | ~$34K/server | TBD |
| Overall Power (amortized) | ~300W/server | ~400W/server | ~400W/server | TBD |
| Overall Area (With E1 FF) | ~1.3U (switch area amortized) | ~1.3U | ~1.3U | ~2.1U |

FIG. 4

601

| # | Form-factor (602) | Dimensions (604) | Power (606) | Interface (PCIe) (608) | BW ratio (:DDR5 ch) (610) | Chip config. (612) | Power limited DDR5 (614) | Area limited DDR5 (No 3D) (616) |
|---|---|---|---|---|---|---|---|---|
| 1 | M.2 | 110 x 22mm | 8W | x4, 16GB/s | 0.5X | DDR5 ~ 16Gb, 76mm$^2$ | 25GB | 16GB |
| 2 | E1.L | 318.75 x 38.4 mm | 40W | x4-x8, 16-32GB/s | 0.5-1X | DDR4 ~ 8Gb, 45mm$^2$ | 128GB | 48-80GB |
| 3 | E1.S | 111.5 x 31.5 mm | 12-20W | x4-x8, 16-32GB/s | 0.5-1X | LPDDR5 ~ 12Gb, 55mm$^2$ | 64GB | 16-32GB |
| 4 | E3 S/L | (104.9/142.2) * 76 mm | 70W | x4-x16, 16-64GB/s | 0.5-2X | LPDDR4X ~ 16Gb, 84mm$^2$ | 224GB | 48-80GB |
| 5 | U.2 | 100 x 69.85 mm | 25W | x4, 16GB/s | 0.5X | | 80GB | 32-48GB |
| 6 | NF1 | 110 x 33 mm | 11.5W | x4, 16GB/s | 0.5X | Z-NAND ~ 64Gb, 46mm$^2$ | 36GB | 16-32GB |
| 7 | FHHL AIC | 170 x 160 mm | 25W (board) | x8-x16, 32-64GB/s | 1-2X | | 80GB | 112-192GB |
| 8 | HHHL AIC | 170 x 80 mm | 25W (board) | x8-x16, 32-64GB/s | 1-2X | **[DDR5, LPDDR5 die sizes similar; Z-NAND 4-8X denser** | 80GB | 64-96GB |

FIG. 6

SYSTEMS AND METHODS FOR SCALABLE AND COHERENT MEMORY DEVICES

CROSS-REFERENCE TO RELATED APPLICATION(S)

The present application claims priority to and the benefit of U.S. Provisional Application No. 63/031,508, filed May 28, 2020, entitled "EXTENDING MEMORY ACCESSES WITH NOVEL CACHE COHERENCE CONNECTS", and priority to and the benefit of U.S. Provisional Application No. 63/031,509, filed May 28, 2020, entitled "POOLING SERVER MEMORY RESOURCES FOR COMPUTE EFFICIENCY", and priority to and the benefit of U.S. Provisional Application No. 63/068,054, filed Aug. 20, 2020, entitled "SYSTEM WITH CACHE-COHERENT MEMORY AND SERVER-LINKING SWITCH FIELD", and priority to and the benefit of U.S. Provisional Application No. 63/057,746, filed Jul. 28, 2020, entitled "DISAGGREGATED MEMORY ARCHITECTURE WITH NOVEL INTERCONNECTS", the entire contents of all which is incorporated herein by reference.

FIELD

The present disclosure generally relates to cache coherency, and more specifically, to systems and methods for scalable and coherent memory devices.

BACKGROUND

Some server systems may include collections of servers connected by a network protocol. Each of the servers in such a system may include processing resources (e.g., processors) and memory resources (e.g., system memory). It may be advantageous, in some circumstances, for a processing resource of one server to access a memory resource of another server, and it may be advantageous for this access to occur while minimizing the processing resources of either server.

Thus, there is a need for an improved system and method for managing memory resources in a system including one or more servers.

The above information disclosed in this Background section is only for enhancement of understanding of the background of the disclosure and therefore it may contain information that does not constitute prior art.

SUMMARY

In various embodiments, described herein include systems, methods, and apparatuses for providing a storage resource are described, in particular, a device is described, the device including a first controller coupled to a network interface, wherein the first controller is operable with a cache coherent protocol; a second controller coupled to the first controller and coupled to a first memory, the second controller performing at least one operation associated with a cache of the device; and a second memory coupled to at least one of the first controller or the second controller.

In some embodiments, the device can receive a configuration information from a host; configure the device to operate the second controller as one of a software-based cache or a hardware based cache in a boot-time mode of operation; receive, via the first controller, data via the network interface using the cache coherent protocol; perform at least one second operation on the data to generate second data, and store the second data on the second memory based on the cache coherent protocol. In another embodiment, the cache coherent protocol can include a compute express link (CXL) protocol and wherein the device further comprises a profiler that determines at least one capability associated with the device and provides the capability to a host.

In other embodiments, the device further includes a third controller coupled to a third memory, the third memory comprising a non-volatile memory. In various embodiments, the first memory includes a first volatile memory and the second memory comprises a second volatile memory. In other embodiments, the first volatile memory includes a double-data rate memory or a low-power double data-data rate memory. In some embodiments, the first memory includes a first non-volatile memory and the second memory comprises a second non-volatile memory. In an embodiment, the first non-volatile memory includes a three-dimensional flash memory.

In various embodiments, the device includes at least one of a M.2 form factor, an E1.L form factor, a E1.S form factor, a E3 S/L form factor, a U.2 form factor, an NF1 form factor, an full height, half length (FHHL) add-in card (AIC) form factor, or an half height, half length (HHHL) AIC form factor.

In other embodiments, the second controller includes at least one of a flow control module, a cache addressing module, or a cache policy module. In some embodiments, the second controller includes at least one of a channel request queue, a volatile-memory request scheduler, or a volatile-memory command scheduler. In other embodiments, the device further includes an accelerator or a network interface card (NIC).

Similarly, systems and methods for performing substantially the same or similar operations as described above are further disclosed.

Accordingly, particular embodiments of the subject matter described herein can be implemented so as to realize one or more of the following advantages. Reduce network latencies and improve network stability and operational data transfer rates and, in turn, improve the user experience. Reduce costs associated with routing network traffic, network maintenance, network upgrades, and/or the like. Further, in some aspects, the disclosed systems can serve to reduce the power consumption and/or bandwidth of devices on a network, and may serve to increase the speed and/or efficiency of communications between devices.

BRIEF DESCRIPTION OF THE DRAWINGS

The above-mentioned aspects and other aspects of the present techniques will be better understood when the present application is read in view of the following figures in which like numbers indicate similar or identical elements:

FIG. 4 depicts a diagram of a representative table of parameters that can characterize aspects of the servers described in connection with FIG. 1, where the management computing entity configure the various servers based on the table of parameters, in accordance with example embodiments of the disclosure.

FIG. 6 is an illustration of an exemplary table associated with device related parameters, in accordance with example embodiments of the disclosure.

Figure 1A:
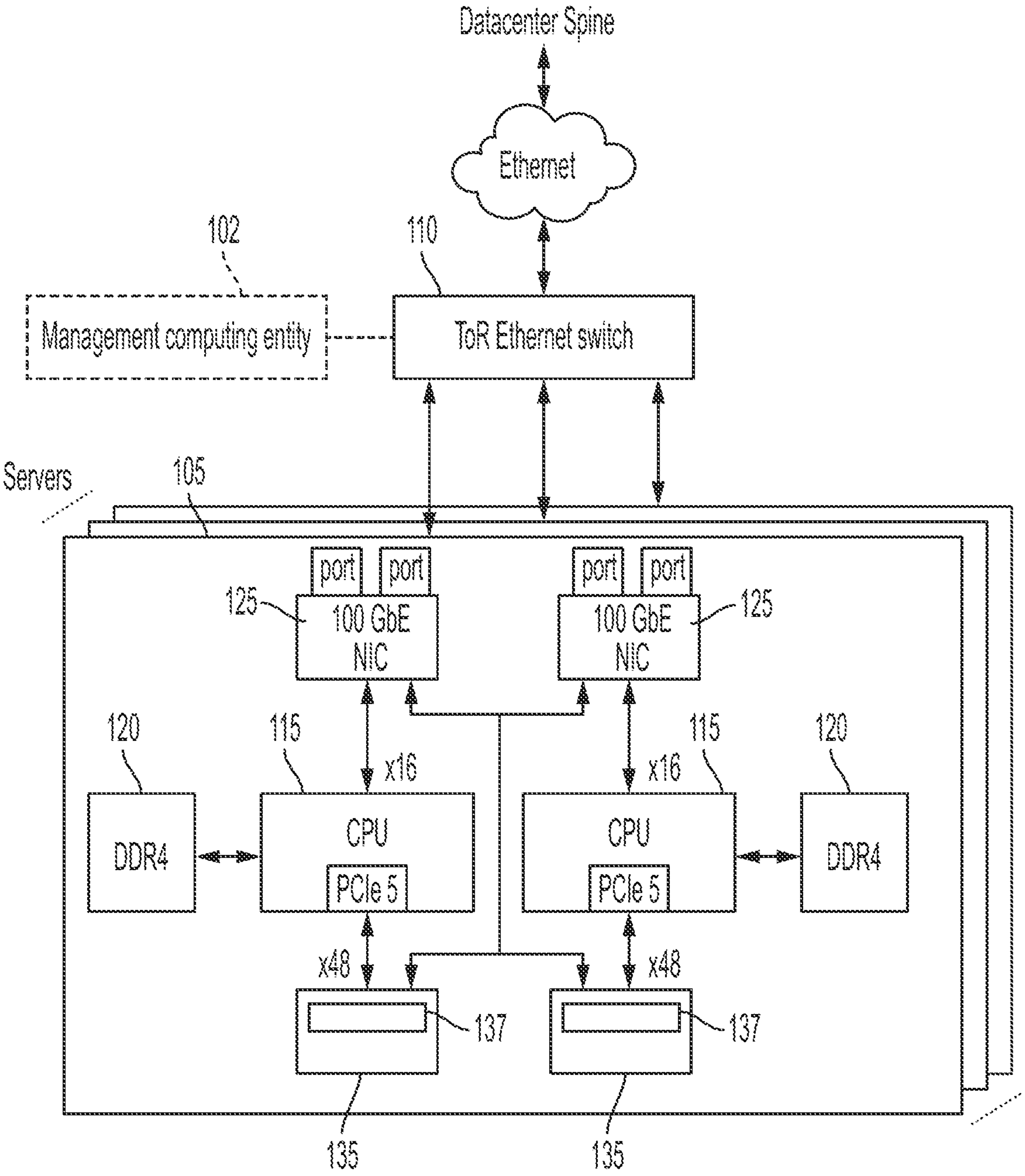
FIG. 1A is a block diagram of a system for attaching memory resources to computing resources using a cache-coherent connection, according to an embodiment of the present disclosure.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state component (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM). Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

In some aspects, networked computation and storage can face some problems with increasing data demands. In particular, hyperscale workload requirements are becoming more demanding, as workloads can exhibit diversity in memory and input/output (IO) latency in addition to having high bandwidth allocation needs. Further, some existing system can have reduced resource elasticity without reconfiguring hardware rack systems, which can lead to inefficiencies that can hamper data processing and storage requirements. Moreover, compute and memory resources are increasingly tightly coupled, and the increasing requirements for one can impact eh requirements for the other. Further, the industry as a whole is facing a shortage of feasible distributed shared memory and large address space systems. In some respects, fixed resources can add to the cost of ownership (e.g., for datacenter-based environments) and can also limit peak performance of subsystems. In some respects, the hardware used in such environments can have different replacement cycles and associated timelines, which can further complicate the updating of such systems. Accordingly, there is a need for improved sharing of resources and match to workloads in networked computing systems.

In some, cache coherent protocols such as compute express link (CXL) may enables memory extensions and coherent accelerators, in various embodiments, the disclosed systems can use a cache coherent protocol such as CXL to enable a class of memory systems and accelerators while accommodating different workloads need unique configurations. Accordingly, the disclosed systems can enable composable cache coherent (e.g., CXL) memory and accelerator resources by leveraging a fabric and architecture that presents a system view to each workload running across the racks, for example, in one or more clusters of a datacenter. In some respects, the disclosed systems can serve to extend cache coherence beyond a single server, provide management of heterogeneous racks based on workload demands, and provide composability of resources. Further, in some examples, CXL over PCIe fabric can act as s counterpart to another protocol such as Non-Volatile Memory express over fabric (NVMeoF), which can be used for remote I/O devices' composability. As used herein, composable can refer to a property through which a given device (e.g., a cache coherent enabled device in a particular cluster) can request and/or obtain resources (e.g., memory, compute, and/or network resources) from a different portion of the network (e.g., at least one other cache coherent enabled device in a second cluster), for example, to execute at least a portion of a workload. In some embodiments, composability, as used herein, can include the use of fluid pools of physical and virtual compute, storage, and fabric resources into any suitable configuration to run any application or workload.

In various embodiments, the disclosed systems can include one or more architecture components including a cache coherent CXL module with one or more processors (e.g., RISC-V processor(s)) which can be configured to execute various operations associated with a control plane. Further, the disclosed systems can enable the use of one or more homogenous pools of cache coherent CXL resources, to be discussed further below, in particular, the disclosed systems can feature a management computing device to expose and exploit performance and capacity and acceleration characteristics of the cache coherent resources for use by various network devices. In particular, the management computing device can determine one or more parameters associated with the system in which the management computing device operates and route workloads to different clusters based on the parameters.

In various embodiments, the disclosed systems can enable the use of multiple homogenous pools of resources, each pool being specialized for a specific cache coherent architecture. In particular, the disclosed systems can use a type-A cluster, which can refer to a collection of servers with direct attached memory extension devices (SCM, DRAM, DRAM-ZNAND hybrid), a Type-B cluster which can refer to a collection of CXL type-2 complaint coherent accelerators, a type-C cluster which can include CXL devices that are connected in a distributed memory system architecture with back-door PCIe interconnects whereby processes share the same address space, and type-D cluster including a physically cluster memory and accelerator extensions in the same structure (e.g., chassis).

In various embodiments, the disclosed systems including the management computing device can feature a smart-device architecture. In particular, the disclosed systems can feature a device that plugs onto a cache coherent interface (e.g., a CXL/PCIe5 interface) and can implement various cache and memory protocols (e.g., type-2 device based CXL.cache and CXL.memory protocols). Further, in some examples, the device can include a programmable controller or a processor (e.g., a RISC-V processor) that can be configured to present the remote coherent devices as part of the local system, negotiated using a cache coherent protocol (e.g., a CXL.IO protocol).

In various embodiments, the disclosed systems can enable a cluster-level performance-based control and management capability whereby workloads can be routed automatically (e.g., via an algorithmic approach and/or machine learning-based approach) based on remote architecture configurations and device performance, power characteristics, and/or the like. In some examples, the disclosed systems can be programmed at least partially via ASIC circuits, FPGA units, and/or the like. Further, such devices can implement an AI-based technique (e.g., a machine learning based methodology) to route the workloads as shown and described herein. Further, the disclosed systems can use the management computing entity to perform discovery and/or workload partitioning and/or resource binding based on a predetermined criterion (e.g., a best performance per unit of currency or power). Further, the management computing entity can perform such operations based on various parameters of the system including, but not limited to, a cache coherent protocol based (e.g., CXL based) round trip time, a determination of whether device is in host bias or device bias, a cache coherent protocol based (e.g., CXL based) switch hierarchy and/or a binding of host upstream ports to device downstream ports, a cache coherent protocol based (e.g., CXL based) switch fabric manager configuration, a cache coherent protocol based (e.g., CXL based) protocol packet or physical medium packet (e.g., a CXL.IO or PCIe intervening bulk 4 KB packet), a network latency, a cache coherent protocol based (e.g., CXL based) memory technology (e.g., type of memory), combinations thereof, and/or the like.

In various embodiments, the management computing entity can operate at a rack and/or cluster level and/or may operate at least partially within a given device (e.g., cache-coherent enabled device) that is part of a given cluster architecture (e.g. types A, B, C, and/or D clusters). In various embodiments, the device within the given cluster architecture can perform a first portion of operations of the management computing entity while another portion of the operations of the management computing entity can be implemented on the rack and/or at the cluster level. In some embodiments, the two portions of operations can be performed in a coordinated manner (e.g., with the device in the cluster sending and receiving coordinating messages to and from the management computing entity implemented on the rack and/or at the cluster level). In some embodiments, the first portion of operations associated with the device in the cluster can include, but not be limited to, operations for determining a current or future resource need by the device or cluster, advertising a current or future resource availability by the device or cluster, synchronizing certain parameters associated with algorithms being run at the device or cluster level, training one or more machine learning modules associated with the device's or rack/cluster's operations, recording corresponding data associated with routing workloads, combinations thereof, and/or the like.

Peripheral Component Interconnect Express (PCIe) can refer to a computer interface which may have a relatively high and variable latency that can limit its usefulness in making connections to memory. CXL is an open industry standard for communications over PCIe 5.0, which can provide fixed, relatively short packet sizes, and, as a result, may be able to provide relatively high bandwidth and relatively low, fixed latency. As such, CXL may be capable of supporting cache coherence and CXL may be well suited for making connections to memory. CXL may further be used to provide connectivity between a host and accelerators, memory devices, and network interface circuits (or "network interface controllers" or network interface cards" (NICs)) in a server.

Cache coherent protocols such as CXL may also be employed for heterogeneous processing, e.g., in scalar, vector, and buffered memory systems. CXL may be used to leverage the channel, the retimers, the PHY layer of a system, the logical aspects of the interface, and the protocols from PCIe 5.0 to provide a cache-coherent interface. The CXL transaction layer may include three multiplexed sub-protocols that run simultaneously on a single link and can be referred to as CXL.io, CXL.cache, and CXL.memory. CXL.io nay include I/O semantics, which may be similar to PCIe. CXL.cache may include caching semantics, and CXL.memory may include memory semantics; both the caching semantics and the memory semantics may be optional. Like PCIe, CXL may support (i) native widths of ×16, ×8, and ×4, which may be partitionable, (ii) a data rate of 32 GT/s, degradable to 8 GT/s and 16 GT/s, 128 b/130 b, (iii) 300 W (75 W in a ×16 connector), and (iv) plug and play. To support plug and play, either a PCIe or a CXL device link may start training in PCIe in Gen 1, negotiate CXL, complete Gen 1-5 training and then start CXL transactions.

In some embodiments, the use of CXL connections to an aggregation, or "pool", of memory (e.g., a quantity of memory, including a plurality of memory cells connected together) may provide various advantages, in a system that includes a plurality of servers connected together by a network, as discussed in further detail below. For example, a CXL switch having further capabilities in addition to providing packet-switching functionality for CXL packets (referred to herein as an "enhanced capability CXL switch") may be used to connect the aggregation of memory to one or more central processing units (CPUs) (or "central processing circuits") and to one or more network interface circuits (which may have enhanced capability). Such a configuration may make it possible (i) for the aggregation of memory to include various types of memory, having different characteristics, (ii) for the enhanced capability CXL switch to virtualize the aggregation of memory, and to store data of different characteristics (e.g., frequency of access) in appropriate types of memory, (iii) for the enhanced capability CXL switch to support remote direct memory access (RDMA) so that RDMA may be performed with little or no involvement from the server's processing circuits. As used herein, to "virtualize" memory means to perform memory address translation between the processing circuit and the memory.

A CXL switch may (i) support memory and accelerator dis-aggregation through single level switching, (ii) enable resources to be off-lined and on-lined between domains, which may enable time-multiplexing across domains, based on demand, and (iii) support virtualization of downstream ports. CXL may be employed to implement aggregated memory, which may enable one-to-many and many-to-one switching (e.g., it may be capable of (i) connecting multiple root ports to one end point, (ii) connecting one root port to multiple end points, or (iii) connecting multiple root ports to multiple end points), with aggregated devices being, in some embodiments, partitioned into multiple logical devices each with a respective LD-ID (logical device identifier). In such an embodiment a physical device may be partitioned into a plurality of logical devices, each visible to a respective initiator. A device may have one physical function (PF) and a plurality (e.g., 16) isolated logical devices. In some embodiments the number of logical devices (e.g., the number of partitions) may be limited (e.g. to 16), and one control partition (which may be a physical function used for controlling the device) may also be present.

In some embodiments, a fabric manager may be employed to (i) perform device discovery and virtual CXL software creation, and to (ii) bind virtual ports to physical ports. Such a fabric manager may operate through connections over an SMBus sideband. The fabric manager may be implemented in hardware, or software, or firmware, or in a combination thereof, and it may reside, for example, in the host, in one of the memory modules 135, or in the enhanced capability cache coherent switch 130, or elsewhere in the network. In some embodiment, the cache coherent switch may be a CXL switch 130. The fabric manager may issue commands including commands issued through a sideband bus or through the PCIe tree.

Referring to FIG. 1A, in some embodiments, a server system includes a plurality of servers 105, connected together by a top of rack (ToR) Ethernet switch 110, While this switch is described as using Ethernet protocol, any other suitable network protocol may be used, Each server includes one or more processing circuits 115, each connected to (i) system memory 120 (e.g. Double Data Rate (version 4) (DDR4) memory or any other suitable memory), (ii) one or more network interface circuits 125, and (iii) one or more CXL memory modules 135. Each of the processing circuits 115 may be a stored-program processing circuit, e.g., a central processing unit (CPU (e.g., an x86 CPU), a graphics processing unit (GPU), or an ARM processor. In some embodiments a network interface circuit 125 may be embedded in (e.g., on the same semiconductor chip as, or in the same module as) one of the memory modules 135, or a network interface circuit 125 may be separately packaged from the memory modules 135.

In various embodiments, a management computing entity 102 (to be described below in detail) can be configured to include a processing element (e.g., a processor, FPGA, ASIC, controller, etc.) that can monitor one or more parameters associated with any portion of the network (e.g., the Ethernet traffic, data center parameters, ToR Ethernet switch 110 parameters, parameters associated with servers 105, network interface circuit (NIC) 125 associated parameters, one or more CXL memory modules 135 associated parameters, combinations thereof, and/or the like) to route workloads and/or portions of workloads to different portions of the network, including any suitable element of FIGS. 1A-1G, described herein. Further, noted above, in various embodiments, the disclosed systems can enable a cluster-level performance-based control and management capability whereby workloads can be routed automatically (e.g., via an algorithmic approach and/or machine learning-based approach) based on remote architecture configurations and device performance, power characteristics, and/or the like. In some examples, the disclosed systems can be programmed at least partially via ASIC circuits. FPGA units, and/or the like. Further, such devices can implement an AI-based technique (e.g., a machine learning based methodology) to route the workloads as shown and described herein. Further, the disclosed systems can use the management computing entity to perform discovery and/or workload partitioning and/or resource binding based on a predetermined criterion (e.g., a best performance per unit of currency or power). Further, the management computing entity can perform such operations based on various parameters of the system including, but not limited to, a cache coherent protocol based (e.g., CXL based) round trip time, a determination of whether device is in host bias or device bias, a cache coherent protocol based (e.g., CXL based) switch hierarchy and/or a binding of host upstream ports to device downstream ports, a cache coherent protocol based (e.g., CXL based) switch fabric manager configuration, a cache coherent protocol based (e.g., CXL based) protocol packet or physical medium packet (e.g. a CXL.IO or PCIe intervening bulk 4 KB packet), a network latency, a cache coherent protocol based (e.g., CXL based) memory technology (e.g., type of memory), combinations thereof, and/or the like.

As used herein, a "memory module" is a package (e.g., a package including a printed circuit board and components connected to it, or an enclosure including a printed circuit board) including one or more memory dies, each memory die including a plurality of memory cells. Each memory die, or each of a set of groups of memory dies, may be in a package (e.g., an epoxy mold compound (EMC) package) soldered to the printed circuit board of the memory module (or connected to the printed circuit board of the memory module through a connector). Each of the memory modules 135 may have a CXL interface and may include a controller 137 (e.g., an FPGA, an ASIC, a processor, and/or the like) for translating between CXL packets and the memory interface of the memory dies, e.g., the signals suitable for the memory technology of the memory in the memory module 135. As used herein, the "memory interface" of the memory dies is the interface that is native to the technology of the memory dies, e.g., in the case of DRAM e.g., the memory interface may be word lines and bit lines. A memory module may also include a controller 137 which may provide enhanced capabilities, as described in further detail below. The controller 137 of each memory modules 135 may be connected to a processing circuit 115 through a cache-coherent interface, e.g., through the CXL interface. The controller 137 may also facilitate data transmissions (e.g., RDMA requests) between different servers 105, bypassing the processing circuits 115. The ToR Ethernet switch 110 and the network interface circuits 125 may include an RDMA interface to facilitate RDMA requests between CXL memory devices on different servers (e.g., the ToR Ethernet switch 110 and the network interface circuits 125 may provide hardware offload or hardware acceleration of RDMA over Converged Ethernet (RoCE). Infiniband, and iWARP packets).

The CXL interconnects in the system may comply with a cache coherent protocol such as the CXL 1.1 standard, or, in some embodiments, with the CXL 2.0 standard, with a future version of CXL, or any other suitable protocol (e.g., cache coherent protocol). The memory modules 135 may be directly attached to the processing circuits 115 as shown, and the top of rack Ethernet switch 110 may be used for scaling the system to larger sizes (e.g., with larger numbers of servers 105).

In some embodiments, each server can be populated with multiple direct-attached CXL attached memory modules 135, as shown in FIG. 1A. Each memory module 135 may expose a set of base address registers (BARs) to the host's Basic Input/Output System (BIOS) as a memory range. One or more of the memory modules 135 may include firmware to transparently manage its memory space behind the host OS map. Each of the memory modules 135 may include one of, or a combination of memory technologies including, for example (but not limited to) Dynamic Random Access Memory (DRAM), not-AND (NAND) flash, High Bandwidth Memory (IBM), and Low-Power Double Data Rate Synchronous Dynamic Random Access Memory (LPDDR SDRAM) technologies, and may also include a cache controller or separate respective split controllers for different technology memory devices (for memory modules 135 that combine several memory devices of different technologies). Each memory module 135 may include different interface widths (×4-×16), and may be constructed according to any of various pertinent form factors, e.g., U.2. M.2, half height, half length (HHHL), full height, half length (FHHL), E1.S, E1.L, E3.S, and E3.H.

In some embodiments, as mentioned above, the enhanced capability CXL switch 130 includes an FPGA (or ASIC) controller 137 and provides additional features beyond switching of CXL packets. The controller 137 of the enhanced capability CXL switch 130 may also act as a management device for the memory modules 135 and help with host control plane processing, and it may enable rich control semantics and statistics. The controller 137 may include an additional "backdoor" (e.g., 100 gigabit Ethernet (GbE)) network interface circuit 125. In some embodiments, the controller 137 presents as a CXL Type 2 device to the processing circuits 115, which enables the issuing of cache invalidate instructions to the processing circuits 115 upon receiving remote write requests. In some embodiments. DDIO technology is enabled, and remote data is first pulled to last level cache (LLC) of the processing circuit and later written to the memory modules 135 (from cache). As used herein, a "Type 2" CXL Device is one that can initiate transactions and that implements an optional coherent cache and host-managed device memory and for which applicable transaction types include all CXL.cache and all CXL.memory transactions.

As mentioned above, one or more of the memory modules 135 may include persistent memory, or "persistent storage" (i.e., storage within which data is not lost when external power is disconnected), If a memory module 135 is presented as a persistent device, the controller 137 of the memory module 135 may manage the persistent domain, e.g., it may store, in the persistent storage data identified (e.g., as a result of an application making a call to a corresponding operating system function) by a processing circuit 115 as requiring persistent storage. In such an embodiment, a software API may flush caches and data to the persistent storage.

In some embodiments, direct memory transfer to the memory modules 135 from the network interface circuits 125 is enabled. Such transfers may be a one-way transfers to remote memory for fast communication in a distributed system. In such an embodiment, the memory modules 135 may expose hardware details to the network interface circuits 125 in the system to enable faster RDMA transfers. In such a system, two scenarios may occur, depending on whether the Data Direct I/O (DDIO) of the processing circuit 115 is enabled or disabled. DDIO may enable direct communication between an Ethernet controller or an Ethernet adapter and a cache of a processing circuit 115. If the DDIO of the processing circuit 115 is enabled, the transfer's target may be the last level cache of the processing circuit, from which the data may subsequently be automatically flushed to the memory modules 135. If the DDIO of the processing circuit 115 is disabled, the memory modules 135 may operate in device-bias mode to force accesses to be directly received by the destination memory module 135 (without DDIO). An RDMA-capable network interface circuit 125 with host channel adapter (HCA), buffers, and other processing, may be employed to enable such an RDMA transfer, which may bypass the target memory buffer transfer that may be present in other modes of RDMA transfer. For example, in such an embodiment, the use of a bounce buffer (e.g., a buffer in the remote server, when the eventual destination in memory is in an address range not supported by the RDMA protocol) may be avoided. In some embodiments, RDMA uses another physical medium option, other than Ethernet (e.g., for use with a switch that is configured to handle other network protocols). Examples of inter-server connections that may enable RDMA include (but are not limited to) Infiniband. RDMA over Converged Ethernet (RoCE) (which uses Ethernet User Datagram Protocol (UDP)), and iWARP (which uses transmission control protocol/Internet protocol (TCP/IP)).

Figure 1B:
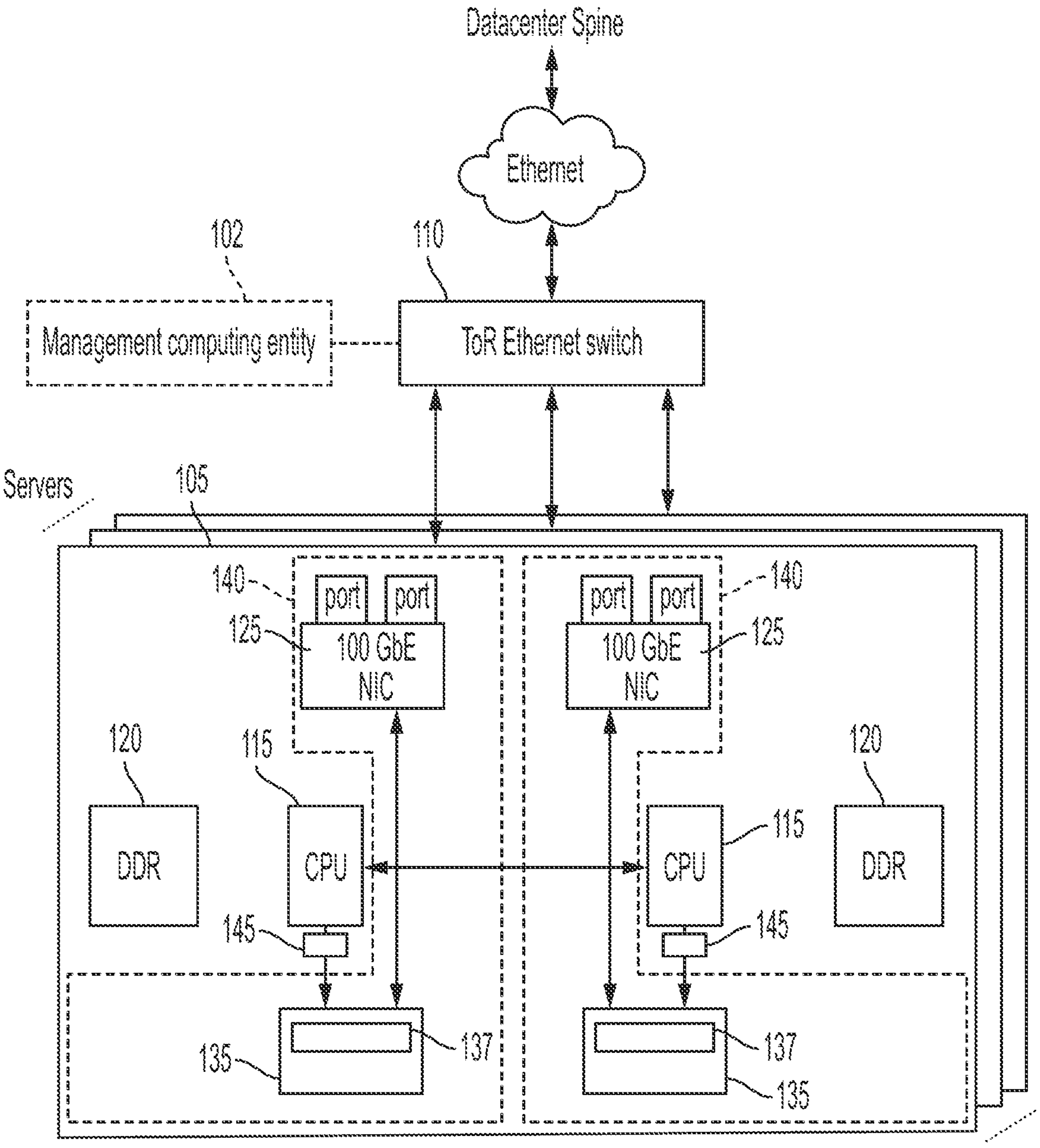
FIG. 1B is a block diagram of a system, employing expansion socket adapters, for attaching memory resources to computing resources using a cache-coherent connection, according to an embodiment of the present disclosure.

FIG. 1B shows a system similar to that of FIG. 1A, in which the processing circuits 115 are connected to the network interface circuits 125 through the memory modules 135. The memory modules 135 and the network interface circuits 125 are on expansion socket adapters 140. Each expansion socket adapter 140 may plug into an expansion socket 145, e.g., a M.2 connector, on the motherboard of the server 105. As such, the server may be any suitable (e.g., industry standard) server, modified by the installation of the expansion socket adapters 140 in expansion sockets 145. In such an embodiment. (i) each network interface circuit 125 may be integrated into a respective one of the memory modules 135, or (ii) each network interface circuit 125 may have a PCIe interface (the network interface circuit 125 may be a PCIe endpoint (i.e., a PCIe slave device)), so that the processing circuit 115 to which it is connected (which may operate as the PCIe master device, or "root port") may communicate with it through a root port to endpoint PCIe connection, and the controller 137 of the memory module 135 may communicate with it through a peer-to-peer PCIe connection.

According to an embodiment of the present invention, there is provided a system, including: a first server, including: a stored-program processing circuit, a first network interface circuit, and a first memory module, wherein: the first memory module includes: a first memory die, and a controller, the controller being connected; to the first memory die through a memory interface, to the stored-program processing circuit through a cache-coherent interface, and to the first network interface circuit. In some embodiments: the first memory module further includes a second memory die, the first memory die includes volatile memory, and the second memory die includes persistent memory. In some embodiments, the persistent memory includes NAND flash. In some embodiments, the controller is configured to provide a flash translation layer for the persistent memory, in some embodiments, the cache-coherent interface includes a Compute Express Link (CXL) interface. In some embodiments, the first server includes an expansion socket adapter, connected to an expansion socket of the first server, the expansion socket adapter including: the first memory module; and the first network interface circuit. In some embodiments, the controller of the first memory module is connected to the stored-program processing circuit through the expansion socket. In some embodiments, the expansion socket includes an M.2 socket. In some embodiments, the controller of the first memory module is connected to the first network interface circuit by a peer to peer Peripheral Component Interconnect Express (PCIe) connection, in some embodiments, the system further includes: a second server, and a network switch connected to the first server and to the second server. In some embodiments, the network switch includes a top of rack (ToR) Ethernet switch. In some embodiments, the controller of the first memory module is configured to receive straight remote direct memory access (RDMA) requests, and to send straight RDMA responses. In some embodiments, the controller of the first memory module is configured to receive straight remote direct memory access (RDMA) requests through the network switch and through the first network interface circuit, and to send straight RDMA responses through the network switch and through the first network interface circuit, in some embodiments, the controller of the first memory module is configured to: receive data, from the second server; store the data in the first memory module; and send, to the stored-program processing circuit, a command for invalidating a cache line. In some embodiments, the controller of the first memory module includes a field programmable gate array (FPGA) or an application-specific integrated circuit (ASIC). According to an embodiment of the present invention, there is provided a method for performing remote direct memory access in a computing system, the computing system including: a first server and a second server, the first server including: a stored-program processing circuit, a network interface circuit, and a first memory module including a controller, the method including: receiving, by the controller of the first memory module, a straight remote direct memory access (RDMA) request; and sending, by the controller of the first memory module, a straight RDMA response. In some embodiments: the computing system further includes an Ethernet switch connected to the first server and to the second server, and the receiving of the straight RDMA request includes receiving the straight RDMA request through the Ethernet switch. In some embodiments, the method further includes: receiving, by the controller of the first memory module, a read command, from the stored-program processing circuit, for a first memory address, translating, by the controller of the first memory module, the first memory address to a second memory address, and retrieving, by the controller of the first memory module, data from the first memory module at the second memory address. In some embodiments, the method further includes: receiving data, by the controller of the first memory module, storing, by the controller of the first memory module, the data in the first memory module, and sending, by the controller of the first memory module, to the stored-program processing circuit, a command for invalidating a cache line. According to an embodiment of the present invention, there is provided a system, including: a first server, including: a stored-program processing circuit, a first network interface circuit, and a first memory module, wherein: the first memory module includes: a first memory die, and controller means, the controller means being connected; to the first memory die through a memory interface, to the stored-program processing circuit through a cache-coherent interface, and to the first network interface circuit.

Figure 1C:
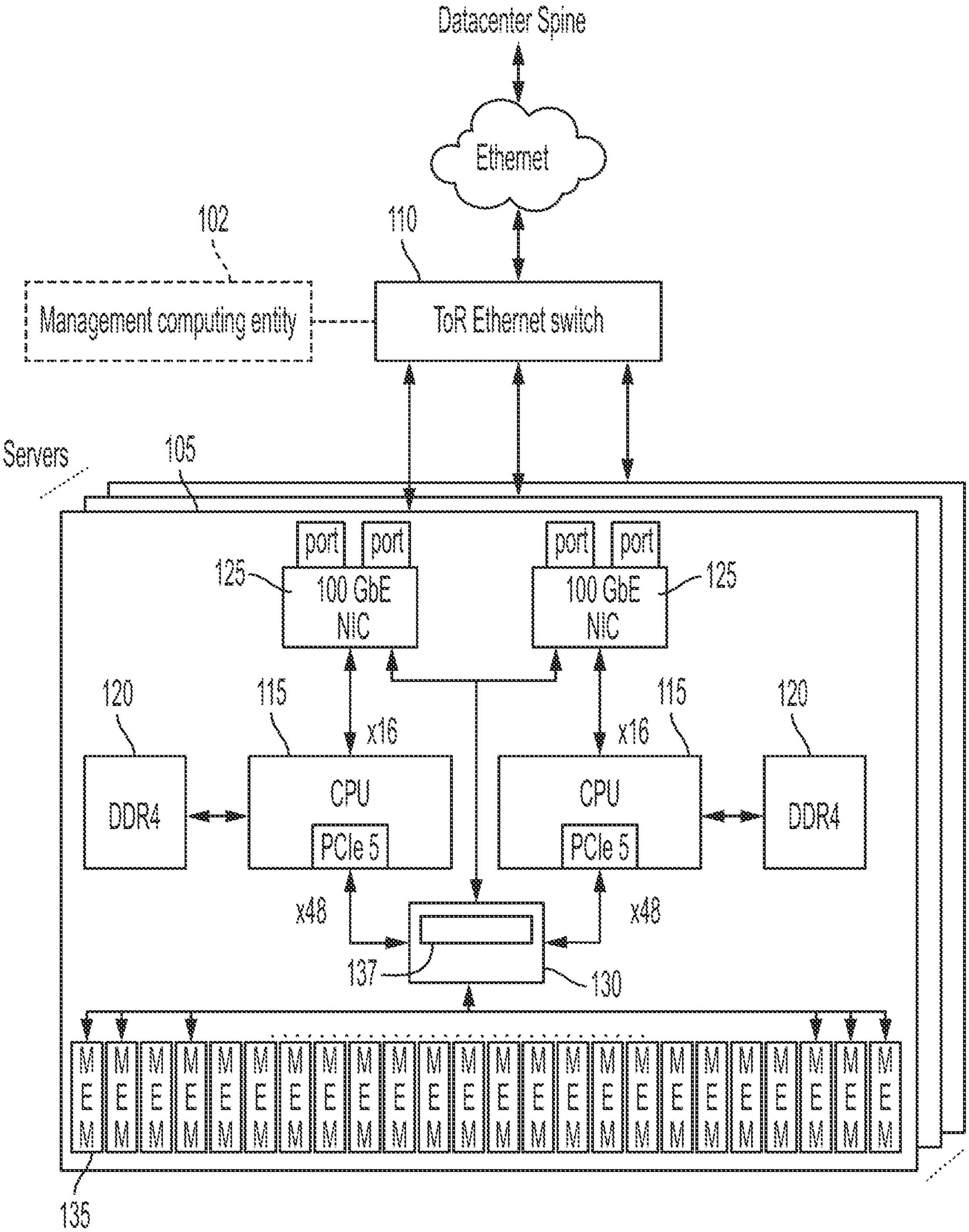
FIG. 1C is a block diagram of a system for aggregating memory employing an Ethernet top of rack (ToR) switch, according to an embodiment of the present disclosure.

Referring to FIG. 1C, in some embodiments, a server system includes a plurality of servers 105, connected together by a top of rack (ToR) Ethernet switch 110. Each server includes one or more processing circuits 115, each connected to (i) system memory 120 (e.g., DDR4 memory), (ii) one or more network interface circuits 125, and (iii) an enhanced capability CXL switch 130. The enhanced capability CXL switch 130 may be connected to a plurality of memory modules 135. That is, the system of FIG. 1C includes a first server 105, including a stored-program processing circuit 115, a network interface circuit 125, a cache-coherent switch 130, and a first memory module 135. In the system of FIG. 1C, the first memory module 135 is connected to the cache-coherent switch 130, the cache-coherent switch 130 is connected to the network interface circuit 125, and the stored-program processing circuit 115 is connected to the cache-coherent switch 130.

The memory modules 135 may be grouped by type, form factor, or technology type (e.g., DDR4, DRAM, LDPPR, high bandwidth memory (HBM), or NAND flash, or other persistent storage (e.g., solid state drives incorporating NAND flash)). Each memory module may have a CXL interface and include an interface circuit for translating between CXL packets and signals suitable for the memory in the memory module 135. In some embodiments, these interface circuits are instead in the enhanced capability CXL switch 130, and each of the memory modules 135 has an interface that is the native interface of the memory in the memory module 135. In some embodiments, the enhanced capability CXL switch 130 is integrated into (e.g., in an M.2 form factor package with, or integrated into a single integrated circuit with other components of) a memory module 135.

The ToR Ethernet switch 110 may include interface hardware to facilitate RDMA requests between aggregated memory devices on different servers. The enhanced capability CXL switch 130 may include one or more circuits (e.g., it may include an FPGA or an ASIC) to (i) route data to different memory types based on workload (ii) virtualize host addresses to device addresses and/or (iii) facilitate RDMA requests between different servers, bypassing the processing circuits 115.

The memory modules 135 may be in an expansion box (e.g., in the same rack as the enclosure housing the motherboard of the enclosure), which may include a predetermined number (e.g., more than 20 or more than 100) memory modules 135, each plugged into a suitable connector. The modules may be in an M, form factor, and the connectors may be M.2 connectors. In some embodiments, the connections between servers are over a different network, other than Ethernet, e.g., they may be wireless connections such as WiFi or 5G connections. Each processing circuit may be an x86 processor or another processor, e.g., an ARM processor or a GPU. The PCIe links on which the CXL links are instantiated may be PCIe 5.0 or another version (e.g., an earlier version or a later (e.g., future) version (e.g., PCIe 6.0). In some embodiments, a different cache-coherent protocol is used in the system instead of, or in addition to, CXL, and a different cache coherent switch may be used instead of, or in addition to, the enhanced capability CXL switch 130. Such a cache coherent protocol may be another standard protocol or a cache coherent variant of the standard protocol (in a manner analogous to the manner in which CXL is a variant of PCIe 5.0). Examples of standard protocols include, but are not limited to, non-volatile dual in-line memory module (version P) (NVDIMM-P), Cache Coherent interconnect for Accelerators (CCIX), and Open Coherent Accelerator Processor Interface (OpenCAPI).

The system memory 120 may include, e.g., DDR4 memory, DRAM, HBM, or LDPPR memory. The memory modules 135 may be partitioned or contain cache controllers to handle multiple memory types. The memory modules 135 may be in different form factors, examples of which include but are not limited to HHHL, FHHL, M.2, U.2, mezzanine card, daughter card, E1.S, E1.L, E3.L, and E3.S.

In some embodiments, the system implements an aggregated architecture, including multiple servers, with each server aggregated with multiple CXL-attached memory modules 135. Each of the memory modules 135 may contain multiple partitions that can separately be exposed as memory devices to multiple processing circuits 115. Each input port of the enhanced capability CXL switch 130 may independently access multiple output ports of the enhanced capability CXL switch 130 and the memory modules 135 connected thereto. As used herein, an "input port" or "upstream port" of the enhanced capability CXL switch 130 is a port connected to (or suitable for connecting to) a PCIe root port, and an "output port" or "downstream port" of the enhanced capability CXL switch 130 is a port connected to (or suitable for connecting to) a PCIe endpoint. As in the case of the embodiment of FIG. 1A, each memory module 135 may expose a set of base address registers (BARs) to host BIOS as a memory range. One or more of the memory modules 135 may include firmware to transparently manage its memory space behind the host OS map.

In some embodiments, as mentioned above, the enhanced capability CXL switch 130 includes an FPGA (or ASIC) controller 137 and provides additional features beyond switching of CXL packets. For example, it may (as mentioned above) virtualize the memory modules 135, i.e., operate as a translation layer, translating between processing circuit-side addresses (or "processor-side" addresses, i.e., addresses that are included in memory read and write commands issued by the processing circuits 115) and memory-side addresses (i.e., addresses employed by the enhanced capability CXL switch 130 to address storage locations in the memory modules 135), thereby masking the physical addresses of the memory modules 135 and presenting a virtual aggregation of memory. The controller 137 of the enhanced capability CXL switch 130 may also act as a management device for the memory modules 135 and facilitate with host control plane processing. The controller 137 may transparently move data without the participation of the processing circuits 115 and accordingly update the memory map (or "address translation table") so that subsequent accesses function as expected. The controller 137 may contain a switch management device that (i) can bind and unbind the upstream and downstream connections during runtime as appropriate, and (iii) can enable rich control semantics and statistics associated with data transfers into and out of the memory modules 135. The controller 137 may include an additional "backdoor" 100 GbE or other network interface circuit 125 (in addition to the network interface used to connect to the host) for connecting to other servers 105 or to other networked equipment. In some embodiments, the controller 137 presents as a Type 2 device to the processing circuits 115, which enables the issuing of cache invalidate instructions to the processing circuits 115 upon receiving remote write requests. In some embodiments, DDIO technology is enabled, and remote data is first pulled to last level cache (LLC) of the processing circuit 115 and later written to the memory modules 135 (from cache).

As mentioned above, one or more of the memory modules 135 may include persistent storage. If a memory module 135 is presented as a persistent device, the controller 137 of the enhanced capability CXL switch 130 may manage the persistent domain (e.g., it may store, in the persistent storage, data identified (e.g., by the use of a corresponding operating system function) by a processing circuit 115 as requiring persistent storage. In such an embodiment, a software API may flush caches and data to the persistent storage.

In some embodiments, direct memory transfer to the memory modules 135 may be performed in a manner analogous to that described above for the embodiment of FIGS. 1A and 1B, with operations performed by the controllers of the memory modules 135 being, performed by the controller 137 of the enhanced capability CXL switch 130.

As mentioned above, in some embodiments, the memory modules 135 are organized into groups, e.g., into one group which is memory intensive, another group which is HBM heavy, another group which has limited density and performance, and another group that has a dense capacity. Such groups may have different form factors or be based on different technologies. The controller 137 of the enhanced capability CXL switch 130 may route data and commands intelligently based on, for example, a workload, a tagging, or a quality of service (QoS). For read requests, there may be no routing based on such factors.

The controller 137 of the enhanced capability CXL switch 130 may also (as mentioned above) virtualize the processing-circuit-side addresses and memory-side addresses, making it possible for the controller 137 of the enhanced capability CXL switch 130 to determine where data is to be stored. The controller 137 of the enhanced capability CXL switch 130 may make such a determination based on information or instructions it may receive from a processing circuit 115. For example, the operating system may provide a memory allocation feature making it possible for an application to specify that low-latency storage, or high bandwidth storage, or persistent storage is to be allocated, and such a request, initiated by the application, may then be taken into account by the controller 137 of the enhanced capability CXL switch 130 in determining where (e.g. in which of the memory modules 135) to allocate the memory.

For example, storage for which high bandwidth is requested by the application may be allocated in memory modules 135 containing HBM, storage for which data persistence is requested by the application may be allocated in memory modules 135 containing NAND flash, and other storage (for which the application has made no requests) may be stored on memory modules 135 containing relatively inexpensive DRAM. In some embodiments, the controller 137 of the enhanced capability CXL switch 130 may make determinations about where to store certain data based on network usage patterns. For example, the controller 137 of the enhanced capability CXL switch 130 may determine, by monitoring usage patterns, that data in a certain range of physical addresses are being accessed more frequently than other data, and the controller 137 of the enhanced capability CXL switch 130 may then copy these data into a memory module 135 containing HBM, and modify its address translation table so that the data, in the new location, are stored in the same range of virtual addresses. In some embodiments one or more of the memory modules 135 includes flash memory (e.g., NAND flash), and the controller 137 of the enhanced capability CXL switch 130 implements a flash translation layer for this flash memory. The flash translation layer may support overwriting of processor-side memory locations (by moving the data to a different location and marking the previous location of the data as invalid) and it may perform garbage collection (e.g., erasing a block, after moving, to another block, any valid data in the block, when the fraction of data in the block marked invalid exceeds a threshold).

In some embodiments, the controller 137 of the enhanced capability CXL switch 130 may facilitate a physical function (PF) to PF transfer. For example, if one of the processing circuits 115 needs to move data from one physical address to another (which may have the same virtual addresses; this fact need not affect the operation of the processing circuit 115), or if the processing circuit 115 needs to move data between two virtual addresses (which the processing circuit 115 would need to have) the controller 137 of the enhanced capability CXL switch 130 may supervise the transfer, without the involvement of the processing circuit 115. For example, the processing circuit 115 may send a CXL request, and data may be transmitted from one memory module 135 to another memory module 135 (e.g., the data may be copied from one memory module 135 to another memory module 135) behind the enhanced capability CXL switch 130 without going to the processing circuit 115. In this situation, because the processing circuit 115 initiated the CXL request, the processing circuit 115 may need to flush its cache to ensure consistency. If instead a Type 2 memory device (e.g., one of the memory modules 135, or an accelerator that may also be connected to the CXL switch) initiates the CXL request and the switch is not virtualized, then the Type 2 memory device may send a message to the processing circuit 115 to invalidate the cache.

In some embodiments, the controller 137 of the enhanced capability CXL switch 130 may facilitate RDMA requests between servers. A remote server 105 may initiate such an RDMA request, and the request may be sent through the ToR Ethernet switch 110, and arrive at the enhanced capability CXL switch 130 in the server 105 responding to the RDMA request (the "local server"). The enhanced capability CXI, switch 130 may be configured to receive such an RDMA request and it may treat a group of memory modules 135 in the receiving server 105 (i.e., the server receiving the RDMA request) as its own memory space. In the local server, the enhanced capability CXL switch 130 may receive the RDMA request as a direct RDMA request (i.e., an RDMA request that is not routed through a processing circuit 115 in the local server) and it may send a direct response to the RDMA request (i.e., it may send the response without it being routed through a processing circuit 115 in the local server). In the remote server, the response (e.g., data sent by the local server) may be received by the enhanced capability CXL switch 130 of the remote server, and stored in the memory modules 135 of the remote server, without being routed through a processing circuit 115 in the remote server.

Figure 1D:
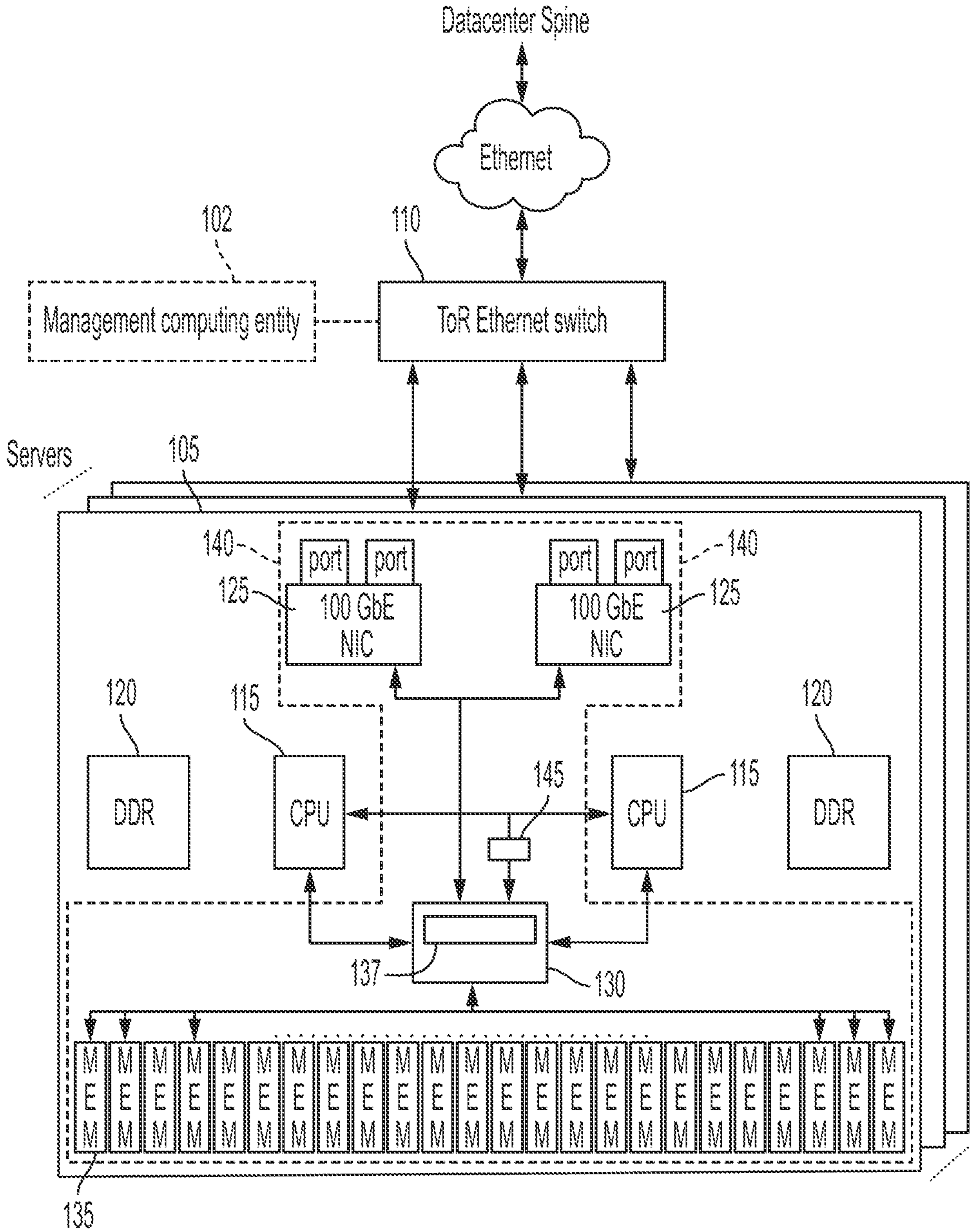
FIG. 1D is a block diagram of a system for aggregating memory employing an Ethernet ToR switch and an expansion socket adapter, according to an embodiment of the present disclosure.

FIG. 1D shows a system similar to that of FIG. 1C, in which the processing circuits 115 are connected to the network interface circuits 125 through the enhanced capability CXL switch 130. The enhanced capability CXL switch 130, the memory modules 135, and the network interface circuits 125 are on an expansion socket adapter 140, The expansion socket adapter 140 may be a circuit board or module that plugs into an expansion socket, e.g., a PCIe connector 145, on the motherboard of the server 105. As such, the server may be any suitable server, modified only by the installation of the expansion socket adapter 140 in the PCIe connector 145. The memory modules 135 may be installed in connectors (e.g., M.2 connectors) on the expansion socket adapter 140. In such an embodiment, (i) the network interface circuits 125 may be integrated into the enhanced capability CXL switch 130, or (ii) each network interface circuit 125 may have a PCIe interface (the network interface circuit 125 may be a PCIe endpoint), so that the processing circuit 115 to which it is connected may communicate with the network interface circuit 125 through a root port to endpoint PCIe connection. The controller 137 of the enhanced capability CXL switch 130 (which may have a PCIe input port connected to the processing circuit 115 and to the network interface circuits 125) may communicate with the network interface circuit 125 through a peer-to-peer PCIe connection.

Figure 1E:
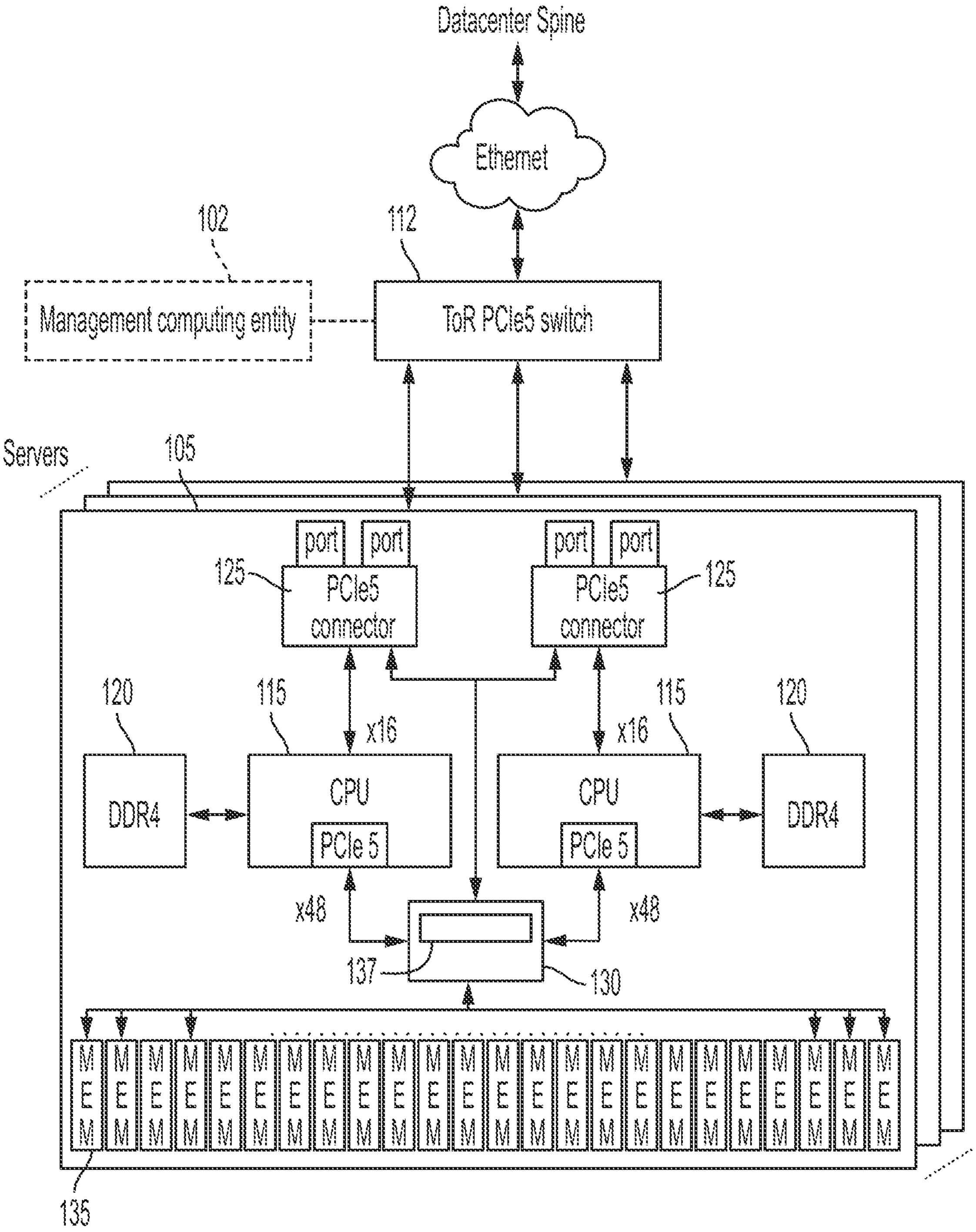
FIG. 1E is a block diagram of a system for aggregating memory, according to an embodiment of the present disclosure.

According to an embodiment of the present invention, there is provided a system, including: a first server, including: a stored-program processing circuit, a network interface circuit, a cache-coherent switch, and a first memory module, wherein: the first memory module is connected to the cache-coherent switch, the cache-coherent switch is connected to the network interface circuit, and the stored-program processing circuit is connected to the cache-coherent switch. In some embodiments, the system further includes a second memory module connected to the cache-coherent switch, wherein the first memory module includes volatile memory and the second memory module includes persistent memory. In some embodiments, the cache-coherent switch is configured to virtualize the first memory module and the second memory module. In some embodiments, the first memory module includes flash memory, and the cache-coherent switch is configured to provide a flash translation layer for the flash memory. In some embodiments, the cache-coherent switch is configured to: monitor an access frequency of a first memory location in the first memory module; determine that the access frequency exceeds a first threshold; and copy the contents of the first memory location into a second memory location, the second memory location being in the second memory module. In some embodiments, the second memory module includes high bandwidth memory (HBM). In some embodiments, the cache-coherent switch is configured to maintain a table for mapping processor-side addresses to memory-side addresses. In some embodiments, the system further includes: a second server, and a network switch connected to first server and the second server. In some embodiments, the network switch includes a top of rack (ToR) Ethernet switch. In some embodiments, the cache-coherent switch is configured to receive straight remote direct memory access (RDMA) requests, and to send straight RDMA responses. In some embodiments, the cache-coherent switch is configured to receive the remote direct memory access (RDMA) requests through the ToR Ethernet switch and through the network interface circuit, and to send straight RDMA responses through the ToR Ethernet switch and through the network interface circuit. In some embodiments, the cache-coherent switch is configured to support a Compute Express Link (CXL) protocol. In some embodiments, the first server includes an expansion socket adapter, connected to an expansion socket of the first server, the expansion socket adapter including: the cache-coherent switch, and a memory module socket, the first memory module being connected to the cache-coherent switch through the memory module socket. In some embodiments, the memory module socket includes an M.2 socket. In some embodiments, the network interface circuit is on the expansion socket, adapter. According to an embodiment of the present invention, there is provided a method for performing remote direct memory access in a computing system, the computing system including: a first server and a second server, the first server including: a stored-program processing circuit, a network interface circuit, a cache-coherent switch, and a first memory module, the method including: receiving, by the cache-coherent switch, a straight remote direct memory access (RDMA) request, and sending, by the cache-coherent switch, a straight RDMA response. In some embodiments; the computing system further includes an Ethernet switch, and the receiving of the straight RDMA request includes receiving the straight RDMA request through the Ethernet switch. In some embodiments, the method further includes: receiving, by the cache-coherent switch, a read command, from the stored-program processing circuit, for a first memory address, translating, by the cache-coherent switch, the first memory address to a second memory address, and retrieving, by the cache-coherent switch, data from the first memory module at the second memory address. In some embodiments, the method further includes: receiving data, by the cache-coherent switch, storing, by the cache-coherent switch, the data in the first memory module, and sending, by the cache-coherent switch, to the stored-program processing circuit, a command for invalidating a cache line. According to an embodiment of the present invention, there is provided a system, including: a first server, including: a stored-program processing circuit, a network interface circuit, cache-coherent switching means, and a first memory module, wherein: the first memory module is connected to the cache-coherent switching means, the cache-coherent switching means is connected to the network interface circuit, and the stored-program processing circuit is connected to the cache-coherent switching means, FIG. 1E shows an embodiment in which each of a plurality of servers 105 is connected to a ToR server-linking switch 112, which may be a PCIe 5.0 CXL switch, having PCIe capabilities, as illustrated. The server-linking switch 112 may include an FPGA or ASIC, and may provide performance (in terms of throughput and latency) superior to that of an Ethernet switch. Each of the servers 105 may include a plurality of memory modules 135 connected to the server-linking switch 112 through the enhanced capability CXL switch 130 and through a plurality of PCIe connectors, Each of the servers 105 may also include one or more processing circuits 115, and system memory 120, as shown. The server-linking switch 112 may operate as a master, and each of the enhanced capability CXL switches 130 may operate as a slave, as discussed in further detail below.

In the embodiment of FIG. 1E, the server-linking switch 112 may group or batch multiple cache requests received from different servers 105, and it may group packets, reducing control overhead. The enhanced capability CXL switch 130 may include a slave controller (e.g., a slave FPGA or a slave ASIC) to (i) route data to different memory types based on workload, (ii) virtualize processor-side addresses to memory-side addresses, and (iii) facilitate coherent requests between different servers 105, bypassing the processing circuits 115. The system illustrated in FIG. 1E may be CXL 2.0 based, it may include distributed shared memory within a rack, and it may use the ToR server-linking switch 112 to natively connect with remote nodes.

The ToR server-linking switch 112 may have an additional network connection (e.g., an Ethernet connection, as illustrated, or another kind of connection, e.g., a wireless connection such as a WiFi connection or a 5G connection) for making connections to other servers or to clients. The server-linking switch 112 and the enhanced capability CXL switch 130 may each include a controller, which may be or include a processing circuit such as an ARM processor. The PCIe interfaces may comply with the PCIe 5.0 standard or with an earlier version, or with a future version of the PCIe standard, or interfaces complying with a different standard (e.g., NVDIMM-P. CCIX, or OpenCAPI) may be employed instead of PCIe interfaces. The memory modules 135 may include various memory types including DDR4 DRAM. HBM, LDPPR. NAND flash, or solid state drives (SSDs). The memory modules 135 may be partitioned or contain cache controllers to handle multiple memory types, and they may be in different form factors, such as HHHL, FHHL, M.2, U.2, mezzanine card, daughter card, E1.S, E1.L, E3.L, or E3.S.

In the embodiment of FIG. 1E, the enhanced capability CXL switch 130 may enable one-to-many and many-to-one switching, and it may enable a fine grain load-store interface at the flit (64-byte) level. Each server may have aggregated memory devices, each device being partitioned into multiple logical devices each with a respective LD-ID. A ToR switch 112 (which may be referred to as a “server-linking switch” enables the one-to-many functionality, and the enhanced capability CXL switch 130 in the server 105 enables the many-to-one functionality. The server-linking switch 112 may be a PCIe switch, or a CXL switch, or both. In such a system, the requesters may be the processing circuits 115 of the multiple servers 105, the responders may be the many aggregated memory modules 135. The hierarchy of two switches (with the master switch being, as mentioned above, the server-linking switch 112, and the slave switch being the enhanced capability CXL switch 130) enables any-any communication. Each of the memory modules 135 may have one physical function (PF) and as many as 16 isolated logical devices. In some embodiments the number of logical devices (e.g., the number of partitions) may be limited (e.g. to 16), and one control partition (which may be a physical function used for controlling the device) may also be present. Each of the memory modules 135 may be a Type 2 device with CXL.cache, CXL.memory and CXL.io and address translation service (ATS) implementation to deal with cache line copies that the processing circuits 115 may hold. The enhanced capability CXL switch 130 and a fabric manager may control discovery of the memory modules 135 and (i) perform device discovery, and virtual CXL software creation, and (ii) bind virtual to physical ports. As in the embodiments of FIGS. 1A-ID, the fabric manager may operate through connections over an SMBus sideband. An interface to the memory modules 135, which may be Intelligent Platform Management Interface (IPMI) or an interface that complies with the Redfish standard (and that may also provide additional features not required by the standard), may enable configurability.

As mentioned above, some embodiments implement a hierarchical structure with a master controller (which may be implemented in an FPGA or in an ASIC) being part of the server-linking switch 112, and a slave controller being part of the enhanced capability CXL switch 130, to provide a load-store interface (i.e., an interface having cache-line (e.g., 64 byte) granularity and that operates within the coherence domain without software driver involvement). Such a load-store interface may extend the coherence domain beyond an individual server, or CPU or host, and may involve a physical medium that is either electrical or optical (e.g., an optical connection with electrical-to-optical transceivers at both ends). In operation, the master controller (in the server-linking switch 112) boots (or "reboots") and configures all the servers 105 on the rack. The master controller may have visibility on all the hosts, and it may (i) discover each server and discover how many servers 105 and memory modules 135 exist in the server cluster, (ii) configure each of the servers 105 independently, (iii) enable or disable some blocks of memory (e.g., enable or disable any of the memory modules 135) on different servers, based on, e.g., the configuration of the racks, (iv) control access (e.g., which server can control which other server), (v) implement flow control (e.g. it may, since all host and device requests go through the master, transmit data from the one server to another server, and perform flow control on the data), (vi) group or batch requests or packets (e.g., multiple cache requests being received by the master from different servers 105), and (vii) receive remote software updates, broadcast communications, and the like. In batch mode, the server-linking switch 112 may receive a plurality of packets destined for the same server (e.g., destined for a first server) and send them together (i.e., without a pause between them) to the first server. For example, server-linking switch 112 may receive a first packet, from a second server, and a second packet, from a third server, and transmit the first packet and the second packet, together, to the first server. Each of the servers 105 may expose, to the master controller, (i) an IPMI network interface, (ii) a system event log (SEL), and (iii) a board management controller (BMC), enabling the master controller to measure performance, to measure reliability on the fly, and to reconfigure the servers 105.

In some embodiments, a software architecture that facilitates a high availability load-store interface is used. Such a software architecture may provide reliability, replication, consistency, system coherence, hashing, caching, and persistence. The software architecture may provide reliability (in a system with a large number of servers), by performing periodic hardware checks of the CXL device components via IPMI. For example, the server-linking switch 112 may query a status of a memory server 150, through an IPMI interface, of the memory server 150, querying, for example, the power status (whether the power supplies of the memory server 150 are operating properly), the network status (whether the interface to the server-linking switch 112 is operating properly) and an error check status (whether an error condition is present in any of the subsystems of the memory server 150). The software architecture may provide replication, in that the master controller may replicate data stored in the memory modules 135 and maintain data consistency across replicas.

The software architecture may provide consistency in that the master controller may be configured with different consistency levels, and the server-linking switch 112 may adjust the packet format according to the consistency level to be maintained. For example, if eventual consistency is being maintained, the server-linking switch 112 may reorder the requests, while to maintain strict consistency, the server-linking switch 112 may maintain a scoreboard of all requests with precise timestamps at the switches. The software architecture may provide system coherence in that multiple processing circuits 115 may be reading from or writing to the same memory address, and the master controller may, to maintain coherence, be responsible for reaching the home node of the address (using a directory lookup) or broadcasting the request on a common bus.

The software architecture may provide hashing in that the server-linking switch 112 and the enhanced capability CXL switch may maintain a virtual mapping of addresses which may use consistent hashing with multiple hash functions to evenly map data to all CXL devices across all nodes at boot-up (or to adjust when one server goes down or comes up). The software architecture may provide caching in that the master controller may designate certain memory partitions (e.g., in a memory module 135 that includes HBM or a technology with similar capabilities) to act as cache (employing write-through caching or write-back caching, for example). The software architecture may provide persistence in that the master controller and the slave controller may manage persistent domains and flushes.

In some embodiments, the capabilities of the CXL switch are integrated into the controller of a memory module 135. In such an embodiment, the server-linking switch 112 may nonetheless act as a master and have enhanced features as discussed elsewhere herein. The server-linking switch 112 may also manage other storage devices in the system, and it may have an Ethernet connection (e.g., a 100 GbE connection), for connecting, e.g., to client machines that are not part of the PCIe network formed by the server-linking switch 112.

In some embodiments, the server-linking switch 112 has enhanced capabilities and also includes an integrated CXL controller. In other embodiments, the server-linking switch 112 is only a physical routing device, and each server 105 includes a master CXL controller. In such an embodiment, masters across different servers may negotiate a master-slave architecture. The intelligence functions of (i) the enhanced capability CXL switch 130 and of (ii) the server-linking switch 112 may be implemented in one or more FPGAs, one or more ASICs, one or more ARM processors, or in one or more SSD devices with compute capabilities. The server-linking switch 112 may perform flow control, e.g., by reordering independent requests. In some embodiments, because the interface is load-store, RDMA is optional but there may be intervening RDMA requests that use the PCIe physical medium (instead of 100 GbE). In such an embodiment, a remote host may initiate an RDMA request, which may be transmitted to the enhanced capability CXL switch 130 through the server-linking switch 112. The server-linking switch 112 and the enhanced capability CXL switch 130 may prioritize RDMA 4 KB requests, or CXL's flit (64-byte) requests.

As in the embodiment of FIGS. 1C and 1D, the enhanced capability CXL switch 130 may be configured to receive such an RDMA request and it may treat a group of memory modules 135 in the receiving server 105 (i.e., the server receiving the RDMA request) as its own memory space. Further, the enhanced capability CXL switch 130 may virtualize across the processing circuits 115 and initiate RDMA request on remote enhanced capability CXL switches 130 to move data back and forth between servers 105, without the processing circuits 115 being involved.

Figure 1F:
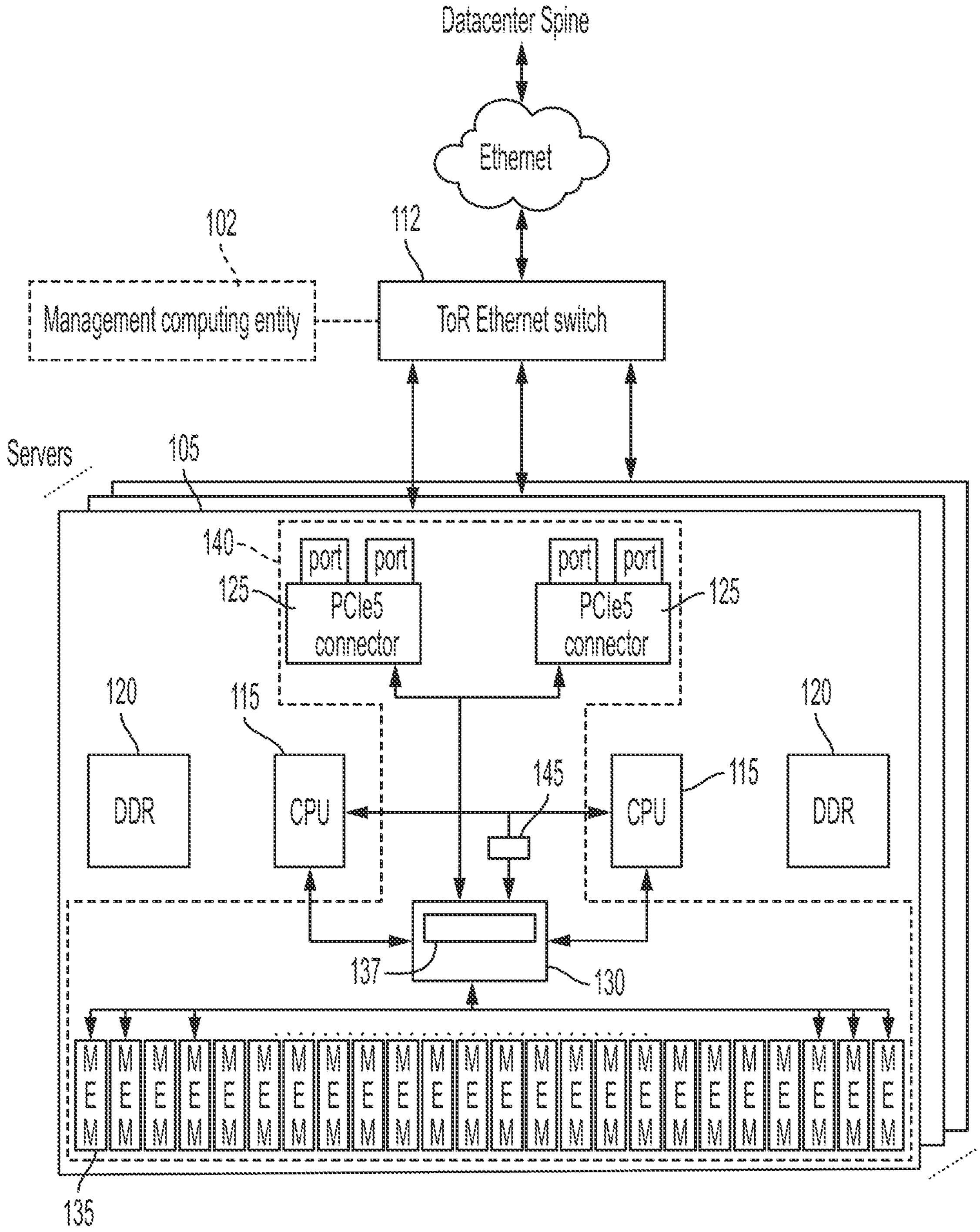
FIG. 1F is a block diagram of a system for aggregating memory, employing an expansion socket adapter, according to an embodiment of the present disclosure.

FIG. 1F shows a system similar to that of FIG. 1E, in which the processing circuits 115 are connected to the network interface circuits 125 through the enhanced capability CXL switch 130. As in the embodiment of FIG. 1D, in FIG. 1F the enhanced capability CXL switch 130, the memory modules 135, and the network interface circuits 125 are on an expansion socket adapter 140. The expansion socket adapter 140 may be a circuit board or module that plugs into an expansion socket, e.g., a PCIe connector 145, on the motherboard of the server 105. As such, the server may be any suitable server, modified only by the installation of the expansion socket adapter 140 in the PCIe connector 145. The memory modules 135 may be installed in connectors (e.g., M.2 connectors) on the expansion socket adapter 140. In such an embodiment, (i) the network interface circuits 125 may be integrated into the enhanced capability CXL switch 130, or (ii) each network interface circuit 125 may have a PCIe interface (the network interface circuit 125 may be a PCIe endpoint), so that the processing circuit 115 to which it is connected may communicate with the network interface circuit 125 through a root port to endpoint PCIe connection, and the controller 137 of the enhanced capability CXL switch 130 (which may have a PCIe input port connected to the processing circuit 115 and to the network interface circuits 125) may communicate with the network interface circuit 125 through a peer-to-peer PCIe connection.

According to an embodiment of the present invention, there is provided a system, including: a first server, including: a stored-program processing circuit, a cache-coherent switch, and a first memory module; and a second server; and a server-linking switch connected to the first server and to the second server, wherein: the first memory module is connected to the cache-coherent switch, the cache-coherent switch is connected to the server-linking switch, and the stored-program processing circuit is connected to the cache-coherent switch, in some embodiments, the server-linking switch includes a Peripheral Component Interconnect Express (PCIe) switch. In some embodiments, the server-linking switch includes a Compute Express Link (CXL) switch. In some embodiments, the server-linking switch includes a top of rack (ToR) CXL switch. In some embodiments, the server-linking switch is configured to discover the first server, in some embodiments, the server-linking switch is configured to cause the first server to reboot. In some embodiments, the server-linking switch is configured to cause the cache-coherent switch to disable the first memory module. In some embodiments, the server-linking switch is configured to transmit data from the second server to the first server, and to perform flow control on the data, in some embodiments, the system further includes a third server connected to the server-linking switch, wherein; the server-linking switch is configured to: receive a first packet, from the second server, receive a second packet, from the third server, and transmit the first packet and the second packet to the first server. In some embodiments, the system further includes a second memory module connected to the cache-coherent switch, wherein the first memory module includes volatile memory and the second memory module includes persistent memory, in some embodiments, the cache-coherent switch is configured to virtualize the first memory module and the second memory module. In some embodiments, the first memory module includes flash memory, and the cache-coherent switch is configured to provide a flash translation layer for the flash memory. In some embodiments, the first server includes an expansion socket adapter, connected to an expansion socket of the first server, the expansion socket adapter including: the cache-coherent switch; and a memory module socket, the first memory module being connected to the cache-coherent switch through the memory module socket. In some embodiments, the memory module socket includes an M.2 socket. In some embodiments: the cache-coherent switch is connected to the server-linking switch through a connector, and the connector is on the expansion socket adapter. According to an embodiment of the present invention, there is provided a method for performing remote direct memory access in a computing system, the computing system including: a first server, a second server, a third server, and a server-linking switch connected to the first server, to the second server, and to the third server, the first server including: a stored-program processing circuit, a cache-coherent switch, and a first memory module, the method including: receiving, by the server-linking switch, a first packet, from the second server, receiving, by the server-linking switch, a second packet, from the third server, and transmitting the first packet and the second packet to the first server. In some embodiments, the method further includes: receiving, by the cache-coherent switch, a straight remote direct memory access (RDMA) request, and sending, by the cache-coherent switch, a straight RDMA response. In some embodiments, the receiving of the straight RDMA request includes receiving the straight RDMA request through the server-linking switch. In some embodiments, the method further includes: receiving, by the cache-coherent switch, a read command, from the stored-program processing circuit, for a first memory address, translating, by the cache-coherent switch, the first memory address to a second memory address, and retrieving, by the cache-coherent switch, data from the first memory module at the second memory address. According to an embodiment of the present invention, there is provided a system, including: a first server, including: a stored-program processing circuit, cache-coherent switching means, a first memory module; and a second server; and a server-linking switch connected to the first server and to the second server, wherein; the first memory module is connected to the cache-coherent switching means, the cache-coherent switching means is connected to the server-linking switch, and the stored-program processing circuit is connected to the cache-coherent switching means.

Figure 1G:
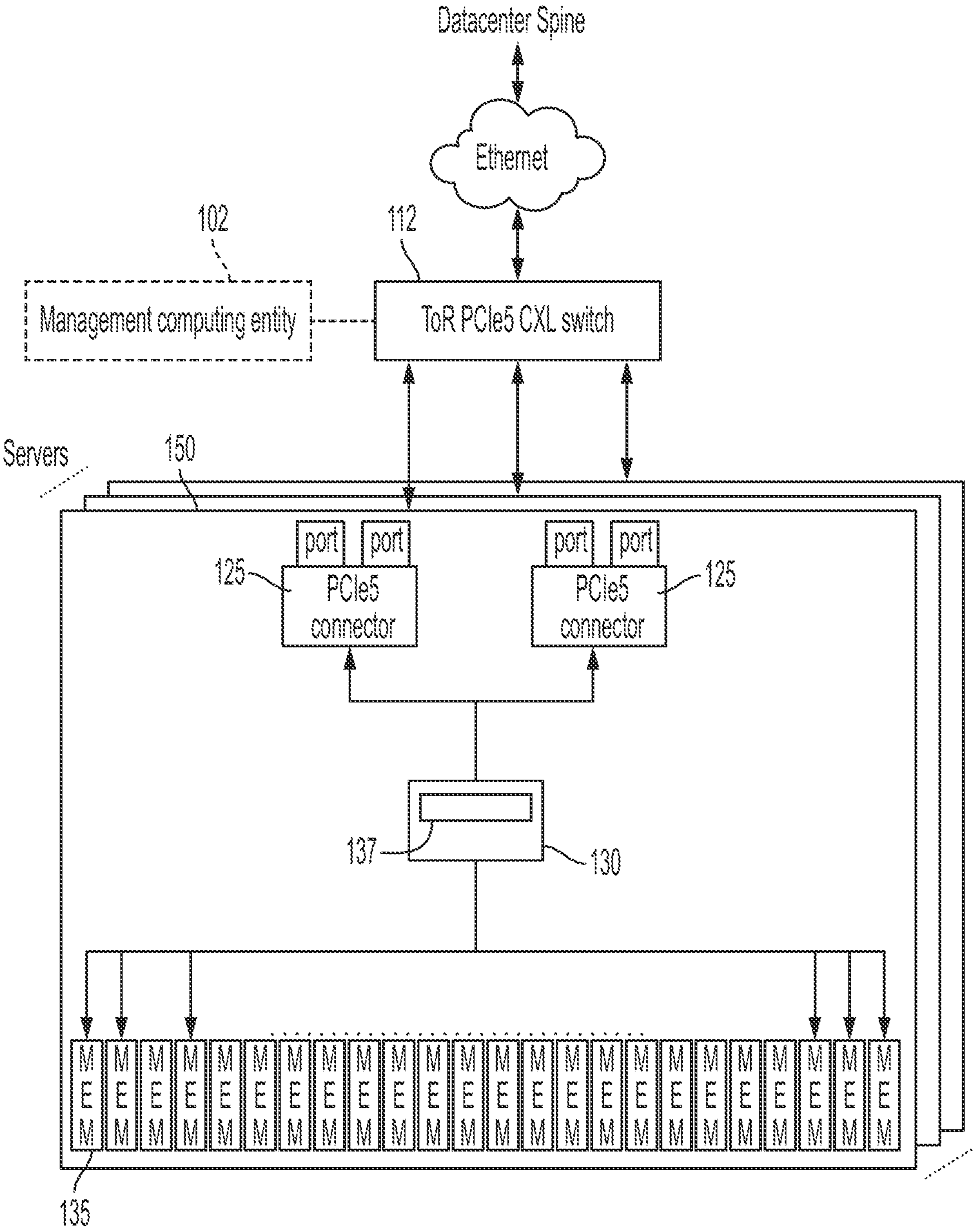
FIG. 1G is a block diagram of a system for disaggregating servers, according to an embodiment of the present disclosure.

FIG. 1G shows an embodiment in which each of a plurality of memory servers 150 is connected to a ToR server-linking switch 112, which may be a PCIe 5.0 CXL switch, as illustrated. As in the embodiment of FIGS. 1E and 1F, the server-linking switch 112 may include an FPGA or ASIC, and may provide performance (in terms of throughput and latency) superior to that of an Ethernet switch. As in the embodiment of FIGS. 1E and 1F, the memory server 150 may include a plurality of memory modules 135 connected to the server-linking switch 112 through a plurality of PCIe connectors. In the embodiment of FIG. 1G, the processing circuits 115 and system memory 120 may be absent, and the primary purpose of the memory server 150 may be to provide memory, for use by other servers 105 having computing resources.

In the embodiment of FIG. 1G, the server-linking switch 112 may group or batch multiple cache requests received from different memory servers 150, and it may group packets, reducing control overhead. The enhanced capability CXL switch 130 may include composable hardware building blocks to (i) route data to different memory types based on workload, and (ii) virtualize processor-side addresses (translating such addresses to memory-side addresses). The system illustrated in FIG. 1G may be CXL 2.0 based, it may include composable and disaggregated shared memory within a rack, and it may use the ToR server-linking switch 112 to provide pooled (i.e., aggregated) memory to remote devices.

The ToR server-linking switch 112 may have an additional network connection (e.g., an Ethernet connection, as illustrated, or another kind of connection, e.g., a wireless connection such as a WiFi connection or a 5G connection) for making connections to other servers or to clients. The server-linking switch 112 and the enhanced capability CXL switch 130 may each include a controller, which may be or include a processing circuit such as an ARM processor. The PCIe interfaces may comply with the PCIe 5.0 standard or with an earlier version, or with a future version of the PCIe standard, or a different standard (e.g., NVDIMM-P, CCIX, or OpenCAPI) may be employed instead of PCIe. The memory modules 135 may include various memory types including DDR4 DRAM, HBM, LDPPR. NAND flash, and solid state drives (SSDs). The memory modules 135 may be partitioned or contain cache controllers to handle multiple memory types, and they may be in different form factors, such as HHHL, FHHL, M.2, U.2, mezzanine card, daughter card, E1.S, E1.L, E3.L, or E3.S.

In the embodiment of FIG. 1G, the enhanced capability CXL switch 130 may enable one-to-many and many-to-one switching, and it may enable a fine grain load-store interface at the flit (64-byte) level. Each memory server 150 may have aggregated memory devices, each device being partitioned into multiple logical devices each with a respective LD-ID. The enhanced capability CXL switch 130 may include a controller 137 (e.g., an ASIC or an FPGA), and a circuit (which may be separate from, or part of, such an ASIC or FPGA) for device discovery, enumeration, partitioning, and presenting physical address ranges. Each of the memory modules 135 may have one physical function (PF) and as many as 16 isolated logical devices. In some embodiments the number of logical devices (e.g., the number of partitions) may be limited (e.g. to 16), and one control partition (which may be a physical function used for controlling the device) may also be present. Each of the memory modules 135 may be a Type 2 device with CXL.cache, CXL-memory and CXL.io and address translation service (ATS) implementation to deal with cache line copies that the processing circuits 115 may hold.

The enhanced capability CXL switch 130 and a fabric manager may control discovery of the memory modules 135 and (i) perform device discovery, and virtual CXL software creation, and (ii) bind virtual to physical ports. As in the embodiments of FIGS. 1A-1D, the fabric manager may operate through connections over an SMBus sideband. An interface to the memory modules 135, which may be Intelligent Platform Management Interface (IPMI) or an interface that complies with the Redfish standard (and that may also provide additional features not required by the standard), may enable configurability.

Building blocks, for the embodiment of FIG. 1G, may include (as mentioned above) a CXL controller 137 implemented on an FPGA or on an ASIC, switching to enable aggregating of memory devices (e.g., of the memory modules 135). SSDs, accelerators (GPUs, NICs), CXL and PCIe5 connectors, and firmware to expose device details to the advanced configuration and power interface (ACPI) tables of the operating system, such as the heterogeneous memory attribute table (HMAT) or the static resource affinity table SRAT.

In some embodiments, the system provides composability. The system may provide an ability to online and offline CXL devices and other accelerators based on the software configuration, and it may be capable of grouping accelerator, memory, storage device resources and rationing them to each memory server ISO in the rack. The system may hide the physical address space and provide transparent cache using faster devices like HBM and SRAM.

In the embodiment of FIG. 1G, the controller 137 of the enhanced capability CXL switch 130 may (i) manage the memory modules 135, (ii) integrate and control heterogeneous devices such as NICs, SSDs. GPUs, DRAM, and (iii) effect dynamic reconfiguration of storage to memory devices by power-gating. For example, the ToR server-linking switch 112 may disable power (i.e., shut off power, or reduce power) to one of the memory modules 135 (by instructing the enhanced capability CXL switch 130 to disable power to the memory module 135). The enhanced capability CXL switch 130 may then disable power to the memory module 135, upon being instructed, by the server-linking switch 112, to disable power to the memory module. Such disabling may conserve power, and it may improve the performance (e.g., the throughput and latency) of other memory modules 135 in the memory server 150. Each remote server 105 may see a different logical view of memory modules 135 and their connections based on negotiation. The controller 137 of the enhanced capability CXL switch 130 may maintain state so that each remote server maintains allotted resources and connections, and it may perform compression or deduplication of memory to save memory capacity (using a configurable chunk size). The disaggregated rack of FIG. 1G may have its own BMC. It also may expose an IPMI network interface and a system event log (SEL) to remote devices, enabling the master (e.g., a remote server using storage provided by the memory servers 150) to measure performance and reliability on the fly, and to reconfigure the disaggregated rack. The disaggregated rack of FIG. 1G may provide reliability, replication, consistency, system coherence, hashing, caching, and persistence, in a manner analogous to that described herein for the embodiment of FIG. 1E, with, e.g., coherence being provided with multiple remote servers reading from or writing to the same memory address, and with each remote server being configured with different consistency levels. In some embodiments, the server-linking switch maintains eventual consistency between data stored on a first memory server, and data stored on a second memory server. The server-linking switch 112 may maintain different consistency levels for different pairs of servers; for example, the server-linking switch may also maintain, between data stored on the first memory server, and data stored on a third memory server, a consistency level that is strict consistency, sequential consistency, causal consistency, or processor consistency. The system may employ communications in "local-band" (the server-linking switch 112) and "global-band" (disaggregated server) domains. Writes may be flushed to the "global band" to be visible to new reads from other servers. The controller 137 of the enhanced capability CXL switch 130 may manage persistent domains and flushes separately for each remote server. For example, the cache-coherent switch may monitor a fullness of a first region of memory (volatile memory, operating as a cache), and, when the fullness level exceeds a threshold, the cache-coherent switch may move data from the first region of memory to a second region of memory, the second region of memory being in persistent memory. Flow control may be handled in that priorities may be established, by the controller 137 of the enhanced capability CXL switch 130, among remote servers, to present different perceived latencies and bandwidths.

According to an embodiment of the present invention, there is provided a system, including: a first memory server, including: a cache-coherent switch, and a first memory module; and a second memory server; and a server-linking switch connected to the first memory server and to the second memory server, wherein: the first memory module is connected to the cache-coherent switch, and the cache-coherent switch is connected to the server-linking switch. In some embodiments, the server-linking switch is configured to disable power to the first memory module. In some embodiments: the server-linking switch is configured to disable power to the first memory module by instructing the cache-coherent switch to disable power to the first memory module, and the cache-coherent switch is configured to disable power to the first memory module, upon being instructed, by the server-linking switch, to disable power to the first memory module. In some embodiments, the cache-coherent switch is configured to perform deduplication within the first memory module. In some embodiments, the cache-coherent switch is configured to compress data and to store compressed data in the first memory module. In some embodiments, the server-linking switch is configured to query a status of the first memory server. In some embodiments, the server-linking switch is configured to query a status of the first memory server through an Intelligent Platform Management Interface (IPMI). In some embodiments, the querying of a status includes querying a status selected from the group consisting of a power status, a network status, and an error check status. In some embodiments, the server-linking switch is configured to batch cache requests directed to the first memory server. In some embodiments, the system further includes a third memory server connected to the server-linking switch, wherein the server-linking switch is configured to maintain, between data stored on the first memory server and data stored on the third memory server, a consistency level selected from the group consisting of strict consistency, sequential consistency, causal consistency, and processor consistency, in some embodiments, the cache-coherent switch is configured to: monitor a fullness of a first region of memory, and move data from the first region of memory to a second region of memory, wherein: the first region of memory is in volatile memory, and the second region of memory is in persistent memory. In some embodiments, the server-linking switch includes a Peripheral Component Interconnect Express (PCIe) switch. In some embodiments, the server-linking switch includes a Compute Express Link (CXL) switch. In some embodiments, the server-linking switch includes a top of rack (ToR) CXL switch. In some embodiments, the server-linking switch is configured to transmit data from the second memory server to the first memory server, and to perform flow control on the data. In some embodiments, the system further includes a third memory server connected to the server-linking switch, wherein: the server-linking switch is configured to: receive a first packet, from the second memory server, receive a second packet, from the third memory server, and transmit the first packet and the second packet to the first memory server. According to an embodiment of the present invention, there is provided a method for performing remote direct memory access in a computing system, the computing system including: a first memory server; a first server; a second server; and a server-linking switch connected to the first memory server, to the first server, and to the second server, the first memory server including: a cache-coherent switch, and a first memory module; the first server including: a stored-program processing circuit; the second server including: a stored-program processing circuit; the method including: receiving, by the server-linking switch, a first packet, from the first server; receiving, by the server-linking switch, a second packet, from the second server; and transmitting the first packet and the second packet to the first memory server. In some embodiments, the method further includes: compressing data, by the cache-coherent switch, and storing the data in the first memory module. In some embodiments, the method further includes: querying, by the server-linking switch, a status of the first memory server. According to an embodiment of the present invention, there is provided a system, including: a first memory server, including: a cache-coherent switch, and a first memory module; and a second memory server; and server-linking switching means connected to the first memory server and to the second memory server, wherein: the first memory module is connected to the cache-coherent switch, and the cache-coherent switch is connected to the server-linking switching means.

Figure 2:
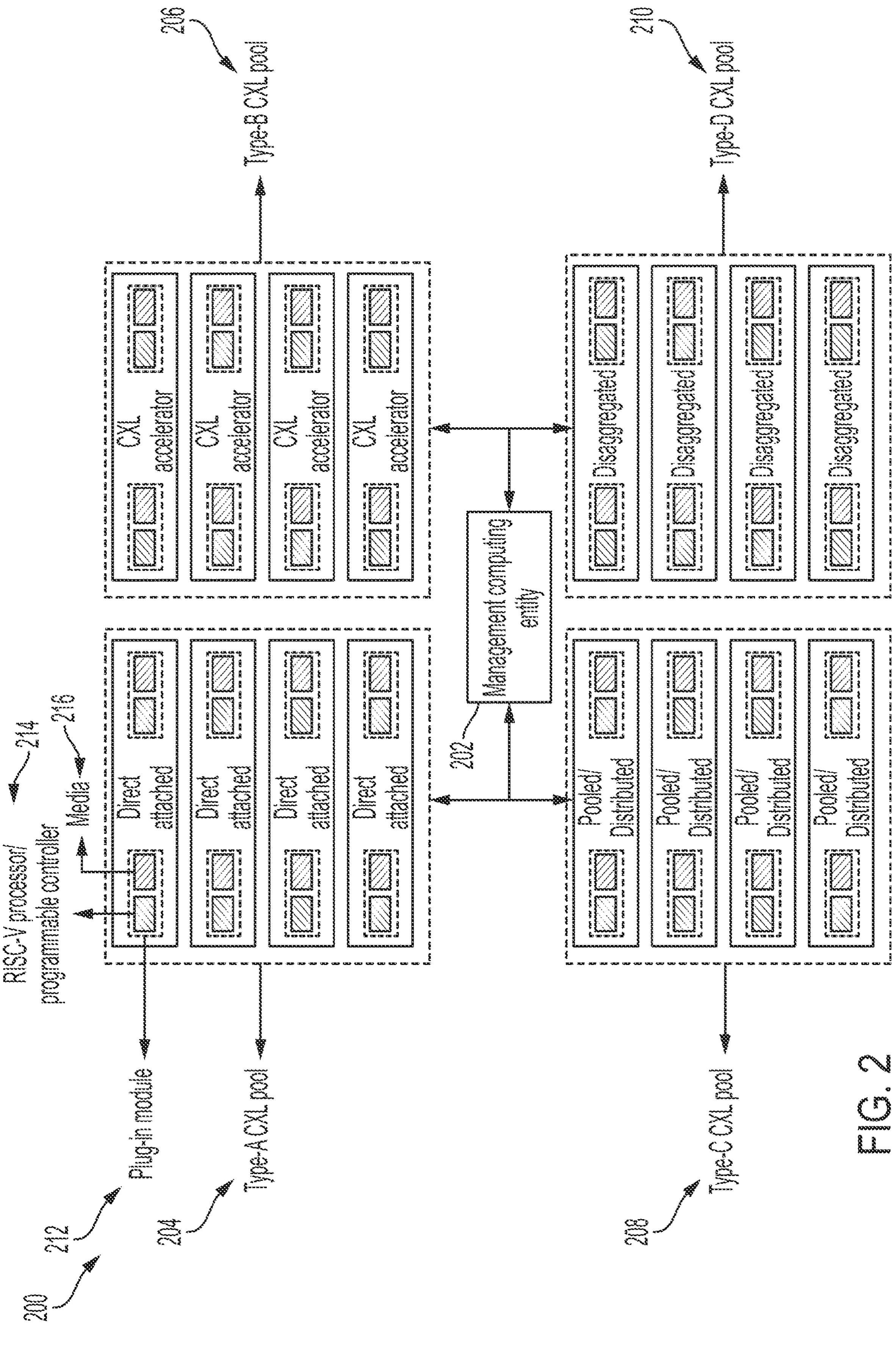
FIG. 2 depicts a diagram of a representative system architecture in which aspects of the disclosed embodiments can operate in connection with a management computing entity that can communicate and configure the various servers described in connection with FIGS. 1A-1G, in accordance with example embodiments of the disclosure.

FIG. 2 depicts a diagram 200 of a representative system architecture in which aspects of the disclosed embodiments can operate in connection with a management computing entity that can communicate and configure the various servers described in connection with FIG. 1, in accordance with example embodiments of the disclosure. In some embodiments, the disclosed systems can include a management computing entity 202 that can be configured to operate in connection with multiple clusters. As shown, the clusters can include a type-A pool cluster 204, a type-B pool cluster 206, a type-C pool cluster 208, and a type-D pool cluster 210, In one embodiment, the type-A pool cluster 204 can include a direct-attached memory (e.g., CXL memory), the type-B pool cluster 206 can include an accelerator (e.g., CXL accelerator), the type-C pool cluster 208 can include a pooled/distributed memory (e.g., CXL memory), and a type-D pool cluster 210 can include a disaggregated memory (e.g., CXL memory). Further, each of the clusters can include, but not be limited to, a plug-in module 212 that can include a computing element 214 such as a processor (e.g., a RISC-V based processor) and/or a programmable controller (e.g., an FPGA-based controller), and corresponding media 216.

In various embodiments, the management computing entity 202 can be configured to direct VO and memory storage and retrieval operations to the various clusters based on one or more predetermined parameters, for example, parameters associated with a corresponding workload being processed by a host or a device on the network in communication with the management computing entity 202.

In various embodiments, the management computing entity 202 can operate at a rack and/or cluster level, or may operate at least partially within a given device (e.g., cache-coherent enabled device) that is pan of a given cluster architecture (e.g., type-A pool cluster 204, type-B pool cluster 206, type-C pool cluster 208, and type-D pool cluster 210). In various embodiments, the device within the given cluster architecture can perform a first portion of operations of the management computing entity while another portion of the operations of the management computing entity can be implemented on the rack and/or at the cluster level. In some embodiments, the two portions of operations can be performed in a coordinated manner (e.g., with the device in the cluster sending and receiving coordinating messages to and from the management computing entity implemented on the rack and/or at the cluster level). In some embodiments, the first portion of operations associated with the device in the cluster can include, but not be limited to, operations for determining a current or future resource need by the device or cluster, advertising a current or future resource availability by the device or cluster, synchronizing certain parameters associated with algorithms being run at the device or cluster level, training one or more machine teaming modules associated with the device's or rack/cluster's operations, recording corresponding data associated with routing workloads, combinations thereof, and/or the like.

Figure 3A:
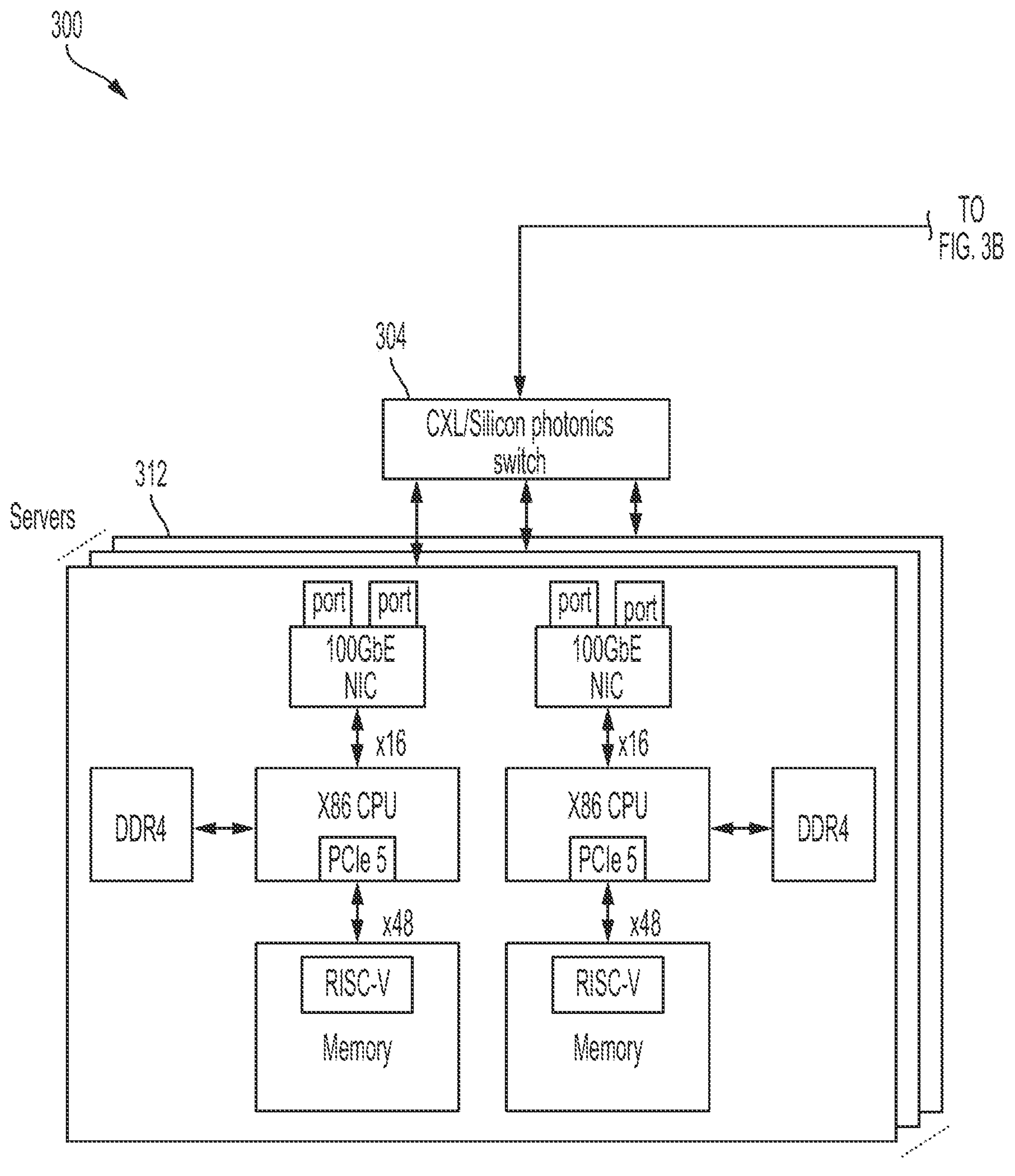
FIG. 3A depicts a first diagram of representative system architectures in which aspects of the disclosed embodiments can operate in connection with a management computing entity that can communicate and configure the various servers described in connection with FIGS. 1A-1G, in accordance with example embodiments of the disclosure.
Figure 3B:
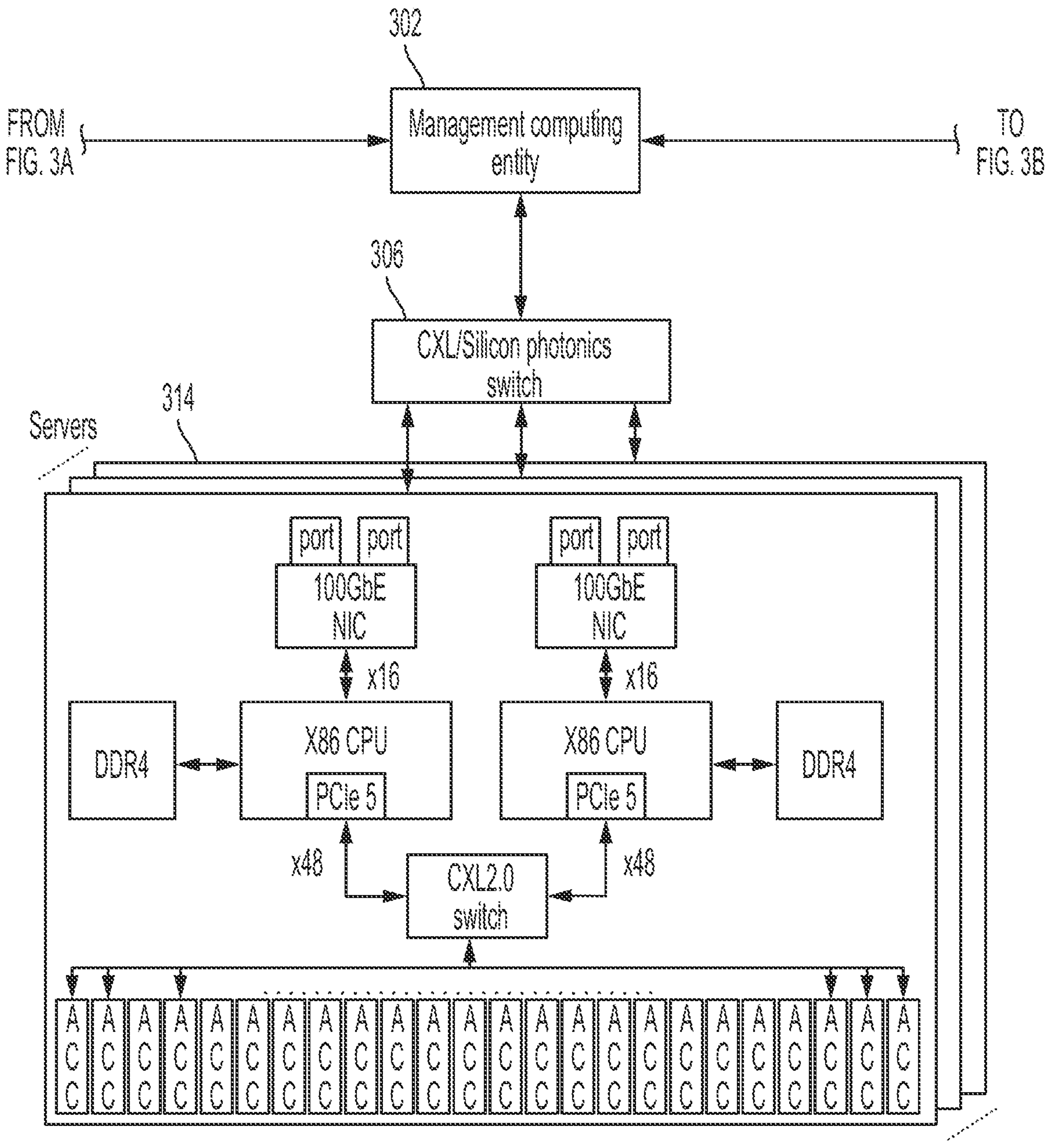
FIG. 3B depicts a second diagram of a representative system architecture in which aspects of the disclosed embodiments can operate in connection with a management computing entity that can communicate and configure the various servers described in connection with FIGS. 1A-1G, in accordance with example embodiments of the disclosure.

FIG. 3A depicts another diagram 300 of a representative system architecture in which aspects of the disclosed embodiments can operate in connection with a management computing entity that can communicate and configure the various servers described in connection with FIG. 1, in accordance with example embodiments of the disclosure. In some embodiments, the management computing entity 302 can be similar, but not necessarily identical to, the management computing entity 202 shown and described in connection with FIG. 2, above. Further, the management computing entity 202 can communicate with the type-A pool. In various embodiments, the type-A pool cluster 312 can include several servers. Moreover, the type-A pool cluster 312 can feature a direct-attached cache coherent (e.g., CXL) devices, which can, for example, be configured to operate using RCiEP. In another embodiment, type-A pool cluster 312 can feature a cache coherent protocol based memory such as CXL memory to reduce any limitations of CPU pins. In one embodiment, the type-A pool cluster 312 can include direct attached devices with a variety of form factor options (e.g., E1, E3 form factors which can conform to an EDSFF standard and/or add-in card (AIC) form factor). In another embodiment, the disclosed systems can include a switch 304 such as a cache coherent (e.g., CXL) based switch and/or a silicon photonics based switch. In one embodiment, the switch 304 can feature a top of rack (ToR) Ethernet-based switch that can serve to scale the system to the rack level.

In various embodiments, as shown in FIG. 38, the type-B pool cluster 314 can also include several servers. Moreover, the type-B pool cluster 314 can use a cache coherent based (e.g., a CXL 2.0 based) switch and accelerators, which can be pooled within a server of the servers. Moreover, the type-B pool cluster 314 can feature a virtual cache coherent protocol (e.g., CXL protocol) based switch (VCS) hierarchy capability based on workload. In particular, the VCS can be identified as a portion of the switch and connected components behind one specific root port (e.g., PCIe root port). In another embodiment, the disclosed systems can include a switch 306 such as a cache coherent (e.g., CXL) based switch and/or a silicon photonics based switch.

Figure 3C:
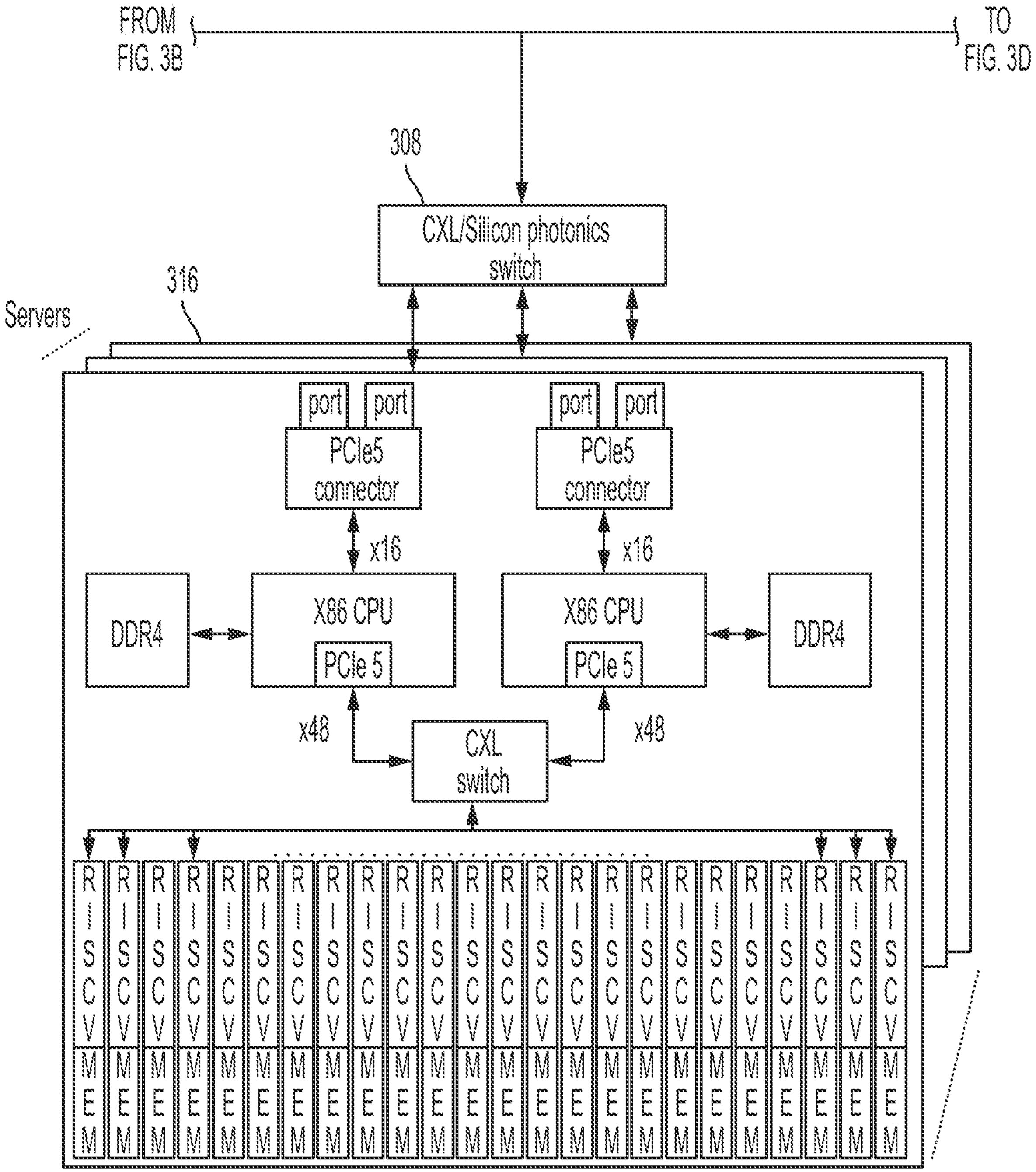
FIG. 3C depicts a third diagram of a representative system architecture in which aspects of the disclosed embodiments can operate in connection with a management computing entity that can communicate and configure the various servers described in connection with FIGS. 1A-1G, in accordance with example embodiments of the disclosure.

In various embodiments, as shown in FIG. 3C, the type-C pool cluster 316 can also include several servers. Moreover, the type-C pool cluster 316 can use a CXL 2.0 switch within a server of the servers. Additionally, the type-C pool cluster 316 can use a PCIe-based fabric and/or a Gen-Z based system to scale cache-coherent memory across the servers. Additionally, the type-C pool cluster 316 can introduce at least three pools of coherent memory in the cluster: a local DRAM, a local CXL memory, and a remote memory. In another embodiment, the disclosed systems can include a switch 308 such as a cache coherent (e.g., CXL) based switch and/or a silicon photonics based switch.

Figure 3D:
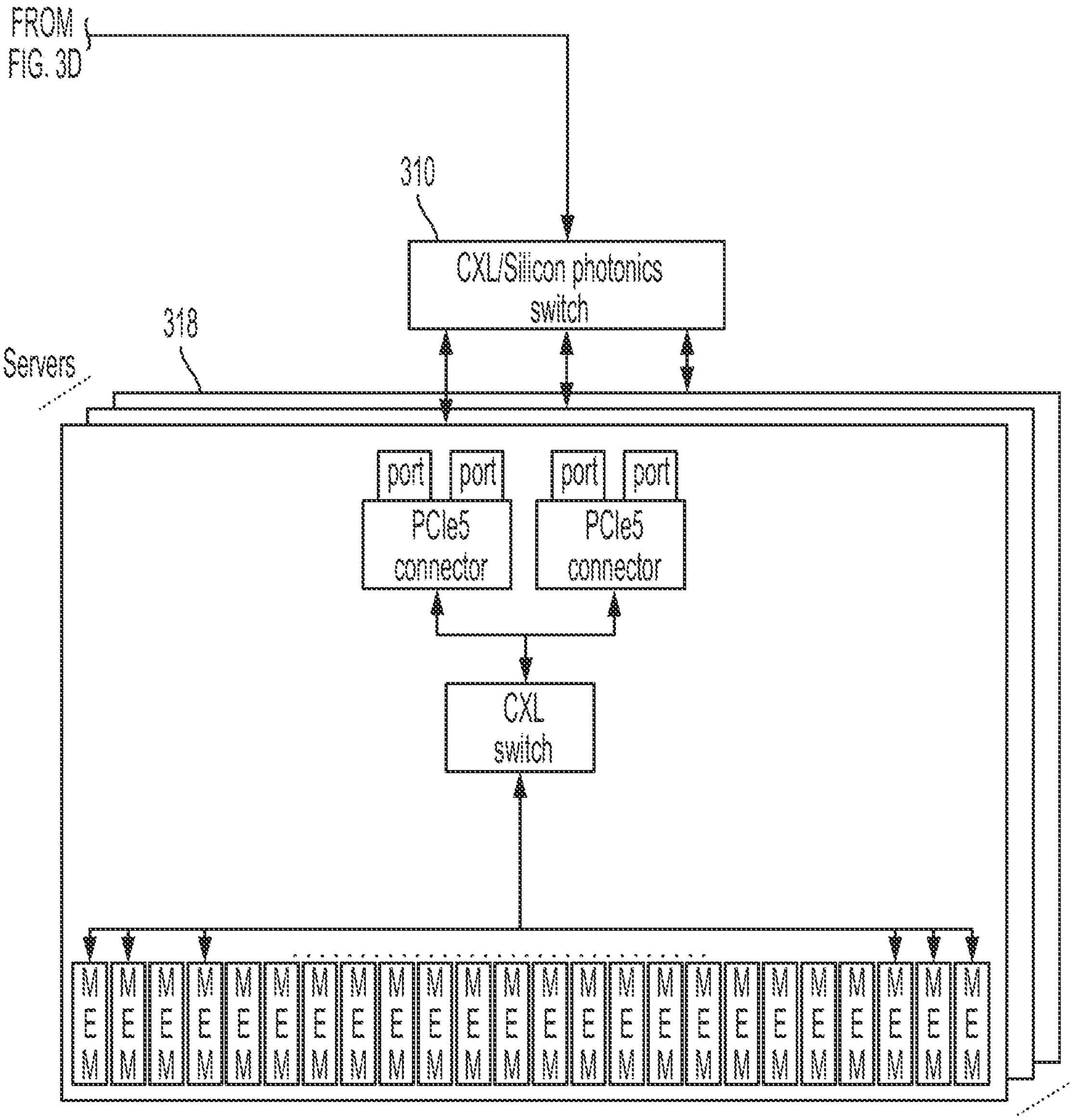
FIG. 3D depicts a fourth diagram of a representative system architecture in which aspects of the disclosed embodiments can operate in connection with a management computing entity that can communicate and configure the various servers described in connection with FIGS. 1A-1G, in accordance with example embodiments of the disclosure.

In various embodiments, as shown in FIG. 3D, the type-D pool cluster 318 can also include several servers. In one embodiment, the type-D pool cluster 318 can include a physically disaggregated CXL memory. Further, each server can be assigned a partition such that there may be limited or no sharing across servers. In some embodiments, the type-D pool cluster 318 may initially be limited to a predetermined number (e.g., 16) multiple logical device (MLD) partitions and hosts. In particular, type-3 cache coherent protocol (e.g., CXL) based memory devices can be partitioned to look like multiple devices with each device presenting a unique logical device ID. Additionally, the type-D pool cluster 318 can use a PCIe-based fabric and/or a Gen-Z based system to scale cache-coherent memory across the servers. In another embodiment, the disclosed systems can include a switch 310 such as a cache coherent (e.g., CXL) based switch and/or a silicon photonics based switch.

FIG. 4 depicts a diagram of a representative table of parameters that can characterize aspects of the servers described in connection with FIG. 1, where the management computing entity configure the various servers based on the table of parameters, in accordance with example embodiments of the disclosure. In particular, table 400 shows various example parameters that can be considered by the disclosed systems and in particular, by the management computing entity variously described herein, to route portions of workloads to different clusters based on a comparison of the values of these parameters (or similar parameters) for different pool cluster types described above. In particular, table 400 shows parameters 402 corresponding to different cluster types shown in the columns, namely, direct-attached 406 memory cluster (similar to a type-A pool cluster), a pooled 408 memory cluster (similar to a type-B pool cluster), a distributed 410 memory cluster (similar to a type-C pool cluster), and a disaggregated 412 memory cluster (similar to a type-D pool cluster). Non-limiting examples of such parameters 402 include direct-memory capacity, far memory capacity (e.g., for cache coherent protocols such as CXL), remote memory capacity (e.g., per server), remote memory performance, overall total cost of ownership (TCO), overall power (amortized), and overall area (e.g., with E1 form factors). In various embodiments, the disclosed systems can use a machine learning algorithm in association with the management computing entity to make a determination to route at least a portion of the workload to different clusters as further described below. While FIG. 4 shows some example parameters, the disclosed systems can be configured to monitor any suitable parameter to route workloads or portions of workloads to different devices associated with the clusters. Further, the management computing entity can perform such operations based on various parameters of the system including, but not limited to, a cache coherent protocol based (e.g., CXL based) round trip time, a determination of whether device is in host bias or device bias, a cache coherent protocol based (e.g., CXL based) switch hierarchy and/or a binding of host upstream ports to device downstream ports, a cache coherent protocol based (e.g., CXL based) switch fabric manager configuration, a cache coherent protocol based (e.g., CXL based) protocol packet or physical medium packet (e.g., a CXL.IO or PCIe intervening bulk 4 KB packet), a network latency, a cache coherent protocol based (e.g., CXL based) memory technology (e.g., type of memory), combinations thereof, and/or the like.

In various respects, there can be various hyperscaler workload requirements which can have include specific features that may pose challenges with existing datacenter and server architectures. For example, such workloads may exhibit diversity in memory and I/O latency requirements, bandwidth needs, and may be compute and/or memory resource constrained.

As noted, the disclosed systems can include a cache coherent protocol such as CXL. In particular, CXL can enable additional types of memory extensions and coherent accelerators from working together with conventional storage and compute. However, in some respects, protocols such CXL related protocols may not describe the system design and/or microarchitecture for meeting a particular application's needs. Further, there may be a variety of different types of CXL systems and associated microarchitectures, as distributed and large CXL memory systems can have many implementation challenges.

In some respects, cache coherent protocols such as CXL can enable memory scaling and heterogeneous computing architectures. Further, cache coherent operation within an CPU-centric ecosystem enables designs and use cases for accelerators and memory hierarchies. In various embodiments, the disclosed systems can include a CXL device microarchitecture which can include a CXL type-1 device architecture, type-2 device microarchitecture, and/or a type-3 memory device microarchitecture, as will be further described herein. In another embodiment, the disclosed systems can be configured to co-locate different memory types in a given device (e.g., a volatile and a non-volatile memory type) and communicate with a cache coherent protocol. In another embodiment, the disclosed systems can re-configure memory resources at boot time. Alternatively or additionally, the disclosed systems can disable and/or enable a specific memory based on a predetermined parameter (e.g., bandwidth or storage usage parameter).

As noted, the disclosed systems can enable re-configuring the resources, for example, at boot-time of the cache coherent compatible device. For example, the disclosed systems can be reconfigured to disable/enable a specific memory type (e.g., a volatile memory or a non-volatile memory), based on changing network parameters. In another embodiment, the disclosed systems can be reconfigured to use either a hardware cache or a software cache based on network parameters. In some embodiments, the parameters may be determined by an on-device profiling module that can determine the device's capabilities (which can change over time based on usage, etc.). The parameters can be transmitted to another device such as a host, which can use this information to reconfiguring the device, for example, at runtime. In another embodiment, the disclosed systems can serve to split a given interface such as a PCIe interface into dedicated interfaces (e.g., use one portion corresponding to a number of channels as a first interface for example use in connection with a first memory type and a second portion corresponding to a second number of channels as a second interface for example use in connection with a second memory type). In another embodiment, the disclosed systems can partition the device into different domains such as via CXL based logical domains (LD-LDs).

As noted, the disclosed systems can include Type-1, type-2 and/or type-3 CXL device microarchitectures. In various embodiments, a type-1 CXL device can refer to a device that implements a coherent cache but may not include a host-managed device memory. Further, a type 1 CXL device can extend a PCIe protocol capability (for example, atomic operation capability). In various embodiments, a type-2 CXL device can implement a coherent cache and a host-managed device memory. Further, the type-2 CXL device can support applications that include devices which have high-bandwidth memories attached. Moreover, the applicable transaction types for such type-2 CXL devices can include various CXL.cache and CXL.mem transactions. In various embodiments, a type-3 CXL device can include a host-managed device memory. Further, in some embodiments, the disclosed systems can support applications of such a device such as memory expansion for the host. Additionally, the type-3 CXL device can include an applicable transaction type such as CXL.mem, memory read, and memory write transactions.

In another embodiment, the disclosed systems can include, but not be limited to, various architecture blocks. In some embodiments, the disclosed systems can include, but not be limited to, a cache controller, a CXL controller, an intelligent memory controller, a device coherency engine (DCOH) and interleaving decoder, an error correction control (ECC) and security block, and/or the like, described further herein.

In various embodiments, the DCOH and interleaving decoder can serve as a device coherency bridge, a simplified home agent and coherency bridge that are on the device, instead of the host. Further, In some embodiments, one device (e.g., type-3 device) can be interleaved with other CXL devices, for example, in a given physical address range. In various embodiments, the disclosed systems can perform memory interleaving at the host bridge, root port, or switch level. Further, the disclosed systems can implement a management layer for performing the interleaving (e.g., by assembling leaf nodes into interleave sets, and/or the like).

In various embodiments, the ECC and security block can include various hardware and software blocks that implement security (e.g., encryption) algorithms. In another embodiment, the ECC and security block include modules that configure crypto engines (e.g., via Advanced Encryption Standard Galois/Counter Mode (AES-GCM) for CXL). In another embodiment, the ECC and security block can include any other block that directly or indirectly communicates with the above two blocks. In various embodiments, the ECC and security block can serve to protect the transactions, both data and metadata, exchanged between the two devices on the physical link. In the case of crypto based security, the ECC and security block can implement symmetric crypto keys (e.g., a 256-bit key for AES-GCM), In various embodiments, the ECC and security block can perform operation in accordance with a CXL.io and CXL.cachemem protocols. In particular, the CXL.io pathway can use a PCIe defined IDE, while the CXL.cachemem can include additional updates from CXL 2.0.

In various embodiments, the ECC and security block can perform ECC generation and check methods including one or more of the following. ECC codes can be generated by the disclosed systems based on write data. The disclosed systems can store both the write data and the ECC code. Further, during a read operation, the disclosed systems can read both the data and the ECC code. The disclosed systems can then regenerate the ECC code from the received data and can compare the regenerated ECC code against the received ECC code. Accordingly, if the disclosed systems find a match, then the disclosed systems can determine that no errors have occurred. If, however, there are mismatches, the disclosed systems can correct the errors. In various embodiments, the ECC and security block implement various Schemes for ECC including aside-band ECC, for example, using double data rate (DDR) memories (such as DDR4 and DDR5). In particular, the disclosed systems can send the ECC code as side-band data along with the actual data to memory. In another embodiment, the ECC and security block can implement an inline ECC, for example, using low power DDR (LPDDR) memories since side-band ECC may be a more complex implementation with LPDDR. In various embodiments, the ECC and security block can implement a link-ECC, for example, with LPDDR5 memory. The link-ECC can provide additional protection against errors on the LPDDR5 link or channel. Further, the ECC and security block can determine the ECC for write data and can send the ECC on specific bits along with the data. The DRAM generates the ECC on the received data, checks it against the received ECC data, and corrects any errors. The operation can also be implemented for read data using the reverse roles for the DRAM and the ECC and security block.

In various embodiments, the disclosed systems can include a CXL device microarchitecture to be described further in connection with FIGS. 5, 7, 8, and 9 and can include a reconfigurable architecture (e.g., between different memory types such as DDR, LPDDR5. Z-NAND, combinations thereof, and/or the like). In some embodiments, the disclosed systems can include a cache coherent device (e.g., a CXL device) that can use a first protocol (e.g., a cxl.mem protocol) for memory management, and a second protocol (e.g., a cxl.cache protocol) for managing remote regions. In one embodiment, the disclosed systems can enable a device to be configured at boot-time using metadata (e.g., CXL metadata). In another embodiment, the disclosed systems can enable a remapping of data and memory hierarchy while satisfying DRAM timing requirements. In one embodiment, the disclosed systems can provides acceleration and deduplication at a predetermined byte level (e.g., a 64 byte level).

In some embodiments, the disclosed systems can include an intelligent controller. In one embodiment, the intelligent controller can include logic to tier memory among different technologies. In another embodiment, the intelligent controller can include logic to partition the PCIe interface to different domains, support Multiple logical IDs for pooling and other CXL features. The intelligent controller can include interface logic and global master to communicate with DRAM/NAND controllers. The intelligent controller can include an address mapping that remaps incoming read/write transactions. The intelligent controller can interface directly with the global memory controller and receives the memory addresses and read/write transactions. The intelligent controller can include a cache-addressing module that identifies the addresses and translates them into index/tag and other cache fields. The intelligent controller can feature optimizations including mapping ways of same cache set to different DRAM banks to minimize lookup time. The intelligent controller can include a cache policy module that can implement one or more replacement schemes, associativity policy, banking policy, replication and placement to govern the movement and organization of data in the DRAM cache. The intelligent controller can further include a large write buffer to sink most of the writes to the downstream NAND. The intelligent controller can include a transaction queue in the controller that identifies the independent memory transactions and pushes them into per channel request queues.

In some embodiments, the disclosed systems can include one or more media controllers. In various embodiments, the media controller can include modules per channel to schedule requests efficiently while satisfying all of DRAM timing policies and power management. Further, other memory controller policies from a standard DDR controller can be implemented in association with the media controller(s).

In some embodiments, the device including the media controller can include a flash memory (e.g., Z-NAND) controller, also referred to herein as a NAND controller. In some embodiments, when a system or device needs to read data from or write data to the flash memory, it can communicate with the flash memory controller. In some embodiments, the flash controller can use a technique called wear leveling to distribute writes as evenly as possible across all the flash blocks in the storage device to enable every block to be written to its maximum life. In another embodiment, the flash memory controller can also include a flash translation layer (FTL), a layer below the file system that maps host side or file system logical block addresses (LBAs) to the physical address of the flash memory (logical-to-physical mapping). In some embodiments, when the flash controller implements wear leveling and other flash management algorithms (bad block management, read disturb management, safe flash handling etc.), the physical location of an LBA may dynamically change. Accordingly, the disclosed systems can differentiate the mapping units of the FTL so that LBAs are mapped block-, page- or sub-page-based. Accordingly, the disclosed systems can implement a finer mapping granularity to reduce the flash wear out and maximize the endurance of a flash based storage media. In another embodiment, the flash controller can implement garbage collection in which certain blocks can be primed for use after they no longer have current data (e.g., stale blocks). The data in these blocks were replaced with newly written blocks and are therefore queued to be erased so that new data can be written into them.

In some embodiments, the disclosed systems can include a prefetching module that can perform cache-line prefetching after detecting data streams and efficiently access them from DRAM cache. In various embodiments, cache prefetching can refer to a technique to boost execution performance by fetching instructions or data from their original storage in slower memory to a faster local memory before it is needed. In another embodiment, the prefetching module can fetch data or instructions into cache. As noted, data prefetching fetches data before it is needed; however, because data access patterns show less regularity than instruction patterns, accurate data prefetching may be more complex than instruction prefetching. Instruction prefetching on the other hand, fetches instructions before they need to be executed. In another embodiment, hardware-based prefetching can be performed by the prefetching module using a dedicated hardware mechanism that watches the stream of instructions or data being requested by the executing program, recognizes the next few elements that the program might need based on this stream and prefetches into the cache. In another embodiment, software-based prefetching can be performed by the prefetching module using a software mechanism in which additional prefetch instructions are inserted in the program. In some embodiments, the disclosed systems can include a deduplication module that can provide a model to lookup and modify data by value. Accordingly, the disclosed systems can ensure only one copy of data exists in a memory system and that all other addresses with the same data point to the same data.

Figure 5:
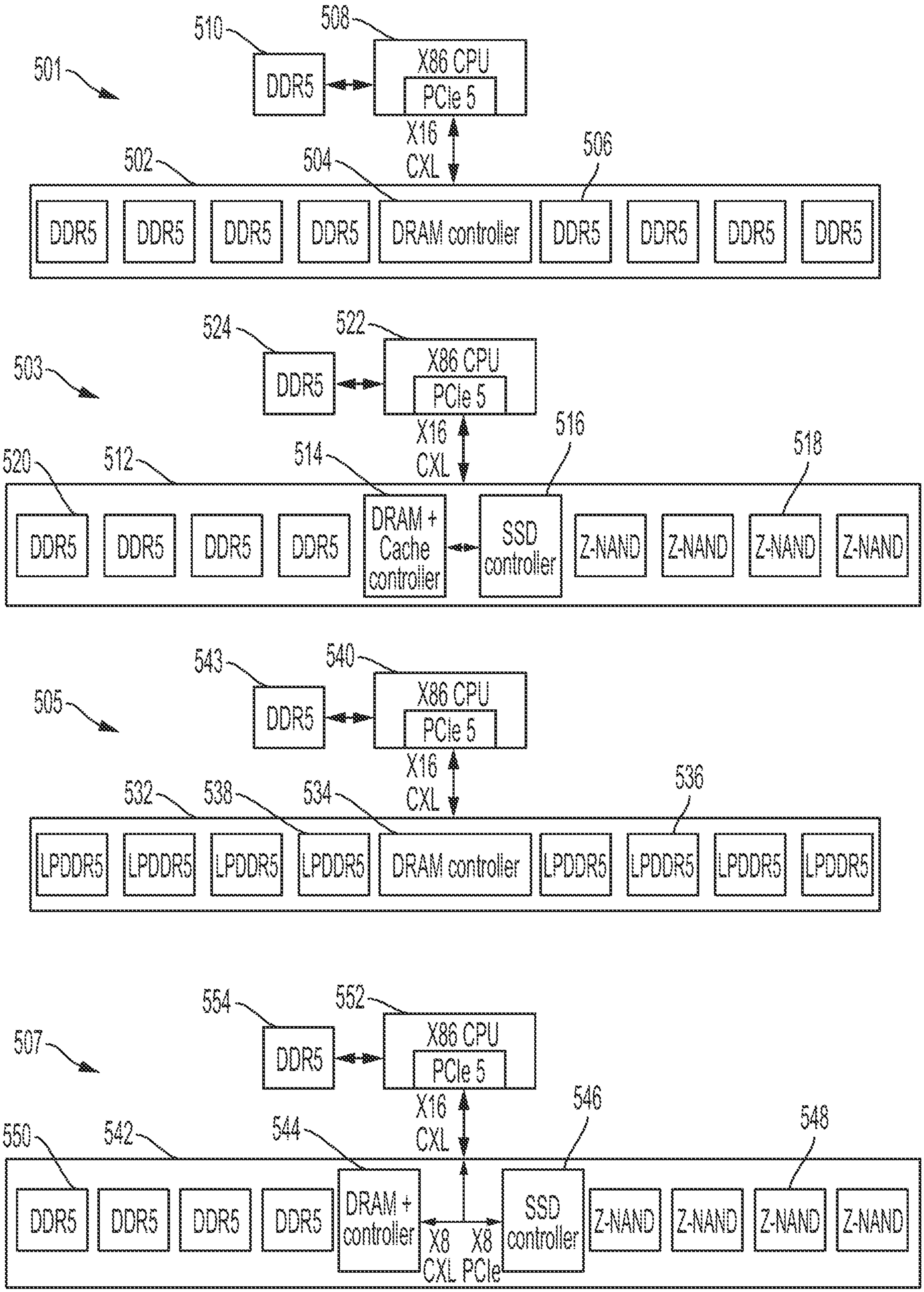
FIG. 5 shows diagrams of different configurations for a memory device, in accordance with example embodiments of the disclosure.

FIG. 5 shows diagrams of different configurations for a memory device, in accordance with example embodiments of the disclosure. In particular, the disclosed systems can include controllers and memory devices of different types that can be configured to operate with a cache coherent protocol such as CXL. Diagram 501 shows a first micro-architecture configuration which includes example DDR-based memories. In particular, diagram 501 shows a configuration 502 in which the DRAM includes DDR5 506 (or DDR4 or any other suitable DDR memory) and a DRAM controller 504. The DRAM controller 504 can be configured to communicate via CXL to a PCIe interface of a processor 508 (e.g., a x86-based CPU). In some embodiments, the DRAM controller 504 can be configured to communicate via a predetermined number of channels (e.g., 16 channels) with the processor 508, The processor 508 itself can be coupled to DRAM (e.g. DDR5 510 or any suitable memory). In various embodiments, such a microarchitecture configuration 502 can be configured to accelerate and/or accommodate address decoding and/or interleaving mechanisms.

Diagram 503 shows a second microarchitecture configuration 512 which includes example DDR and Z-NAND memories. In particular, diagram 503 shows a configuration in which the DRAM includes DDR5 520 (or DDR4 or any other suitable DDR memory) and a DRAM controller 514, which can further include cache controller functionality. Further, diagram 503 shows a configuration 512 in which there can be flash memory (e.g. Z-NAND 518) memory which can have a corresponding controller (e.g., solid state device (SSD) controller 516). The DRAM controller 514 can be configured to communicate with the SSD controller 516 to coordinate I/O via any suitable protocol such as PCIe and/or CXL. Further, the DRAM controller 514 and/or the SSD controller 516 can communicate via CXL to a PCIe interface of a processor 522 (e.g., a x86-based CPU). In some embodiments, the DRAM controller 514 and/or the SSD controller 516 can be configured to communicate via a predetermined number of channels (e.g., 16 channels) with the processor 522. The processor 522 itself can be coupled to DRAM (e.g., DDR5 524 or any suitable memory). In various embodiments, such a microarchitecture configuration 512 can be configured to provide split and/or dedicated interfaces for two memory media (e.g., volatile and non-volatile memory) to a processor.

Diagram 505 shows a third microarchitecture configuration 532 which includes example DDR5 538 and LPDDR5 536 memories. In particular, diagram 505 shows a configuration 532 in which the DRAM includes LDDR5 536 (or LDDR4 or any other suitable LDDR memory) and a DRAM controller 534. The DRAM controller 534 can be configured to communicate via CXL to a PCIe interface of a processor 540 (e.g., a x86-based CPU). In some embodiments, the DRAM controller 534 can be configured to communicate via a predetermined number of channels (e.g., 16 channels) with the processor 540. The processor 540 itself can be coupled to DRAM (e.g., DDR5 543 or any suitable memory), In various embodiments, such a microarchitecture configuration 532 can be configured to accelerate and/or accommodate address decoding and/or interleaving mechanisms.

Diagram 507 shows a fourth microarchitecture configuration 542 which includes example split DDR and Z-NAND memories (e.g., eight such memories). Further, diagram 507 shows a configuration 542 in which there can be flash memory (e.g., Z-NAND 548) which can have a corresponding controller (e.g., SSD controller 546). The DRAM controller 544 can be configured to communicate with the SSD controller 546 to coordinate I/O over a predetermined number of channels. Further, the DRAM controller 544 and/or the SSD controller 546 can communicate via CXL to a PCIe interface of a processor 552 (e.g., a x86-based CPU). Moreover, the DRAM controller 544 can communicate to the processor 552 via CXL over a first number of channels (e.g., 8 CXL channels). Further, the SSD controller 546 can communicate to the processor 552 via CXL over a second number of channels (e.g., 8 PCIe channels). In some embodiments, the DRAM controller 544 and/or the SSD controller 546 can be configured to communicate via a predetermined number of channels (e.g., 16 channels) with the processor 552. The processor 552 itself can be coupled to DRAM (e.g. DDR5 554 or any suitable memory). In various embodiments, such a microarchitecture configuration 542 can be configured to provide split and/or dedicated interfaces for two memory media (e.g., volatile and non-volatile memory) to a processor.

In various embodiments, as noted, the disclosed systems can include a low-Power Double Data Rate (Low-Power DDR SDRAM or LPDDR SDRAM) memory. In another embodiment, LPDDR can include double data rate synchronous dynamic random-access memory that consumes less power (e.g., power below a predetermined threshold amount) and can be used in connection with mobile devices. In various embodiments, the disclosed systems can use the LPDDR to enable an increased data transfer rate (e.g., up to 6400 MT/s). Further, the disclosed systems can use LPDDR and use differential clocks. Moreover, the number of banks can be increased (e.g., to 16) and can be divided into DDR4-like bank groups. In various embodiments, the LPDDR can allow for various power-saving mechanisms such as data-Copy and Write-X (all one or all zero) commands which can also decrease data transfers and can implement dynamic frequency and voltage scaling.

In another embodiment, as noted, the disclosed systems can use flash memory. In one embodiment, flash memory is an electronic non-volatile computer memory storage medium that can be electrically erased and reprogrammed. In another embodiment, the disclosed systems can use three-dimensional flash memory such as Z-NAND. In one embodiment, the Z-NAND can include 3D single-level cell (SLC) NAND or any other suitable flash memory. In particular, the disclosed systems can include, but not be limited to, SLC NAND, multiple-level cell (MIC) NAND such as Triple Level Cell (TLC) NAND, Quad-level cell (QLC) NAND, combinations thereof, and/or the like.

FIG. 6 is an illustration of an exemplary table associated with device related parameters, in accordance with example embodiments of the disclosure. In various embodiments, diagram 601 shows a table of various module architecture limits to dynamically reconfigure a microarchitecture based on predetermined parameters. In particular, the table shows parameters including form factor 602, dimensions 604, power 606, interface 608, BW ratio 610, chip configuration 612, power-limited capacity for DDR5 614, and area-limited capacity for DDR5 616. In particular, the disclosed systems can be based on such parameters to inform different choices for types of CXL-based device microarchitectures for different applications in the data center or other environments. In various embodiments, the form factor 602 can include, but not be limited to, M.2, E1.L. E1.S, E3 S/L, U.2, NF1, full height, half length (FHHL) add-in card (AIC), half height, half length (HHHL) AIC, combinations thereof, and/or the like.

In one embodiment, the dimensions 604 can be those shown in table I corresponding to each form factor. For example, M.2 can have an about 110 mm by 22 mm form factor while NF1 can have an about 110 mm by 33 mm form factor. In one embodiment, the power 606 requirements can be those shown in the table corresponding to each form factor and dimension. For example for M.2 the power requirement can be about 8 W, while for U.2 the power requirement can be about 25 W. In various embodiments, each module can have a corresponding PCIe interface 608 as those shown in the table corresponding to each form factor. For example, for M.2 modules, the interface can include 4 channels having 16 GB/s transmission rates, while for E1.S modules, the interface can include anywhere from 4 to 8 channels operating at about 16 to 32 GB/s transmission rates.

Further, each device can have a corresponding BW ratio 610 (as compared to DDR5 channel BW) as those shown in the table corresponding to each form factor. For example, for E1.L form factor modules, the BW ratio can be about 0.5 to about 1 times the BW ratio of DDR5, while for U.2 form factor modules, the BW ratio can be about 0.5 times the BW ratio of DDR5. In various embodiments, example chip configurations are provided for each module. For example, an E1.S module can have a LPDDR5 memory having about 12 Gb capacity in a 55 mm2 chip. An NF1 form factor module can have a Z-NAND flash memory with about 64 Gb of capacity in a 46 mm2 chip. Further, the table shows example power limited DDR5 614 and area limited DDR5 616 capacities that can be used for each module. For example, for a M.2 module using a power-limited DDR5, the capacity can be about 25 GB, while the area limited DDR5 (non-3D) memory capacity can be about 16 GB.

It is noted that these parameters are all merely example parameters that can change over time with technology improvements to the various underlying memories (e.g., DRAM, DDR memory, and/or flash), Further, other types of memory can be used for modules having different form factors and/or dimensions. In some embodiments, the disclosed systems can include various device-level features that can govern the device microarchitecture. In particular, a given microarchitecture can be determined by numerous factors, individually or in combination, such as a given system architecture in which the device is used, high-level CXL controller behavior, volatile memory (e.g., DRAM) cache controller and organization, and/or non-volatile memory (e.g., Z-NAND) controller and characteristics.

In some embodiments, a CXL controller's microarchitecture parameters can include, but not be limited to, a DRAM cache size, a line size, and/or a set organization. Further, the a CXL controller's microarchitecture can be configured to enable a given eviction policy, a detailed miss path (e.g., write-allocate, no-allocate etc.), and/or can support prefetching. In another embodiment, the CXL controller's microarchitecture can be configured to use inclusion vs, exclusion. In one embodiment, the disclosed systems can enable a cache coherent device to use one or more workload-dependent runtime parameters. Alternatively or additionally, the disclosed systems can include an on-device profiler module that can profile the spatial/temporal accesses at the DRAM level. Accordingly, the disclosed systems can profile capacity vs. BW vs, latency sensitivities at runtime and route data for processing based on such sensitivities, in various embodiments, the disclosed systems can include software architectures that support the device microarchitecture. In particular, the S/W architecture can support an OS-aware data placement and migration. Further, the disclosed systems can implement a S/W architecture to leverage one or more non-uniform memory access (NUMA) mechanisms.

In various embodiments, the disclosed systems can determine a boot-time event and can reconfigure themselves accordingly. In particular, the disclosed systems can configure or reconfigure a logic on the device to use DRAM as software or hardware cache for example. In some embodiments, the disclosed systems can advertise its capabilities to a host device via CXL, for example, using a DVSEC. Further, the disclosed systems can receive a host command to reconfigure the device, for example, at boot-time as described above. In various embodiments, the device can include an on-device profiler module that can perform various operations such as determining a memory address, a R/W, a frequency of access, one or more address patterns, and/or the like. In various embodiments, the profiler can provide this information to the host as noted, such that when the system boots the host can reconfigure the device based on prior use patterns identified by the profiler.

In various embodiments, the disclosed systems can be extended to a Type-2 CXL device microarchitecture implementation. In some embodiments, the disclosed systems can include a Type 1 device that implements a cache coherent protocol such as CXL.io and CXL.cache modules in a cache controller. Further, the disclosed systems can include device attached memory which can also be cache coherent.

Figure 7:
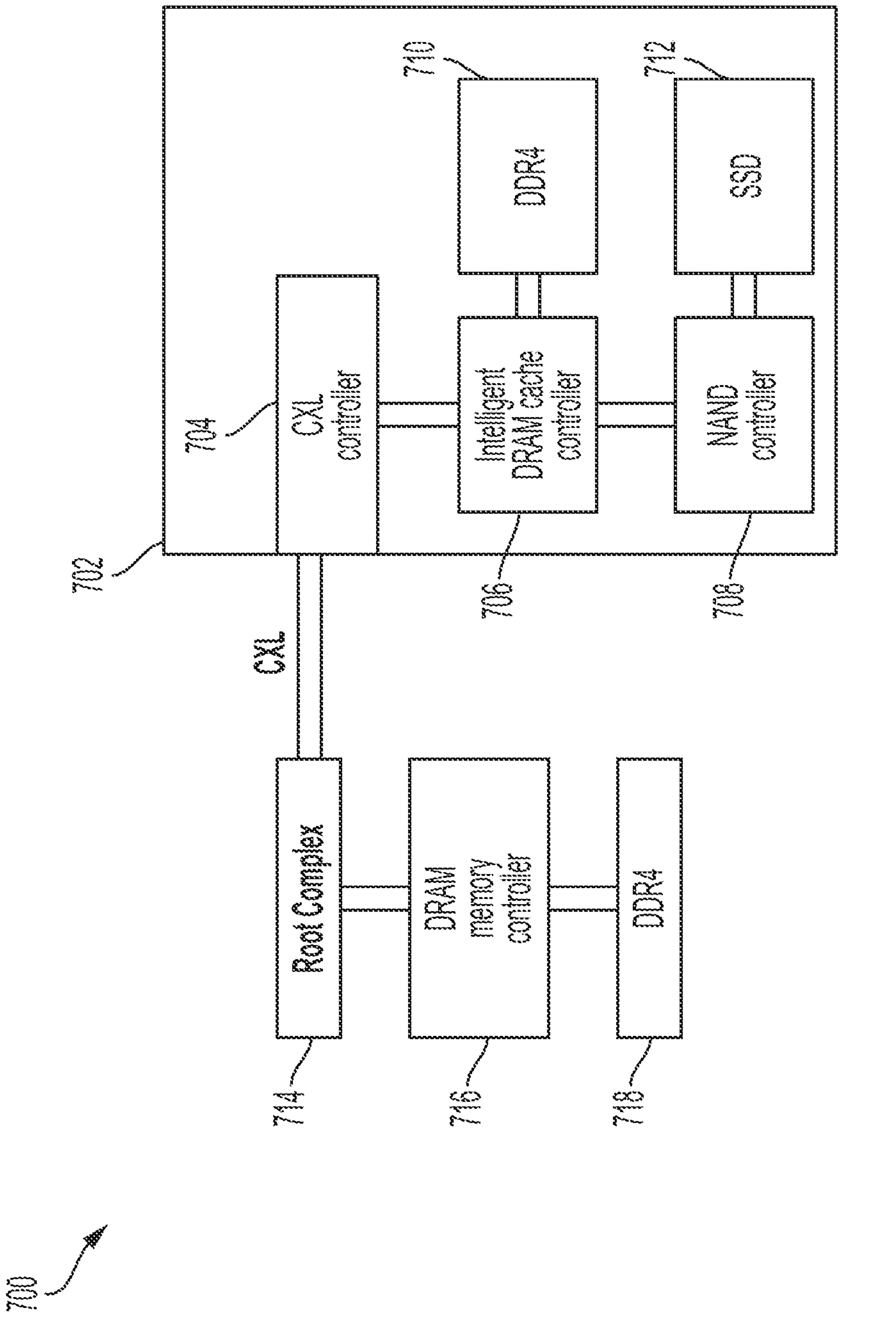
FIG. 7 is an illustration of an exemplary cache-coherent device microarchitecture, in accordance with example embodiments of the disclosure.

FIG. 7 is an illustration of an exemplary cache-coherent device microarchitecture, in accordance with example embodiments of the disclosure. In various embodiments, diagram 701 can include a CXL type-3 device but does not necessarily have to be limited to such a protocol. In one embodiment, the device can include a CXL controller 704 (or other cache coherent protocol based controller), a DRAM cache controller 706 (or other volatile memory cache controller), and a NAND controller 708 (or other non-volatile memory controller). In another embodiment, the CXL controller 704 can be connected to a root complex 714. In particular, the root complex 714 can connect the cache-coherent device to a PCI Express switch fabric composed of one or more switch devices. The root complex 714 can be connected to a DRAM memory controller 716 and an associated DDR4 memory 718 performing substantially similar operations on the host side.

In another embodiment, the DRAM cache controller 706 can be connected to a DDR4 710 and the NAND controller 708 using any suitable protocol such as CXL and/or PCIe. The NAND controller 708 can be connected to SSD 712 devices (e.g., flash chips) for non-volatile storage.

Figure 8:
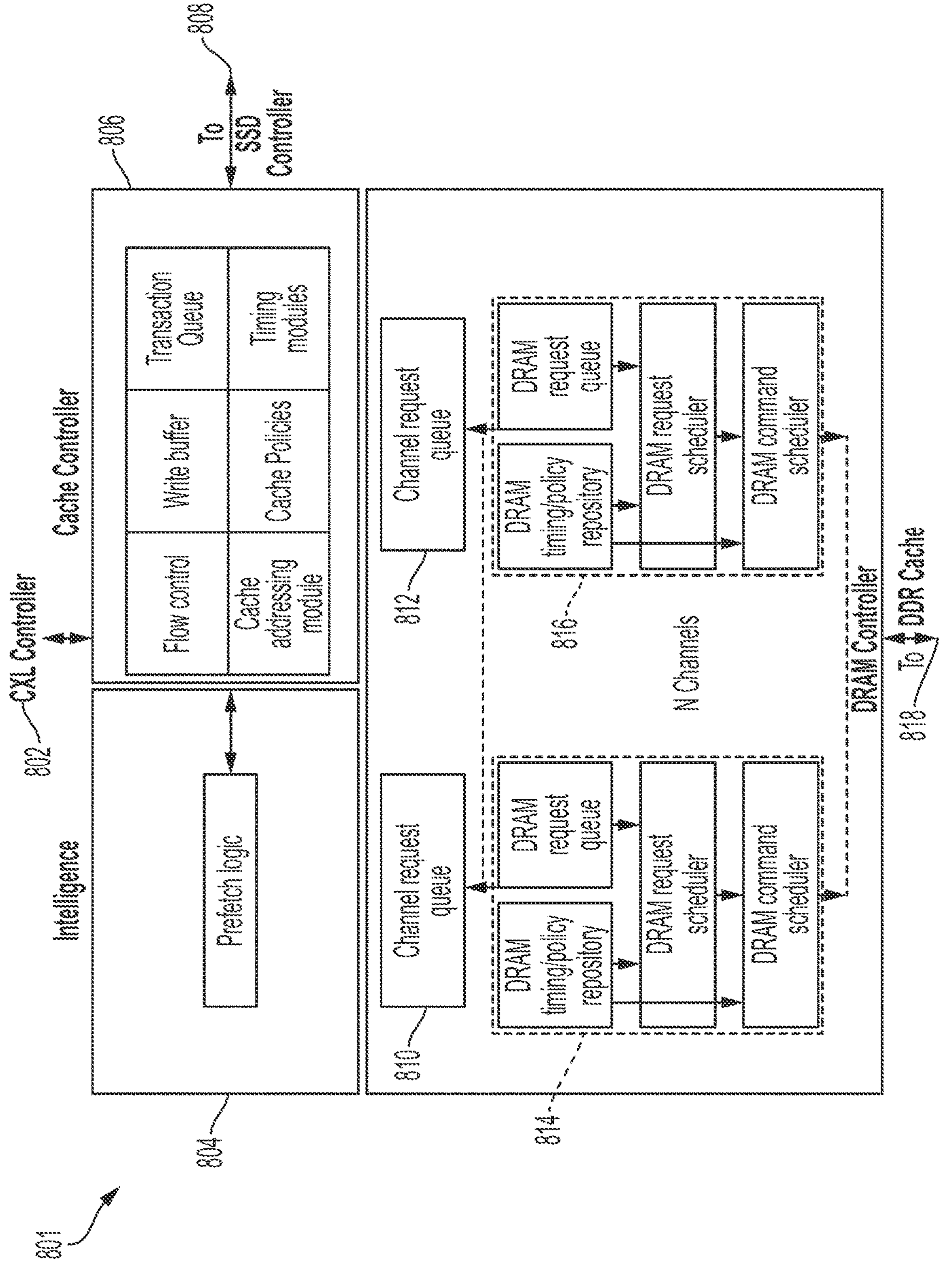
FIG. 8 is an illustration of an exemplary device for resource management, in accordance with example embodiments of the disclosure.

FIG. 8 is an illustration of an exemplary device for resource management, in accordance with example embodiments of the disclosure. In various embodiments, diagram 801 can include the device which can further be coupled to a CXL controller 802. In another embodiment, the device can include intelligence (e.g., circuits and corresponding firmware and/or software) such as a prefetch logic 804. In one embodiment, the device can include a cache controller 806 that can have a flow control module, a write buffer module, a cache addressing module, a cache policy implementation module, and a timing module. Further, the cache controller can be connected to the SSD controller 808.

In some embodiments, the disclosed systems can include device components that are compatible with CXL and that can be used as accelerators for computationally intensive applications, and hence contain a local cache and therefore have a cache controller 806. Accordingly, if a host component wants to access the same location of memory, it can then force the device to evict the line from its local cache and update the corresponding memory location depending on the cache line state. In various embodiments, the disclosed systems can be configured to operate with a CXL.cache protocol, which can inform interaction between the disclosed devices and host as a number of requests that each have at least one associated response message and sometimes a data transfer. In some embodiments, the disclosed systems can communicate to a host and other devices via an interface that consists of three channels in each direction: Request, Response, and Data.

In one embodiment, the flow control module of the cache controller 806 can implement flow control to manage the rate of data transmission the CXI, controller and any other device (input or output) to prevent a fast sender from overwhelming a slow receiver. Accordingly, the flow control module can provide a mechanism for the CXL controller to control the transmission speed, so that the CXL controller 802 is not overwhelmed with data from a secondary device (e.g., an SSD controller or a host).

In another embodiment, the write buffer module of the cache controller 806 can include a type of data buffer that can be used to hold data being written from the cache to memory or to the next cache in the memory hierarchy. In some embodiments, the write buffer module can free the cache to service read requests while the write is taking place. Accordingly, when the write buffer is full (such that buffers are occupied), subsequent writes still have to wait until slots are freed; Accordingly, subsequent reads can be served from the write buffer.

In some respects, a block of memory may not be placed randomly in the cache and may instead need to be restricted to a single cache line or a set of cache lines by the cache placement policy. In one embodiment, the cache addressing module can implement such a cache placement policy. In particular, a cache in the primary storage hierarchy can include cache lines that are grouped into sets. Further, a data request has an address specifying the location of the requested data. Each cache-line sized chunk of data from the lower level can only be placed into one set; moreover, the set that cache-line sized chunk can be placed into can depend on its address. Accordingly, the cache addressing module can generate a request address that can include an offset part identifies a particular location within a cache line. Further, the request can include a set part that identifies the set that contains the requested data. Additionally, the request can include a tag part that can be saved in each cache line along with its data to distinguish different addresses that could be placed in the set.

In another embodiment, the cache policy implementation module of the cache controller 806 can implement different policies for placement of a memory block in the cache: a direct-mapped, a fully associative, and a set-associative placement policy as known by one of ordinary skill in the art.

In one embodiment, the timing module(s) of the cache controller 806 can determine a timing of writes based on a write policy. In some aspects, the disclosed systems can include a write-through cache, where the writes to the cache causes a write to memory based on the write policy as determined by the timing module. Alternatively, in a, the disclosed systems can include a write-back or copy-back cache, where writes are not immediately mirrored to the main memory, and the cache instead tracks which locations have been written over, marking them as dirty based on the write policy as determined by the timing module. Further, the data in these locations is written back to the main memory when that data is evicted from the cache. Also, a write to a main memory location that is not yet mapped in a write-back cache may evict an already dirty location, thereby freeing that cache space for the new memory location based on the write policy as determined by the timing module. The disclosed systems can implement an intermediate policy as well based on the write policy as determined by the timing module. For example, the disclosed systems can include a cache that may be write-through, but the writes may be held in a store data queue temporarily, usually so multiple stores can be processed together (e.g., to reduce bus turnarounds and improve bus utilization) based on the write policy as determined by the timing module.

In various embodiments, the device can include a DRAM controller. The DRAM controller can include a number of channels, Each channel can be coupled to a respective channel request queue (e.g., channel request queues 810 and 812), and can include respective controller submodules 814 and 816 including a DRAM timing/policy repository, a DRAM request queue, a DRAM request scheduler, and a DRAM command scheduler. In one embodiment, the channel request queues 814 and 816 can enable the DRAM memory and the memory controller to communicate via specified channels as they become available via request.

In another embodiment, the DRAM timing/policy repository can be configured to control various timing parameters. For example, the DRAM timing/policy repository can configure a minimum time must elapse between a row being activated and a read or write command. DRAM timing/policy repository can control a CAS latency, which can include the number of clock cycles allowed for internal operations between a read command and the first data word appearing on a respective data bus. DRAM timing/policy repository can determine Other configurable parameters including, but not limited to, the length of read and write bursts including the number of words transferred per read or write command.

In various embodiments, the DRAM request scheduler can schedule commands associated with the controller for processing by said controller. In one embodiment, the DRAM request queue can in queue a sequence of commands associated with a transaction that wins arbitration and enters into the memory controller. The disclosed systems can map such a sequence to a memory address location and converted to a sequence of DRA M commands. In some embodiments, the DRAM request queue may be arranged as a pool, and the CXL controller 802 can select from pending commands to execute. Alternatively or additionally, the queue may be arranged so that there is one queue per bank or per rank of memory. The DRAM command scheduler can determine a DRAM command scheduling policy, and can schedule the commands to the DRAM devices through the electrical signaling interface.

Figure 9:
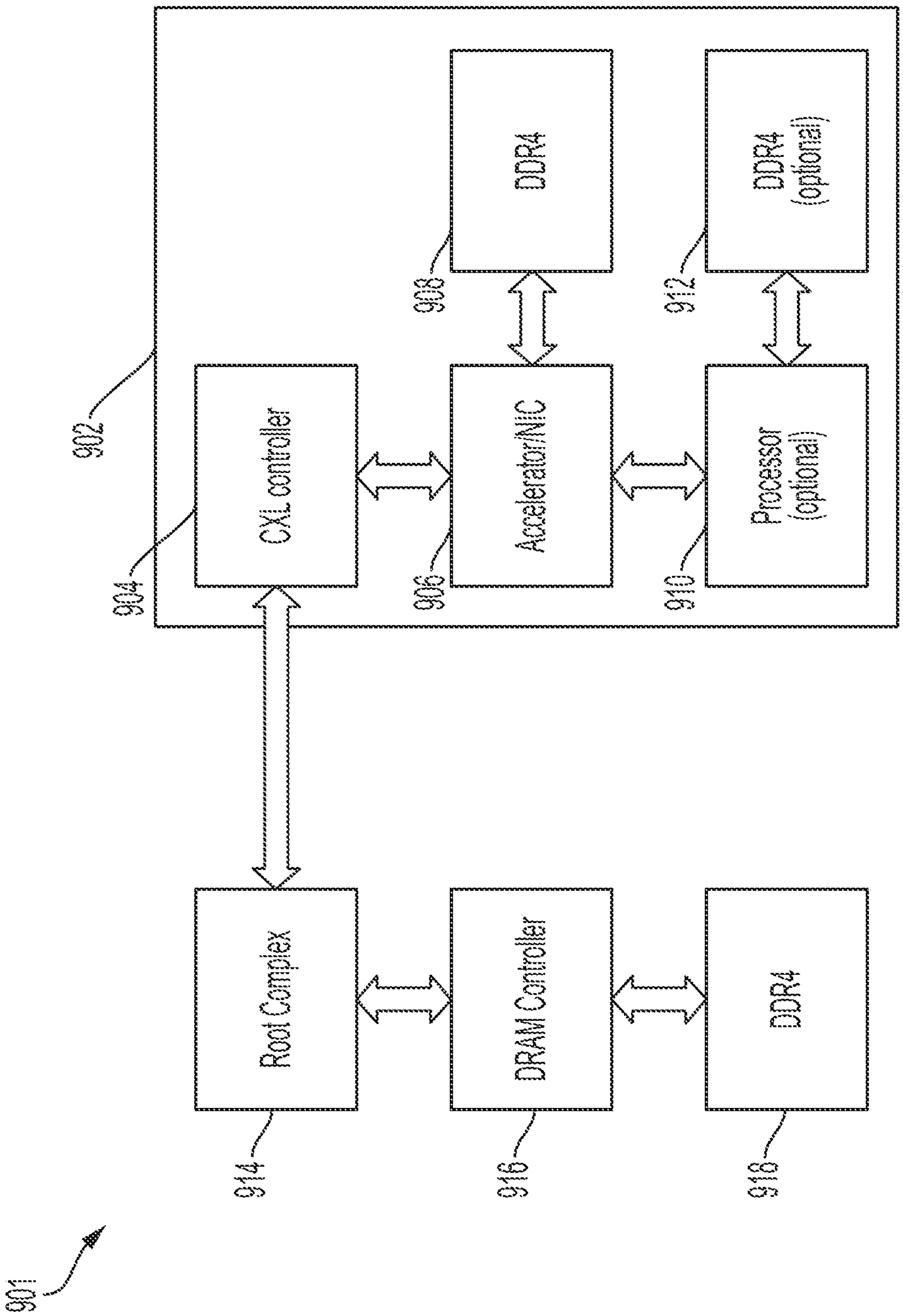
FIG. 9 is an illustration of an exemplary cache coherent device, in accordance with example embodiments of the disclosure.

FIG. 9 is an illustration of an exemplary cache coherent device 902, in accordance with example embodiments of the disclosure. In various embodiments, the cache coherent device 902 can include a type-1 device. In another embodiment, the cache coherent device 902 can include a CXL controller 904, an accelerator and/or a network interface card (NIC) device 906, a DDR4 908 (or other volatile memory), a processor 910 (optional), and a second DDR4 912 (or other volatile memory, which can be optional). The cache coherent device 902 can be further connected to the root complex 914 via the CXL controller 904. The root complex 914 can be coupled to a DRAM controller 916, which can further be connected to a DDR4 918.

In various embodiments, the CXL controller 904 can include a soft IP designed for application specific integrated circuit (ASIC) and/or field-programmable gate array (FPGA) implementation. In another embodiment, the CXL controller 904 can include a PCIe 5.0 (or other version) architecture for the CXL.io path, and can add the CXL.cache and CXL.mem paths specific to CXL. In various embodiments, the CXL controller 904 can be implemented so as to supports the CXI, protocol (e.g., the CXL 2.0 protocol or any other version). In another embodiment, the CXL controller 904 can be configured to be backward compatible with older cache coherent protocols such as CXL 1.1. As noted, the CXL controller 904 can be configured to implement the CXL.io, CXL.mem, and CXL.cache protocols or other suitable cache coherent protocols, in some embodiments, the CXL controller 904 can be configured to supports different CXL device types such as type 1, type 2, and/or type 3 CXL devices. In various embodiments, the CXL controller 904 can be configured to supports the PCIe protocols such as the PCIe 5.0 protocol. In another embodiment, the CXL controller 904 can be configured to supports the PIPE 5.x protocol using any suitable PIPE interface width (e.g., 8-, 16-, 32-, 64-, and 128-bit configurable PIPE interface width). In another embodiment, the CXL controller 904 can be configured to support various CXL device configurations such as those shown and described in connection with FIG. 5 above.

In one embodiment, the accelerator/NIC device 906 can perform hardware acceleration, that is, to perform some functions more efficiently than is possible in software running on a general-purpose central processing unit (CPU). In another embodiment, accelerator/NIC device 906 can perform such acceleration as an implementation of computing tasks in hardware to decrease latency and increase throughput associated with processing workloads or other tasks. Further, accelerator/NIC device 906 can be configured to improve the execution of a specific algorithm by allowing greater concurrency, having specific datapaths for their temporary variables, and reducing the overhead of instruction control in the fetch-decode-execute cycle.

In another embodiment, the DDR4 908 is an example of a DRAM device that can be used as memory for storing data and for performing associated tasks on the data. In another embodiment, the disclosed systems can include any suitable memory, and DDR4 is merely discussed as an example. In particular, such a memory can include any DRAM where the operation of its external pin interface is coordinated by an externally supplied clock signal. In some embodiments, the memory can include a synchronous dynamic random-access memory with a high bandwidth (e.g., double data rate) interface such as DDR5 or any suitable DRAM. Further, the memory can include a high bandwidth memory (HBM), which can include a high-performance RAM interface for 3D-stacked DRAM.

In another embodiment, the second DDR4 912 can also be an example of a DRAM device that can be used as memory for storing data and for performing associated tasks on the data. In another embodiment, the disclosed systems can include any suitable memory, and DDR4 is merely discussed as an example. In particular, such a memory can include any DRAM where the operation of its external pin interface is coordinated by an externally supplied clock signal. In some embodiments, the memory can include a synchronous dynamic random-access memory with a high bandwidth (e.g., double data rate) interface such as DDR5 or any suitable DRAM. Further, the memory can include a HBM.

In one embodiment, the processor 910 can include electronic circuitry that executes instructions comprising a computer program. The CPU can be configured to perform arithmetic, logic, controlling, and input/output (I/O) operations specified by the instructions in the program.

Figure 10:
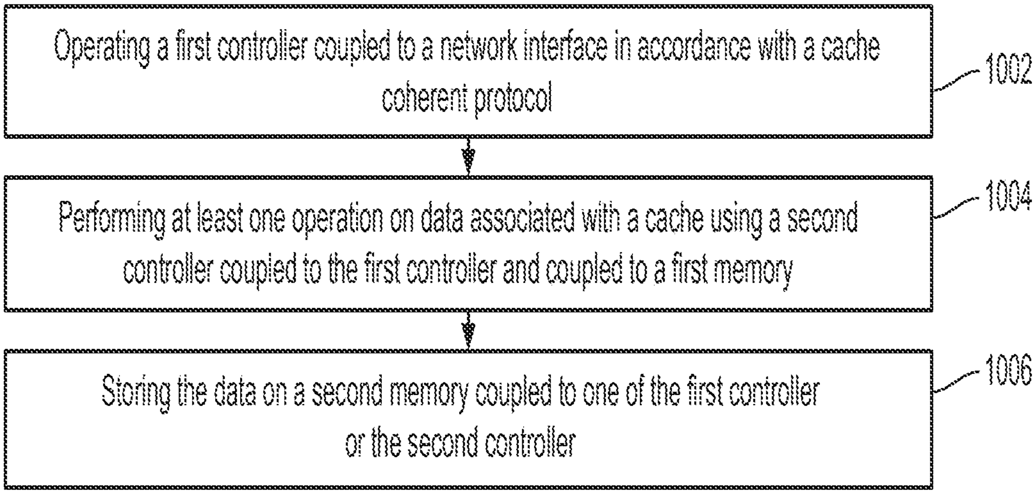
FIG. 10 is an illustration of an exemplary flow including example operations associated with the disclosed systems, in accordance with example embodiments of the disclosure.

FIG. 10 is an illustration of an exemplary flow including example operations associated with the disclosed systems, in accordance with example embodiments of the disclosure. At block 1002, the disclosed systems can operate a first controller coupled to a network interface in accordance with a cache coherent protocol. At block 1004, the disclosed systems can perform at least one operation on data associated with a cache using a second controller coupled to the first controller and coupled to a first memory. At block 1006, the disclosed systems can store the data on a second memory coupled to one of the first controller or the second controller. In various embodiments, the disclosed systems can further receive a configuration information from a host, and operate the second controller as one of a software-based cache or a hardware based cache in a boot-time mode of operation. Additionally, the disclosed systems can receive, via the first controller, data via the network interface using the cache coherent protocol, perform at least one second operation on the data to generate second data, and store the second data on the second memory based on the cache coherent protocol. In some respects, the cache coherent protocol can include a CXL protocol and wherein the disclosed systems can include a profiler that determines at least one capability associated with the device and provides the capability to a host.

Figure 11:
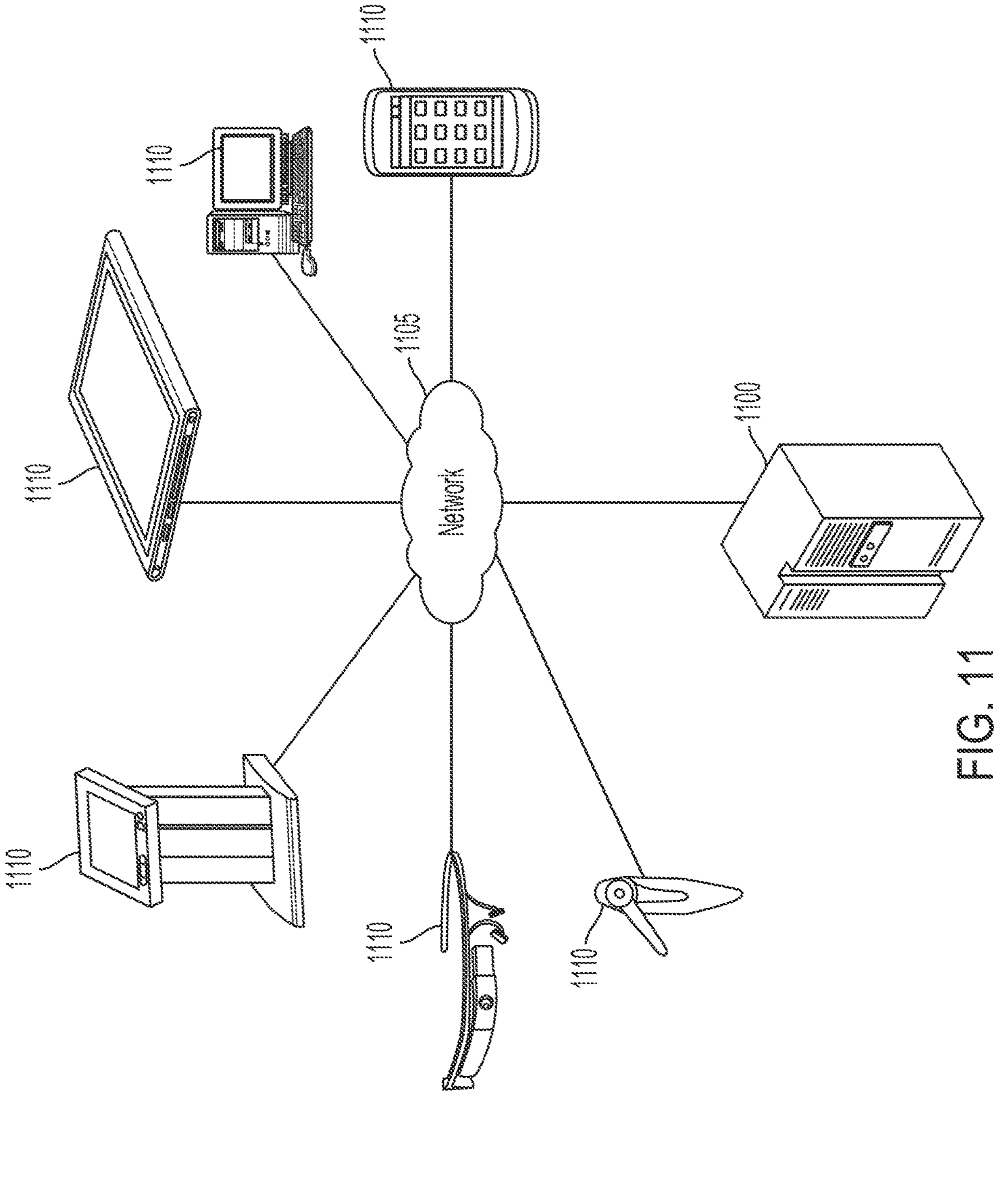
FIG. 11 shows an example schematic diagram of a system that can be used to practice embodiments of the present disclosure.

FIG. 11 shows an example schematic diagram of a system that can be used to practice embodiments of the present disclosure. As shown in FIG. 11, this particular embodiment may include one or more management computing entities 1100, one or more networks 1105, and one or more user devices 1110. Each of these components, entities, devices, systems, and similar words used herein interchangeably may be in direct or indirect communication with, for example, one another over the same or different wired or wireless networks. Further, the management computing entities 1100 can include the machine learning components described herein. As noted, the communications can be performed using the any suitable protocols, described further herein.

Figure 12:
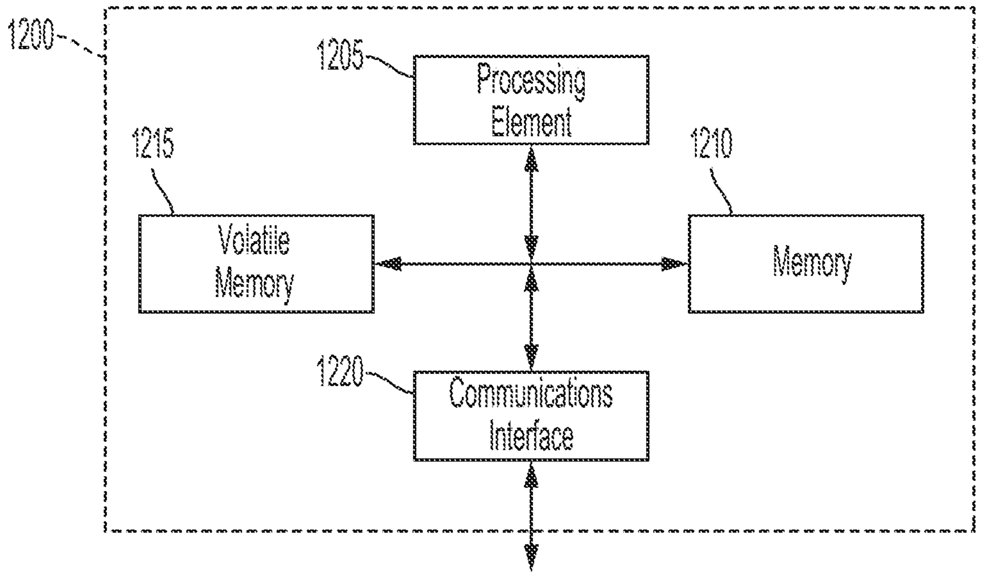
FIG. 12 shows an example schematic diagram of a management computing entity, in accordance with example embodiments of the disclosure.

FIG. 12 shows an example schematic diagram of a management computing entity, in accordance with example embodiments of the disclosure. Further, the management computing entity 1200 may include a content component, a processing component, and a transmitting component (not shown). In particular, the content component may serve to determine signals indicative of data (e.g., video, audio, text, data, combinations thereof, and/or the like) to be transmitted over the architecture described herein. In another embodiment, the determination of the signal for transmission may be, for example, based on a user input to the device, a predetermined schedule of data transmissions on the network, changes in network conditions, and the like. In one embodiment, the signal may include that data may be encapsulated in a data frame that is configured to be sent from a device to one or more devices on the network.

In another embodiment, the processing element 1205 may serve to determine various parameters associated data transmitted over the network and/or parameters associated with the clusters of the portions of the network. For example, the processing element 1205 may serve to run a model on the network data, run a machine learning technique on the network data, determine distributions of workloads to be processed by various portions of the network architecture, combinations thereof, and/or the like. As another example, the processing element 1205 may serve to run a model on the network data, run a machine learning technique on parameters associated with different performance capabilities of the clusters of the network, determine distributions of workloads to be processed by various clusters of the portions of the network architecture, combinations thereof, and/or the like.

In one embodiment, a transmitting component (not shown) may serve to transmit the signal from one device to another device on the network (e.g., from a first device on a first cluster to a second device on a second cluster, for example, using a cache coherent protocol). For example, the transmitting component may serve to prepare a transmitter (e.g., transmitter 1204 of FIG. 12, below) to transmit the signal over the network. For example, the transmitting component may queue data in one or more buffers, may ascertain that the transmitting device and associated transmitters are functional and have adequate power to transmit the signal over the network, may adjust one or more parameters (e.g., modulation type, signal amplification, signal power level, noise rejection, combinations thereof, and/or the like) associated with the transmission of the data.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 1100 may also include one or more communications interfaces 1220 for communicating with various computing entities, such as by communicating data, content, information, and/or similar terms used herein interchangeably that can be transmitted, received, operated on, processed, displayed, stored, and/or the like. For instance, the management computing entity 1100 may communicate with user devices 1110 and/or a variety of other computing entities.

As shown in FIG. 12, in one embodiment, the management computing entity 1100 may include or be in communication with one or more processing elements 1205 (also referred to as processors, processing circuitry, and/or similar terms used herein interchangeably) that communicate with other elements within the management computing entity 1100 via a bus, for example. As will be understood, the processing element 1205 may be embodied in a number of different ways. For example, the processing element 1205 may be embodied as one or more complex programmable logic devices (CPLDs), microprocessors, multi-core processors, coprocessing entities, application-specific instruction-set processors (ASIPs), microcontrollers, and/or controllers. Further, the processing element 1205 may be embodied as one or more other processing devices or circuitry. The term circuitry may refer to an entirely hardware embodiment or a combination of hardware and computer program products. Thus, the processing element 1205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 1205 may be configured for a particular use or configured to execute instructions stored in volatile or non-volatile media or otherwise accessible to the processing element 1205. As such, whether configured by hardware or computer program products, or by a combination thereof, the processing element 1205 may be capable of performing steps or operations according to embodiments of the present disclosure when configured accordingly.

In one embodiment, the management computing entity 1100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 1210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program components, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 1100 may further include or be in communication with volatile media (also referred to as volatile storage, memory, memory storage, memory circuitry and/or similar terms used herein interchangeably). In one embodiment, the volatile storage or memory may also include one or more volatile storage or memory media 1215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program components, scripts, source code, object code, byte code, compiled code, interpreted code, machine code, executable instructions, and/or the like being executed by, for example, the processing element 1205. Thus, the databases, database instances, database management systems, data, applications, programs, program components, scripts, source code, object code, byte code, compiled code, interpreted code, machine code, executable instructions, and/or the like may be used to control certain aspects of the operation of the management computing entity 1100 with the assistance of the processing element 1205 and operating system.

As indicated, in one embodiment, the management computing entity 1100 may also include one or more communications interfaces 1220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as peripheral component interconnect express (PCIe), fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 1100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA). High-Speed Downlink Packet Access (HSDPA), IEEE 802.1 (Wi-Fi). Wi-Fi Direct, 802.16 (WiMAX), ultra-wideband (UWB), infrared (IR) protocols, near field communication (NFC) protocols, ZigBee, Bluetooth protocols, 5G protocol, wireless universal serial bus (USB) protocols, and/or any other wireless protocol.

Although not shown, the management computing entity 1100 may include or be in communication with one or more input elements, such as a keyboard input, a mouse input, a touch screen/display input, motion input, movement input, audio input, pointing device input, joystick input, keypad input, and/or the like. The management computing entity 1100 may also include or be in communication with one or more output elements (not shown), such as audio output, video output, screen/display output, motion output, movement output, and/or the like.

As will be appreciated, one or more of the management computing entity's 1100 components may be located remotely from other management computing entity 1100 components, such as in a distributed system. Furthermore, one or more of the components may be combined and additional components performing functions described herein may be included in the management computing entity 1100. Thus, the management computing entity 1100 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a user device 1110 that includes one or more components that are functionally similar to those of the management computing entity 1100.

Figure 13:
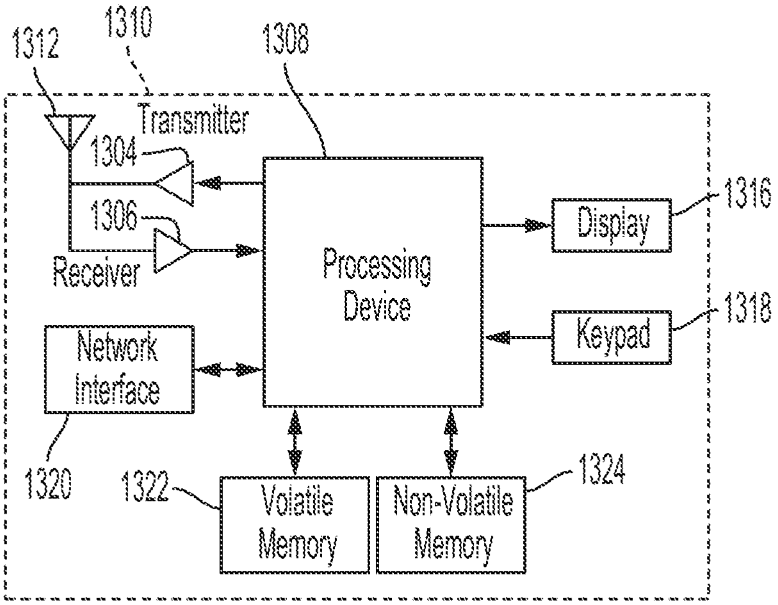
FIG. 13 shows an example schematic diagram of a user device, in accordance with example embodiments of the disclosure.

In various aspects, the processing component, the transmitting component, and/or the receiving component (not shown) may be configured to operate on one or more may include aspects of the functionality of the management computing entity 1100, as shown and described in connection with FIGS. 11 and 12 here. In particular, the processing component, the transmitting component, and/or the receiving component may be configured to be in communication with one or more processing elements 1205, memory 1210, volatile memory 1215, and may include a communication interface 1220 (e.g., to facilitate communication between devices), FIG. 13 shows an example schematic diagram of a user device, in accordance with example embodiments of the disclosure. FIG. 13 provides an illustrative schematic representative of a user device 1110 (shown in connection with FIG. 11) that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station. Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 1110 can be operated by various parties. As shown in FIG. 13, the user device 1110 can include an antenna 1312, a transmitter 1304 (for example radio), a receiver 1306 (for example radio), and a processing element 1308 (for example CPLDs, FPGAs, microprocessors, multi-core processors, co-processing entities, ASIPS, microcontrollers, and/or controllers) that provides signals to and receives signals from the transmitter 1304 and receiver 1306, respectively.

The signals provided to and received from the transmitter 1304 and the receiver 1306, respectively, may include signaling information in accordance with air interface standards of applicable wireless systems. In this regard, the user device 1110 may be capable of operating with one or more air interface standards, communication protocols, modulation types, and access types. More particularly, the user device 1110 may operate in accordance with any of a number of wireless communication standards and protocols, such as those described above with regard to the management computing entity 1100 of FIG. 10. In a particular embodiment, the user device 1110 may operate in accordance with multiple wireless communication standards and protocols, such as the disclosed IoT DOCSIS protocol, UMTS, CDMA2000, 1×RTT, WCDMA, TD-SCDMA, LTE, E-UTRAN, EVDO, HSPA, HSDPA, 5G, Wi-Fi, Wi-Fi Direct, WiMAX, UWB, IR, NFC, Bluetooth, USB, and/or the like. Similarly, the user device 1110 may operate in accordance with multiple wired communication standards and protocols, such as those described above with regard to the management computing entity 1100 via a network interface 1320.

Via these communication standards and protocols, the user device 1110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Component Dialer (SIM dialer). The user device 1110 can also download changes, add-ons, and updates, for instance, to its firmware, software (for example including executable instructions, applications, program components), and operating system.

According to one embodiment, the user device 1110 may include location determining aspects, devices, components, functionalities, and/or similar words used herein interchangeably. The location determining aspects may be used to inform the models used by the management computing entity and one or more of the models and/or machine learning techniques described herein. For example, the user device 1110 may include outdoor positioning aspects, such as a location component adapted to acquire, for example, latitude, longitude, altitude, geocode, course, direction, heading, speed, universal time (UTC), date, and/or various other information/data. In one embodiment, the location component can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 1110 position in connection with a variety of other systems, including cellular towers, Wi-Fi access points, and/or the like. Similarly, the user device 1110 may include indoor positioning aspects, such as a location component adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NC transmitters, and/or the like. These indoor positioning aspects can be used in a variety of settings to determine the location of someone or something to within inches or centimeters.

The user device 1110 may also comprise a user interface (that can include a display 1316 coupled to a processing element 1308) and/or a user input interface (coupled to a processing element 1308). For example, the user interface may be a user application, browser, user interface, and/or similar words used herein interchangeably executing on and/or accessible via the user device 1110 to interact with and/or cause display of information from the management computing entity 1100, as described herein. The user input interface can comprise any of a number of devices or interfaces allowing the user device 1110 to receive data, such as a keypad 1318 (hard or soft), a touch display, voice/speech or motion interfaces, or other input devices. In embodiments including a keypad 1318, the keypad 1318 can include (or cause display of) the conventional numeric (0-9) and related keys (#, *), and other keys used for operating the user device 1110 and may include a full set of alphabetic keys or set of keys that may be activated to provide a fall set of alphanumeric keys. In addition to providing input, the user input interface can be used, for example, to activate or deactivate certain functions, such as screen savers and/or sleep modes.

The user device 1110 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM. MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program components, scripts, source code, object code, byte code, compiled code, interpreted code, machine code, executable instructions, and/or the like to implement the functions of the user device 1110. As indicated, this may include a user application that is resident on the entity or accessible through a browser or other user interface for communicating with the management computing entity 1100 and/or various other computing entities.

In another embodiment, the user device 1110 may include one or more components or functionality that are the same or similar to those of the management computing entity 1100, as described in greater detail above. As will be recognized, these architectures and descriptions are provided for example purposes only and are not limiting to the various embodiments.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer), For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device" "user device", "communication station", "station", "handheld device", "mobile device". "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM). Orthogonal FDM (OFDM), Time-Division Multiplexing (TDM), Time-Division Multiple Access (TDMA), Extended TDMA (E-TDMA). General Packet Radio Service (GPRS), extended GPRS, Code-Division Multiple Access (CDMA), Wideband CDMA (WCDMA), CDMA 2000, single-carrier CDMA, multi-carrier CDMA. Multi-Carrier Modulation (MDM), Discrete Multi-Tone (DMT), Bluetooth™, Global Positioning System (GPS). Wi-Fi, Wi-Max, ZigBee™, Ultra-Wideband (UWB), Global System for Mobile communication (GSM), 2G, 2.3G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code), A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A device for providing a storage resource, the device comprising:

a first controller coupled to a network interface, wherein the first controller is operable with a cache coherent protocol;

a second controller coupled to the first controller and coupled to a first memory, the second controller performing at least one operation associated with a cache of the device;

a second memory coupled to at least one of the first controller or the second controller; and a module that is configured to:

determine at least one capability associated with the device, the at least one capability corresponding to profile information defining a relationship between capacity value, a bandwidth value, and a latency value; and transmit the at least one capability to another device.

2. The device of claim 1, wherein the device:

receives a configuration information from a host;

configures the device to operate the second controller as one of a software-based cache or a hardware based cache in a boot-time mode of operation;

receives, via the first controller, data via the network interface using the cache coherent protocol;

performs at least one second operation on the data to generate second data; and stores the second data on the second memory based on the cache coherent protocol.

3. The device of claim 1, wherein the cache coherent protocol comprises a compute express link (CXL) protocol and wherein the module is a profiler that provides the capability to a host.

4. The device of claim 1, wherein the device further comprises a third controller coupled to a third memory, the third memory comprising a non-volatile memory.

5. The device of claim 1, wherein the first memory comprises a first volatile memory and the second memory comprises a second volatile memory.

6. The device of claim 5, wherein the first volatile memory comprises a double-data rate memory or a low-power double data-data rate memory.

7. The device of claim 1, wherein the first memory comprises a first non-volatile memory and the second memory comprises a second non-volatile memory.

8. The device of claim 7, wherein the first non-volatile memory comprises a three-dimensional flash memory.

9. The device of claim 1, wherein the device comprises at least one of a M.2 form factor, an E1.L form factor, a E1.S form factor, a E3 S/L form factor, a U.2 form factor, an NF1 form factor, an full height, half length (FHHL) add-in card (AIC) form factor, or an half height, half length (HHHL) AIC form factor.

10. The device of claim 1, wherein the second controller comprises at least one of a flow control module, a cache addressing module, or a cache policy module.

11. The device of claim 1, wherein the second controller comprises at least one of a channel request queue, a volatile-memory request scheduler, or a volatile-memory command scheduler.

12. The device of claim 1, wherein the device further comprises an accelerator or a network interface card (NIC).

13. A system for providing a storage resource, the system comprising:

a first controller coupled to a network interface, wherein the first controller is operable with a cache coherent protocol;

a second controller coupled to the first controller and coupled to a first memory, the second controller performing at least one operation associated with a cache of the device;

a second memory coupled to at least one of the first controller or the second controller; and a module that is configured to:

determine at least one capability associated with the device, the at least one capability corresponding to profile information defining a relationship between capacity value, a bandwidth value, and a latency value; and transmit the at least one capability to another device.

14. The system of claim 13, wherein the system:

receives, via the first controller, data via the network interface using the cache coherent protocol, performs at least one second operation on the data to generate second data, and stores the second data on the first memory or the second memory.

15. The system of claim 13, wherein the cache coherent protocol comprises a CXL protocol and the module provides the capability to a host.

16. The system of claim 13, wherein the first memory comprises a volatile memory and the second memory comprises a volatile memory.

17. The system of claim 16, wherein the volatile memory comprises a double-data rate memory or a low-power double data-data rate memory.

18. The system of claim 13, wherein the first memory comprises a non-volatile memory and the second memory comprises a non-volatile memory.

19. A method for providing a storage resource, the method comprising:

operating a first controller coupled to a network interface in accordance with a cache coherent protocol;

performing at least one operation on data associated with a cache using a second controller coupled to the first controller and coupled to a first memory;

storing the data on a second memory coupled to one of the first controller or the second controller; and using a module to:

determine at least one capability associated with the device, the at least one capability corresponding to profile information defining a relationship between capacity value, a bandwidth value, and a latency value; and transmit the at least one capability to another device.

20. The method of claim 19, wherein the method further comprises:

receiving a configuration information from a host;

operating the second controller as one of a software-based cache or a hardware based cache in a boot-time mode of operation;

receiving, via the first controller, second data via the network interface using the cache coherent protocol;

performing at least one second operation on the second data to generate third data; and storing the second data on the second memory based on the cache coherent protocol.

* * * * *